US012389154B2

(12) United States Patent
Perez et al.

(10) Patent No.: US 12,389,154 B2
(45) Date of Patent: Aug. 12, 2025

(54) SHARED EARPIECE COMMUNICATION

(71) Applicant: ST FamTech, LLC, Delray Beach, FL (US)

(72) Inventors: Moises Perez, Delray Beach, FL (US); Steven W. Goldstein, Delray Beach, FL (US)

(73) Assignee: ST FamTech, LLC, Delray Beach, FL (US)

( * ) Notice: Subject to any disclaimer, the term of this patent is extended or adjusted under 35 U.S.C. 154(b) by 55 days.

(21) Appl. No.: 18/097,613

(22) Filed: Jan. 17, 2023

(65) Prior Publication Data

US 2023/0179905 A1 Jun. 8, 2023

Related U.S. Application Data

(63) Continuation of application No. 17/211,814, filed on Mar. 24, 2021, now Pat. No. 11,659,315, which is a continuation of application No. 16/266,829, filed on Feb. 4, 2019, now Pat. No. 11,006,199, which is a continuation of application No. 15/968,231, filed on May 1, 2018, now Pat. No. 10,200,775, which is a (Continued)

(51) Int. Cl.
*H04R 25/00* (2006.01)
*H04R 1/10* (2006.01)
*H04R 5/033* (2006.01)

(52) U.S. Cl.
CPC ........... *H04R 1/1041* (2013.01); *H04R 5/033* (2013.01); *H04R 1/1016* (2013.01); *H04R 25/554* (2013.01); *H04R 2420/07* (2013.01); *H04R 2430/01* (2013.01); *H04R 2460/17* (2013.01); *Y10T 137/3584* (2015.04)

(58) Field of Classification Search
CPC .. H04R 1/1016; H04R 1/1041; H04R 25/554; H04R 5/033; H04R 2420/07; H04R 2430/01; H04R 2460/17
USPC .......................................................... 381/223
See application file for complete search history.

(56) References Cited

U.S. PATENT DOCUMENTS

| | | | |
|---|---|---|---|
| 3,876,843 | A | 4/1975 | Moen |
| 4,054,749 | A | 10/1977 | Suzuki et al. |
| 4,088,849 | A | 5/1978 | Usami et al. |

(Continued)

FOREIGN PATENT DOCUMENTS

| | | | |
|---|---|---|---|
| EP | 0495653 | A1 | 7/1992 |
| EP | 1385324 | A1 | 1/2004 |

(Continued)

OTHER PUBLICATIONS

'400 Patent Family Tree, Exhibit—1009, Filed on Dec. 10, 2021—Cited in IPR2022-00282, challenging U.S. Pat. No. 8,315,400.

(Continued)

*Primary Examiner* — Phylesha Dabney
(74) *Attorney, Agent, or Firm* — Akerman LLP; Peter A. Chiabotti

(57) ABSTRACT

At least one exemplary embodiment is directed to earpiece devices that share information with other earpiece devices within range (e.g., GPS location and identity). For example multiple users can send signals to each individual earpiece when in range or to a mobile audio communications device via a wireless connection with each earpiece.

20 Claims, 19 Drawing Sheets

Related U.S. Application Data continuation of application No. 14/109,954, filed on Dec. 17, 2013, now Pat. No. 10,009,677.

(60) Provisional application No. 61/737,932, filed on Dec. 17, 2012.

(56) References Cited

U.S. PATENT DOCUMENTS

| | | | | |
|---|---|---|---|---|
| 4,455,677 | A | 6/1984 | Fox | |
| 4,827,458 | A | 5/1989 | D'Alayer de Costemore D'Arc | |
| 4,891,841 | A | 1/1990 | Bohn | |
| 4,947,432 | A | 8/1990 | Topholm | |
| 4,947,440 | A | 8/1990 | Bateman et al. | |
| 5,027,410 | A | 6/1991 | Williamson et al. | |
| 5,182,774 | A | 1/1993 | Bourk | |
| 5,202,927 | A | 4/1993 | Topholm | |
| 5,208,867 | A | 5/1993 | Stites, III | |
| 5,267,321 | A | 11/1993 | Langberg | |
| 5,276,740 | A | 1/1994 | Inanaga et al. | |
| 5,317,273 | A | 5/1994 | Hanson | |
| 5,524,056 | A | 6/1996 | Killion et al. | |
| 5,550,923 | A | 8/1996 | Hotvet | |
| 5,577,511 | A | 11/1996 | Killion | |
| 5,606,621 | A | 2/1997 | Reiter et al. | |
| 5,636,351 | A | 6/1997 | Lee | |
| 5,647,011 | A | 7/1997 | Garvis | |
| 5,740,262 | A | 4/1998 | Yoshida et al. | |
| 5,748,754 | A | 5/1998 | Maag et al. | |
| 5,826,064 | A | 10/1998 | Loring et al. | |
| 5,862,065 | A | 1/1999 | Muthusamy | |
| 5,903,868 | A | 5/1999 | Yuen et al. | |
| 5,930,751 | A | 7/1999 | Cohrs et al. | |
| 5,946,050 | A | 8/1999 | Wolff | |
| 6,021,207 | A | 2/2000 | Puthuff et al. | |
| 6,021,325 | A | 2/2000 | Hall | |
| 6,028,514 | A | 2/2000 | Lemelson et al. | |
| 6,048,320 | A | 4/2000 | Brainard, II | |
| 6,056,698 | A | 5/2000 | Seberg | |
| 6,163,338 | A | 12/2000 | Johnson et al. | |
| 6,163,508 | A | 12/2000 | Kim et al. | |
| 6,226,389 | B1 | 5/2001 | Lemelson et al. | |
| 6,298,323 | B1 | 10/2001 | Kaemmerer | |
| 6,359,993 | B2 | 3/2002 | Brimhall | |
| 6,400,652 | B1 | 6/2002 | Goldberg et al. | |
| 6,408,272 | B1 | 6/2002 | White et al. | |
| 6,415,034 | B1 | 7/2002 | Hietanen | |
| 6,567,524 | B1 | 5/2003 | Svean et al. | |
| RE38,351 | E | 12/2003 | Iseberg et al. | |
| 6,661,901 | B1 | 12/2003 | Svean et al. | |
| 6,671,379 | B2 | 12/2003 | Nemirovski | |
| 6,687,377 | B2 | 2/2004 | Voix et al. | |
| 6,728,385 | B2 | 4/2004 | Kval et al. | |
| 6,748,238 | B1 | 6/2004 | Lau | |
| 6,754,359 | B1 | 6/2004 | Svean et al. | |
| 6,760,754 | B1 | 7/2004 | Isaacs et al. | |
| 6,782,106 | B1 | 8/2004 | Kong et al. | |
| 6,804,638 | B2 | 10/2004 | Fiedler | |
| 6,804,643 | B1 | 10/2004 | Kiss | |
| 6,826,286 | B1 | 11/2004 | Arndt et al. | |
| 6,978,163 | B2 | 12/2005 | Dyer et al. | |
| 7,039,195 | B1 | 5/2006 | Svean | |
| 7,072,482 | B2 | 7/2006 | Van et al. | |
| 7,107,109 | B1 | 9/2006 | Nathan et al. | |
| 7,158,643 | B2 | 1/2007 | Lavoie et al. | |
| 7,158,933 | B2 | 1/2007 | Balan | |
| 7,177,433 | B2 | 2/2007 | Sibbald | |
| 7,209,569 | B2 | 4/2007 | Boesen | |
| 7,280,849 | B1 | 10/2007 | Bailey | |
| 7,430,299 | B2 | 9/2008 | Armstrong et al. | |
| 7,433,714 | B2 | 10/2008 | Howard et al. | |
| 7,450,730 | B2 | 11/2008 | Berg et al. | |
| 7,477,756 | B2 | 1/2009 | Wickstrom et al. | |
| 7,558,529 | B2 | 7/2009 | Seshadri et al. | |
| 7,562,020 | B2 | 7/2009 | Le et al. | |
| 7,715,577 | B2 | 5/2010 | Allen et al. | |
| 7,729,912 | B1 | 6/2010 | Bacchiani et al. | |
| 7,756,285 | B2 | 7/2010 | Sjursen et al. | |
| 7,774,202 | B2 | 8/2010 | Spengler et al. | |
| 7,778,434 | B2 | 8/2010 | Juneau et al. | |
| 7,778,601 | B2 | 8/2010 | Seshadri et al. | |
| 7,801,726 | B2 | 9/2010 | Ariu | |
| 7,844,248 | B2 | 11/2010 | Sotack | |
| 7,861,008 | B2 | 12/2010 | Batson et al. | |
| 7,899,445 | B2 | 3/2011 | Guccione | |
| 7,903,825 | B1 | 3/2011 | Melanson | |
| 7,903,826 | B2 | 3/2011 | Boersma | |
| 7,920,557 | B2 | 4/2011 | Moote | |
| 8,014,553 | B2 | 9/2011 | Radivojevic et al. | |
| 8,018,337 | B2 | 9/2011 | Jones et al. | |
| 8,045,840 | B2 | 10/2011 | Murata et al. | |
| 8,081,780 | B2 | 12/2011 | Goldstein et al. | |
| 8,111,839 | B2 | 2/2012 | Goldstein et al. | |
| 8,150,044 | B2 | 4/2012 | Goldstein et al. | |
| 8,162,846 | B2 | 4/2012 | Epley | |
| 8,180,078 | B2 | 5/2012 | Zellner | |
| 8,208,642 | B2 | 6/2012 | Edwards | |
| 8,209,181 | B2 | 6/2012 | Heckerman et al. | |
| 8,254,591 | B2 | 8/2012 | Goldstein et al. | |
| 8,315,400 | B2 | 11/2012 | Goldstein et al. | |
| 8,401,198 | B2 | 3/2013 | Oh et al. | |
| 8,477,955 | B2 | 7/2013 | Engle et al. | |
| 8,488,799 | B2 | 7/2013 | Goldstein et al. | |
| 8,493,204 | B2 | 7/2013 | Wong et al. | |
| 8,522,916 | B2 | 9/2013 | Keady | |
| 8,577,062 | B2 | 11/2013 | Goldstein | |
| 8,594,341 | B2 | 11/2013 | Rothschild | |
| 8,611,560 | B2 | 12/2013 | Goldstein | |
| 8,750,295 | B2 | 6/2014 | Liron | |
| 8,774,433 | B2 | 7/2014 | Goldstein | |
| 8,838,029 | B2 | 9/2014 | Goldman et al. | |
| 8,855,343 | B2 | 10/2014 | Usher | |
| 9,037,458 | B2 | 5/2015 | Park et al. | |
| 9,053,697 | B2 | 6/2015 | Park | |
| 9,123,343 | B2 | 9/2015 | Kurki-Suonio | |
| 9,124,982 | B2 | 9/2015 | Goldstein et al. | |
| 9,135,797 | B2 | 9/2015 | Couper et al. | |
| 9,167,348 | B1 * | 10/2015 | Vartanian | H04R 1/1041 |
| 9,191,740 | B2 | 11/2015 | McIntosh | |
| 9,270,244 | B2 | 2/2016 | Usher et al. | |
| 9,491,542 | B2 | 11/2016 | Usher | |
| 9,609,424 | B2 | 3/2017 | Goldstein | |
| 9,628,896 | B2 | 4/2017 | Ichimura | |
| 10,365,883 | B2 | 7/2019 | Goldstein et al. | |
| 10,848,827 | B2 | 11/2020 | Sengupta et al. | |
| 10,966,015 | B2 | 3/2021 | Usher | |
| 10,979,836 | B2 | 4/2021 | Usher et al. | |
| 11,039,259 | B2 | 6/2021 | Goldstein et al. | |
| 11,057,701 | B2 | 7/2021 | Goldstein et al. | |
| 11,217,237 | B2 | 1/2022 | Usher et al. | |
| 11,244,666 | B2 | 2/2022 | Goldstein et al. | |
| 11,277,682 | B2 | 3/2022 | Usher | |
| 11,393,486 | B1 | 7/2022 | Woodruff et al. | |
| 11,538,451 | B2 * | 12/2022 | Sereshki | H04M 9/082 |
| 11,610,587 | B2 | 3/2023 | Goldstein et al. | |
| 11,659,315 | B2 | 5/2023 | Perez et al. | |
| 11,665,493 | B2 | 5/2023 | Usher et al. | |
| 11,710,473 | B2 | 7/2023 | Goldstein et al. | |
| 11,750,965 | B2 | 9/2023 | Usher et al. | |
| 2001/0046304 | A1 | 11/2001 | Rast | |
| 2002/0018798 | A1 | 2/2002 | Sewing et al. | |
| 2002/0026311 | A1 | 2/2002 | Okitsu | |
| 2002/0106091 | A1 | 8/2002 | Furst et al. | |
| 2002/0111798 | A1 | 8/2002 | Huang | |
| 2002/0116541 | A1 | 8/2002 | Parker et al. | |
| 2002/0118798 | A1 | 8/2002 | Langhart et al. | |
| 2003/0032447 | A1 | 2/2003 | Bulthuis | |
| 2003/0033152 | A1 | 2/2003 | Cameron | |
| 2003/0130016 | A1 | 7/2003 | Matsuura | |
| 2003/0138118 | A1 | 7/2003 | Stahl | |
| 2003/0161097 | A1 | 8/2003 | Le et al. | |
| 2003/0165246 | A1 | 9/2003 | Kvaloy et al. | |
| 2003/0198359 | A1 | 10/2003 | Killion et al. | |
| 2004/0042103 | A1 | 3/2004 | Mayer | |
| 2004/0109668 | A1 | 6/2004 | Stuckman | |

(56) References Cited

U.S. PATENT DOCUMENTS

| | | | |
|---|---|---|---|
| 2004/0125965 A1 | 7/2004 | Alberth et al. |
| 2004/0179694 A1 | 9/2004 | Alley |
| 2004/0190737 A1 | 9/2004 | Kuhnel et al. |
| 2004/0196992 A1 | 10/2004 | Ryan |
| 2004/0202340 A1 | 10/2004 | Armstrong et al. |
| 2004/0203351 A1 | 10/2004 | Shearer et al. |
| 2005/0049854 A1 | 3/2005 | Reding et al. |
| 2005/0058313 A1 | 3/2005 | Victorian |
| 2005/0071158 A1 | 3/2005 | Byford |
| 2005/0077102 A1 | 4/2005 | Banter et al. |
| 2005/0078838 A1 | 4/2005 | Simon |
| 2005/0096899 A1 | 5/2005 | Padhi et al. |
| 2005/0102142 A1 | 5/2005 | Soufflet et al. |
| 2005/0123146 A1 | 6/2005 | Voix et al. |
| 2005/0157891 A1 | 7/2005 | Johansen |
| 2005/0182620 A1 | 8/2005 | Kabi et al. |
| 2005/0207605 A1 | 9/2005 | Dehe |
| 2005/0281423 A1 | 12/2005 | Armstrong |
| 2005/0283369 A1 | 12/2005 | Clauser et al. |
| 2005/0288057 A1 | 12/2005 | Lai et al. |
| 2006/0018496 A1 | 1/2006 | Niederdrank et al. |
| 2006/0064037 A1 | 3/2006 | Shalon et al. |
| 2006/0067551 A1 | 3/2006 | Cartwright et al. |
| 2006/0083395 A1 | 4/2006 | Allen et al. |
| 2006/0092043 A1 | 5/2006 | Lagassey |
| 2006/0116175 A1 | 6/2006 | Chu |
| 2006/0120545 A1 | 6/2006 | Rasmussen |
| 2006/0153394 A1 | 7/2006 | Beasley |
| 2006/0167687 A1 | 7/2006 | Kates |
| 2006/0173563 A1 | 8/2006 | Borovitski |
| 2006/0182287 A1 | 8/2006 | Schulein |
| 2006/0182295 A1 | 8/2006 | Dijkstra et al. |
| 2006/0188105 A1 | 8/2006 | Baskerville et al. |
| 2006/0195322 A1 | 8/2006 | Broussard et al. |
| 2006/0204014 A1 | 9/2006 | Iseberg et al. |
| 2006/0223547 A1 | 10/2006 | Chin et al. |
| 2006/0241948 A1 | 10/2006 | Abrash et al. |
| 2006/0262944 A1 | 11/2006 | Rasmussen et al. |
| 2006/0287014 A1 | 12/2006 | Matsuura |
| 2007/0014423 A1 | 1/2007 | Darbut et al. |
| 2007/0021148 A1 | 1/2007 | Mahini |
| 2007/0021958 A1 | 1/2007 | Msser et al. |
| 2007/0027676 A1 | 2/2007 | Chambers et al. |
| 2007/0041589 A1 | 2/2007 | Patel et al. |
| 2007/0043563 A1 | 2/2007 | Comerford et al. |
| 2007/0086600 A1 | 4/2007 | Boesen |
| 2007/0127660 A1 | 6/2007 | Roberts et al. |
| 2007/0143820 A1 | 6/2007 | Pawlowski |
| 2007/0172087 A1 | 7/2007 | Olsen |
| 2007/0177743 A1 | 8/2007 | Mertens |
| 2007/0189544 A1 | 8/2007 | Rosenberg |
| 2007/0201705 A1 | 8/2007 | Dorogusker et al. |
| 2007/0223717 A1 | 9/2007 | Boersma |
| 2007/0281744 A1 | 12/2007 | Andreasson |
| 2007/0291953 A1 | 12/2007 | Ngia et al. |
| 2008/0037801 A1 | 2/2008 | Alves et al. |
| 2008/0079571 A1 | 4/2008 | Samadani |
| 2008/0089530 A1 | 4/2008 | Bostick et al. |
| 2008/0091421 A1 | 4/2008 | Gustavsson |
| 2008/0107297 A1 | 5/2008 | Fischer et al. |
| 2008/0129520 A1 | 6/2008 | Lee |
| 2008/0162133 A1 | 7/2008 | Couper et al. |
| 2008/0165988 A1 | 7/2008 | Terlizzi et al. |
| 2008/0175411 A1 | 7/2008 | Greve |
| 2008/0181419 A1 | 7/2008 | Goldstein et al. |
| 2008/0240458 A1 | 10/2008 | Goldstein et al. |
| 2009/0010456 A1 | 1/2009 | Goldstein et al. |
| 2009/0024234 A1 | 1/2009 | Archibald |
| 2009/0076821 A1 | 3/2009 | Brenner |
| 2009/0286515 A1 | 11/2009 | Othmer |
| 2010/0061564 A1 | 3/2010 | Clemow et al. |
| 2010/0119077 A1 | 5/2010 | Platz et al. |
| 2010/0296668 A1 | 11/2010 | Lee et al. |
| 2010/0328224 A1 | 12/2010 | Kerr et al. |
| 2011/0026724 A1 | 2/2011 | Doclo |
| 2011/0055256 A1 | 3/2011 | Phillips |
| 2011/0096939 A1 | 4/2011 | Ichimura |
| 2011/0187640 A1 | 8/2011 | Jacobsen et al. |
| 2011/0264447 A1 | 10/2011 | Msser et al. |
| 2011/0293103 A1 | 12/2011 | Park et al. |
| 2011/0299695 A1 | 12/2011 | Nicholson |
| 2013/0219345 A1 | 8/2013 | Saukko et al. |
| 2014/0122092 A1 | 5/2014 | Goldstein |
| 2014/0126748 A1 | 5/2014 | Usher et al. |
| 2014/0166122 A1 | 6/2014 | Goldstein et al. |
| 2014/0270200 A1 | 9/2014 | Usher et al. |
| 2015/0170645 A1 | 6/2015 | Di et al. |
| 2015/0195641 A1 | 7/2015 | Di et al. |
| 2015/0215701 A1 | 7/2015 | Usher |
| 2016/0019024 A1 | 1/2016 | Suzuki et al. |
| 2016/0058378 A1 | 3/2016 | Wisby et al. |
| 2016/0104452 A1 | 4/2016 | Guan et al. |
| 2016/0249128 A1 | 8/2016 | Goldstein |
| 2018/0115818 A1 | 4/2018 | Asada et al. |
| 2018/0160211 A1 | 6/2018 | Kirsch et al. |
| 2020/0379717 A1 | 12/2020 | Mazur et al. |
| 2020/0380945 A1 | 12/2020 | Woodruff et al. |

FOREIGN PATENT DOCUMENTS

| | | | | |
|---|---|---|---|---|
| EP | 1519625 A2 | 3/2005 | |
| EP | 1640972 A1 | 3/2006 | |
| JP | 2002-204500 A | 7/2002 | |
| WO | 01/89083 A1 | 11/2001 | |
| WO | 2006/036262 A2 | 4/2006 | |
| WO | 2006/037156 A1 | 4/2006 | |
| WO | 2006/097099 A1 | 9/2006 | |
| WO | 2007/073818 A1 | 7/2007 | |
| WO | WO-2008008730 A2 * | 1/2008 | ............ G06F 16/60 |
| WO | 2008/067454 A2 | 6/2008 | |
| WO | 2009/023633 A1 | 2/2009 | |

OTHER PUBLICATIONS

Nov. 3, 2022 [16] Notice of Deposition of David Kleinschmidt, Exhibit—16, Filed on Nov. 3, 2022—Cited in IPR2022-00282, challenging U.S. Pat. No. 8,315,400.

Aarts, Exhibit—1015, Filed on Jan. 14, 2022—Cited in IPR2022-00410, challenging U.S. Pat. No. 10,979,836.

Adaptive Filtering (Dentino), Exhibit - 1012, Filed on 12/10/2021-Cited in IPR2022-00282, challenging U.S. Pat. No. 8,315,400.

Adaptive Filtering Algorithims (Diniz), Exhibit—1013, Filed on Dec. 10, 2021—Cited in IPR2022-00282, challenging U.S. Pat. No. 8,315,400.

Adaptive Noise Cancelling (Widrow), Exhibit—1011, Filed on Dec. 10, 2021—Cited in IPR2022-00282, challenging U.S. Pat. No. 8,315,400.

AirPods (1st generation)—Technical Specifications, Exhibit—2009, Filed on Sep. 13, 2022—Cited in IPR2022-00243, challenging U.S. Pat. No. 8,111,839.

Amended Complaint, *Techiya* v. *Samsung*, E.D. Tex., Exhibit—1014, Filed on Jan. 14, 2022—Cited in IPR2022-00410, challenging U.S. Pat. No. 10,979,836.

Amended Complaint, *Techiya* v. *Samsung*, E.D. Tex., Exhibit—1014, Filed on Dec. 21, 2021—Cited in IPR2022-00302, challenging U.S. Pat. No. 9,609,424.

Amended Complaint, *Techiya* v. *Samsung*, E.D. Tex., Exhibit—1017, Filed on Jan. 4, 2022—Cited in IPR2022-00388, challenging U.S. Pat. No. 10,966,015.

Amended Complaint, *Techiya* v. *Samsung*, E.D. Tex., Exhibit—1017, Filed on Dec. 30, 2021—Cited in IPR2022-00369, challenging U.S. Pat. No. 10,405,082.

Amended Docket Control Order, DN 156 from E.D. Tex. 21-cv-00413, Exhibit—1029, Filed on Nov. 15, 2022—Cited in IPR2022-01098, challenging U.S. Pat. No. 11,217,237.

Amended Docket Control Order, DN 156 from E.D. Tex., Exhibit—1023, Filed on Nov. 10, 2022—Cited in IPR2022-01099, challenging U.S. Pat. No. 11,244,666.

Amended Docket Control Order, DN 156 from E.D. Tex., Exhibit—1026, Filed on Nov. 10, 2022—Cited in IPR2022-01078, challenging U.S. Pat. No. 11,057,701.

(56) References Cited

OTHER PUBLICATIONS

Amended Docket Control Order, DN 156 from E.D. Tex., Exhibit—1032, Filed on Nov. 10, 2022—Cited in IPR2022-01106, challenging U.S. Pat. No. 11,039,259.
Amended Notice of Deposition of Les E. Atlas, Ph.D., Exhibit—15, Filed on Mar. 14, 2023—Cited in IPR2022-01106, challenging U.S. Pat. No. 11,039,259.
Amendment in U.S. Appl. No. 11/616,973, dated Apr. 13, 2015, Exhibit—2009, Filed on Oct. 11, 2022—Cited in IPR2022-01106, challenging U.S. Pat. No. 11,039,259.
Anderson Declaration ISO MSJ of No Infringement of '259 Patent, Exhibit—2019, Filed on Aug. 14, 2023—Cited in IPR2022-01106, challenging U.S. Pat. No. 11,039,259.
Anderson Non-Infringement Report (excerpt, redacted), Exhibit—2020, Filed on Aug. 14, 2023—Cited in IPR2022-01106, challenging U.S. Pat. No. 11,039,259.
Anderson Rebuttal Report (Redacted, Excerpt), Exhibit—2017, Filed on Apr. 10, 2023—Cited in IPR2022-01106, challenging U.S. Pat. No. 11,039,259.
Android Central, The History of True Wireless Earbuds, Exhibit—2009, Filed on Oct. 17, 2022—Cited in IPR2022-00324, challenging U.S. Pat. No. 8,254,591.
Android Central, The History of True Wireless Earbuds, Exhibit—2011, Filed on Sep. 13, 2022—Cited in IPR2022-00243, challenging U.S. Pat. No. 8,111,839.
C.V. of Richard Stern, Ph.D., Exhibit—1003, Filed on Jan. 4, 2022—Cited in IPR2022-00388, challenging U.S. Pat. No. 10,966,015.
C.V. of Richard Stern, Ph.D., Exhibit—1003, Filed on Dec. 10, 2021—Cited in IPR2022-00282, challenging U.S. Pat. No. 8,315,400.
CDC, What Noises Cause Hearing Loss?, Exhibit—2009, Filed on Sep. 13, 2022—Cited in IPR2022-00242, challenging U.S. Pat. No. 8,111,839.
Christopher J. Struck CV, Exhibit—2002, Filed on Apr. 13, 2022—Cited in IPR2022-00302, challenging U.S. Pat. No. 9,609,424.
Claim Construction Order, Exhibit—2008, Filed on Feb. 22, 2023—Cited in IPR2022-00253, challenging U.S. Pat. No. 9,491,542.
Claim Construction Order, Exhibit—2008, Filed on Apr. 18, 2023—Cited in IPR2022-00281, challenging U.S. Pat. No. 9,270,244.
Claim Construction Order, Exhibit—2013, Filed on Apr. 10, 2023—Cited in IPR2022-01106, challenging U.S. Pat. No. 11,039,259.
Complaint, DN 1 from E.D. Tex. 21-cv-00413, Exhibit—1022, Filed on Nov. 10, 2022—Cited in IPR2022-01099, challenging U.S. Pat. No. 11,244,666.
Complaint, DN 1 from E.D. Tex. 21-cv-00413, Exhibit—1025, Filed on Nov. 10, 2022—Cited in IPR2022-01078, challenging U.S. Pat. No. 11,057,701.
Complaint, DN 1 from E.D. Tex. 21-cv-00413, Exhibit—1028, Filed on Nov. 15, 2022—Cited in IPR2022-01098, challenging U.S. Pat. No. 11,217,237.
Complaint, DN 1 from E.D. Tex. 21-cv-00413, Exhibit—1031, Filed on Nov. 10, 2022—Cited in IPR2022-01106, challenging U.S. Pat. No. 11,039,259.
Complaint, E.D. Tex. 22-53, Exhibit—1020, Filed on Jun. 14, 2022—Cited in IPR2022-00369, challenging U.S. Pat. No. 10,405,082.
Complaint, E.D. Tex. 22-53, Exhibit—1020, Filed on Jun. 14, 2022—Cited in IPR2022-00388, challenging U.S. Pat. No. 10,966,015.
Complaint, E.D. Tex. 22-53, Exhibit—1021, Filed on Jun. 14, 2022—Cited in IPR2022-00410, challenging U.S. Pat. No. 10,979,836.
Complaint, E.D. Tex., 22-cv-53, Exhibit—1024, Filed on May 10, 2022—Cited in IPR2022-00302, challenging U.S. Pat. No. 9,609,424.
Complaint, E.D. Tex., 22-cv-53, Exhibit—1032, Filed on May 11, 2022—Cited in IPR2022-00324, challenging U.S. Pat. No. 8,254,591.
Complaint, *Techiya* v. *Samsung*, E.D. Tex., Exhibit—1008, Filed on Jan. 14, 2022—Cited in IPR2022-00410, challenging U.S. Pat. No. 10,979,836.
Complaint, *Techiya* v. *Samsung*, E.D. Tex., Exhibit—1008, Filed on Dec. 21, 2021—Cited in IPR2022-00302, challenging U.S. Pat. No. 9,609,424.
Consolidation Order, E.D. Tex. 21-413 & 22-53, Exhibit—1021, Filed on 6/14/2022—Cited in IPR2022-00369, challenging U.S. Pat. No. 10,405,082.
Consolidation Order, E.D. Tex. 21-413 & 22-53, Exhibit—1021, Filed on Jun. 14, 2022—Cited in IPR2022-00388, challenging U.S. Pat. No. 10,966,015.
Consolidation Order, E.D. Tex. 21-413 & 22-53, Exhibit—1022, Filed on Jun. 14, 2022—Cited in IPR2022-00410, challenging U.S. Pat. No. 10,979,836.
Consolidation Order, E.D. Tex., Exhibit—1025, Filed on May 10, 2022—Cited in IPR2022-00302, challenging U.S. Pat. No. 9,609,424.
Consolidation Order, E.D. Tex., Exhibit—1033, Filed on May 11, 2022—Cited in IPR2022-00324, challenging U.S. Pat. No. 8,254,591.
Corrected Declaration of Richard Stern, Ph.D., Exhibit—1002, Filed on Jan. 4, 2022—Cited in IPR2022-00388, challenging U.S. Pat. No. 10,966,015.
Corrected Declaration of Richard Stern, Ph.D., Exhibit—1002, Filed on Dec. 10, 2021—Cited in IPR2022-00282, challenging U.S. Pat. No. 8,315,400.
Corrected Petition for Inter Partes Review of U.S. Pat. No. 8,111,839, Exhibit—11, Filed on Feb. 3, 2022—Cited in IPR2022-00243, challenging U.S. Pat. No. 8,111,839.
Corrected Petition for Inter Partes Review of U.S. Pat. No. 8,111,839, Exhibit—12, Filed on Feb. 3, 2022—Cited in IPR2022-00242, challenging U.S. Pat. No. 8,111,839.
Corrected Petition for IPR of U.S. Pat. No. 8,315,400, Exhibit—4, Filed on Dec. 10, 2021—Cited in IPR2022-00282, challenging U.S. Pat. No. 8,315,400.
Curriculum Vitae of Christopher J. Struck, Exhibit—2002, Filed on Oct. 7, 2022—Cited in IPR2022-01078, challenging U.S. Pat. No. 11,057,701.
Curriculum Vitae of Christopher J. Struck, Exhibit—2002, Filed on Oct. 7, 2022—Cited in IPR2022-01098, challenging U.S. Pat. No. 11,217,237.
Curriculum Vitae of David Kleinschmidt, Exhibit—2002, Filed on Oct. 11, 2022—Cited in IPR2022-01106, challenging U.S. Pat. No. 11,039,259.
Curriculum Vitae of David Kleinschmidt, Exhibit—2002, Filed on Oct. 7, 2022—Cited in IPR2022-01099, challenging U.S. Pat. No. 11,244,666.
CV for Marshall Buck, Ph.D., Exhibit—2002, Filed on May 18, 2022—Cited in IPR2022-00369, challenging U.S. Pat. No. 10,405,082.
CV of Chris Kyriakakis, Ph.D., Exhibit—1003, Filed on Dec. 21, 2021—Cited in IPR2022-00302, challenging U.S. Pat. No. 9,609,424.
CV of Christopher J. Struck, Exhibit—2002, Filed on May 18, 2022—Cited in IPR2022-00410, challenging U.S. Pat. No. 10,979,836.
CV of Daniel P. Anagnos, Exhibit—2002, Filed on Mar. 23, 2022—Cited in IPR2022-00242, challenging U.S. Pat. No. 8,111,839.
CV of Daniel P. Anagnos, Exhibit—2002, Filed on Mar. 23, 2022—Cited in IPR2022-00243, challenging U.S. Pat. No. 8,111,839.
CV of Daniel P. Anagnos; Exhibit—2002, Filed on Mar. 21, 2022—Cited in IPR2022-00234, challenging U.S. Pat. No. 9,124,982.
CV of Dr. Chris Kyriakakis, Exhibit—1003, Filed on Jan. 14, 2022—Cited in IPR2022-00410, challenging U.S. Pat. No. 10,979,836.
CV of Les E. Atlas, Ph.D., Exhibit—1003, Filed on Dec. 20, 2021—Cited in IPR2022-00324, challenging U.S. Pat. No. 8,254,591.
CV of Les E. Atlas, Ph.D., Exhibit—1004, Filed on Dec. 13, 2021—Cited in IPR2022-00242, challenging U.S. Pat. No. 8,111,839.
CV of Les E. Atlas, Ph.D., Exhibit—1004, Filed on Dec. 13, 2021—Cited in IPR2022-00243, challenging U.S. Pat. No. 8,111,839.
CV of Marshall Buck, Ph.D., Exhibit—2002, Filed on May 18, 2022—Cited in IPR2022-00388, challenging U.S. Pat. No. 10,966,015.
CV of Nathaniel Polish, Ph.D., Exhibit—1003, Filed on Dec. 17, 2021—Cited in IPR2022-00253, challenging U.S. Pat. No. 9,491,542.
CV of Nathaniel Polish, Ph.D., Exhibit—1003, Filed on Dec. 21, 2021—Cited in IPR2022-00281, challenging U.S. Pat. No. 9,270,244.
CV of of Les E. Atlas, Ph.D—.; Exhibit—1003, Filed on Dec. 13, 2021—Cited in IPR2022-00234, challenging U.S. Pat. No. 9124982.
CV of Richard Stern, Ph.D., Exhibit—1003, Filed on Dec. 30, 2021—Cited in IPR2022-00369, challenging U.S. Pat. No. 10,405,082.
Daniel P. Anagnos CV, Exhibit—2002, Filed on Apr. 13, 2022—Cited in IPR2022-00324, challenging U.S. Pat. No. 8,254,591.

(56) References Cited

OTHER PUBLICATIONS

David Kleinschmidt CV, Exhibit—2002, Filed on Mar. 21, 2022—Cited in IPR2022-00282, challenging U.S. Pat. No. 8,315,400.
David Kleinschmidt CV, Exhibit—2002, Filed on Apr. 18, 2022—Cited in IPR2022-00253, challenging U.S. Pat. No. 9,491,542.
David Kleinschmidt CV, Exhibit—2002, Filed on Apr. 18, 2022—Cited in IPR2022-00281, challenging U.S. Pat. No. 9,270,244.
Decision Denying Institution of Inter Partes Review 35 U.S.C. § 314, Exhibit—10, Filed on Jan. 3, 2023—Cited in IPR2022-01099, challenging U.S. Pat. No. 11,244,666.
Decision Denying Institution of Inter Partes Review 35 U.S.C. § 314, Exhibit—11, Filed on Jan. 3, 2023—Cited in IPR2022-01098, challenging U.S. Pat. No. 11,217,237.
Decision Granting Institution of Inter Partes Review 35 U.S.C. sec 314, Exhibit—10, Filed on Dec. 29, 2022—Cited in IPR2022-01078, challenging U.S. Pat. No. 11,057,701.
Declaration of Chris Kyriakakis, Ph.D., Exhibit—1002, Filed on Dec. 21, 2021—Cited in IPR2022-00302, challenging U.S. Pat. No. 9,609,424.
Declaration of Christopher J. Struck in Support of Patent Owner's Preliminary Response, Exhibit—2001, Filed on Oct. 7, 2022—Cited in IPR2022-01078, challenging U.S. Pat. No. 11,057,701.
Declaration of Christopher J. Struck in Support of Patent Owner's Preliminary Response, Exhibit—2001, Filed on Oct. 7, 2022—Cited in IPR2022-01098, challenging U.S. Pat. No. 11,217,237.
Declaration of Christopher J. Struck in Support of Patent Owner's Preliminary Response, Exhibit—2001, Filed on Apr. 13, 2022—Cited in IPR2022-00302, challenging U.S. Pat. No. 9,609,424.
Declaration of Christopher J. Struck in Support of Patent Owner's Preliminary Response, Exhibit—2001, Filed on May 18, 2022—Cited in IPR2022-00410, challenging U.S. Pat. No. 10,979,836.
Declaration of Christopher J. Struck in Support of Patent Owner's Response, Exhibit—2006, Filed on Oct. 17, 2022—Cited in IPR2022-00302, challenging U.S. Pat. No. 9,609,424.
Declaration of Christopher Struck in Support of POR, Exhibit—2013, Filed on Mar. 23, 2023—Cited in IPR2022-01078, challenging U.S. Pat. No. 11,057,701.
Declaration of Daniel P. Anagnos in Support of Patent Owner Response; Exhibit—2006, Filed on Sep. 9, 2022—Cited in IPR2022-00234, challenging U.S. Pat. No. 9124982.
Declaration of Daniel P. Anagnos in Support of Patent Owner's Preliminary Response, Exhibit—2001, Filed on Apr. 13, 2022—Cited in IPR2022-00324, challenging U.S. Pat. No. 8,254,591.
Declaration of Daniel P. Anagnos in Support of Patent Owner's Response, Exhibit—2006, Filed on Oct. 17, 2022—Cited in IPR2022-00324, challenging U.S. Pat. No. 8,254,591.
Declaration of Daniel P. Anagnos in Support of Patent Owner's Response, Exhibit—2006, Filed on Sep. 13, 2022—Cited in IPR2022-00242, challenging U.S. Pat. No. 8,111,839.
Declaration of Daniel P. Anagnos in Support of Patent Owner's Response, Exhibit—2006, Filed on Sep. 13, 2022—Cited in IPR2022-00243, challenging U.S. Pat. No. 8,111,839.
Declaration of Daniel P. Anagnos, Exhibit—2001, Filed on Mar. 23, 2022—Cited in IPR2022-00242, challenging U.S. Pat. No. 8,111,839.
Declaration of Daniel P. Anagnos, Exhibit—2001, Filed on Mar. 23, 2022—Cited in IPR2022-00243, challenging U.S. Pat. No. 8,111,839.
Declaration of Daniel P. Anagnos; Exhibit—2001, Filed on Mar. 21, 2022—Cited in IPR2022-00234, challenging U.S. Pat. No. 9,124,982.
Declaration of David Kleinschmidt in Support of Patent Owner's Preliminary Response, Exhibit—2001, Filed on Oct. 11, 2022—Cited in IPR2022-01106, challenging U.S. Pat. No. 11,039,259.
Declaration of David Kleinschmidt in Support of Patent Owner's Preliminary Response, Exhibit—2001, Filed on Oct. 7, 2022—Cited in IPR2022-01099, challenging U.S. Pat. No. 11,244,666.
Declaration of David Kleinschmidt in Support of Patent Owner's Preliminary Response, Exhibit—2001, Filed on Mar. 21, 2022—Cited in IPR2022-00282, challenging U.S. Pat. No. 8,315,400.
Declaration of David Kleinschmidt in Support of Patent Owner's Preliminary Response, Exhibit—2001, Filed on Apr. 18, 2022—Cited in IPR2022-00253, challenging U.S. Pat. No. 9,491,542.
Declaration of David Kleinschmidt in Support of Patent Owner's Preliminary Response, Exhibit—2001, Filed on Apr. 18, 2022—Cited in IPR2022-00281, challenging U.S. Pat. No. 9,270,244.
Declaration of David Kleinschmidt in Support of Patent Owner's Response, Exhibit—2006, Filed on Oct. 19, 2022—Cited in IPR2022-00253, challenging U.S. Pat. No. 9,491,542.
Declaration of David Kleinschmidt in Support of Patent Owner's Response, Exhibit—2006, Filed on Oct. 19, 2022—Cited in IPR2022-00281, challenging U.S. Pat. No. 9,270,244.
Declaration of David Kleinschmidt in Support of Patent Owner's Response, Exhibit—2009, Filed on Sep. 9, 2022—Cited in IPR2022-00282, challenging U.S. Pat. No. 8,315,400.
Declaration of Dr. Chris Kyriakakis, Exhibit—1002, Filed on Jan. 14, 2022—Cited in IPR2022-00410, challenging U.S. Pat. No. 10,979,836.
Declaration of Dr. David Anderson Regarding Claim Construction dated Oct. 21, 2022, Exhibit—2011, Filed on Nov. 8, 2022—Cited in IPR2022-00388, challenging U.S. Pat. No. 10,966,015.
Declaration of Dr. Eric Tarr, Exhibit—2001, Filed on Dec. 6, 2024—Cited in IPR2024-00559, challenging U.S. Pat. No. 11,610,587.
Declaration of Les E. Atlas, Ph.D., Exhibit—1002, Filed on Dec. 13, 2021—Cited in IPR2022-00242, challenging U.S. Pat. No. 8,111,839.
Declaration of Les E. Atlas, Ph.D., Exhibit—1002, Filed on Dec. 20, 2021—Cited in IPR2022-00324, challenging U.S. Pat. No. 8,254,591.
Declaration of Les E. Atlas, Ph.D., Exhibit—1003, Filed on Dec. 13, 2021—Cited in IPR2022-00243, challenging U.S. Pat. No. 8,111,839.
Declaration of Les E. Atlas, Ph.D.; Exhibit—1002, Filed on Dec. 13, 2021—Cited in IPR2022-00234, challenging U.S. Pat. No. 9124982.
Declaration of Marshall Buck in Support of Patent Owner's Preliminary Response, Exhibit—2001, Filed on May 18, 2022—Cited in IPR2022-00369, challenging U.S. Pat. No. 10,405,082.
Declaration of Marshall Buck in Support of Patent Owner's Preliminary Response, Exhibit—2001, Filed on May 18, 2022—Cited in IPR2022-00388, challenging U.S. Pat. No. 10,966,015.
Declaration of Marshall D. Buck, Ph.D. in Support of Patent Owner Response, Exhibit—2008, Filed on Nov. 8, 2022—Cited in IPR2022-00369, challenging U.S. Pat. No. 10,405,082.
Declaration of Marshall D. Buck, Ph.D. in Support of Patent Owner's Response, Exhibit—2008, Filed on Nov. 8, 2022—Cited in IPR2022-00388, challenging U.S. Pat. No. 10,966,015.
Declaration of Nathaniel Polish, Ph.D., Exhibit—1002, Filed on Dec. 17, 2021—Cited in IPR2022-00253, challenging U.S. Pat. No. 9,491,542.
Declaration of Nathaniel Polish, Ph.D., Exhibit—1002, Filed on Dec. 21, 2021—Cited in IPR2022-00281, challenging U.S. Pat. No. 9,270,244.
Declaration of Richard Stern, Ph.D., Exhibit—1002, Filed on Dec. 10, 2021—Cited in IPR2022-00282, challenging U.S. Pat. No. 8,315,400.
Declaration of Richard Stern, Ph.D., Exhibit—1002, Filed on Dec. 30, 2021—Cited in IPR2022-00369, challenging U.S. Pat. No. 10,405,082.
Declaration of Roy Falik In Support of Motion for the Pro Hac Vice Admission, Exhibit—2001, Filed on Jul. 5, 2024—Cited in IPR2024-01003, challenging U.S. Pat. No. 9,191,083.
Declaration of Roy Falik In Support of Motion for the Pro Hac Vice Admission, Exhibit—2001, Filed on Jul. 5, 2024—Cited in IPR2024-01004, challenging U.S. Pat. No. 9,614,943.
Declaration of Roy Falik In Support of Motion for the Pro Hac Vice AdmissionExhibit2001, Jul. 5, 2024—Cited in IPR2024-01033, challenging U.S. Pat. No. 8,434,966.
Declaration of Roy Falik, Exhibit—2001, Filed on Jul. 18, 2024—Cited in IPR2024-01031, challenging U.S. Pat. No. 7,049,850.
Declaration of Roy Falik, Exhibit—2001, Filed on Jul. 18, 2024—Cited in IPR2024-01034, challenging U.S. Pat. No. 9,279,263.
Declaration of Scott Delman with attached exhibit, Exhibit—1024, Filed on Dec. 21, 2021—Cited in IPR2022-00281, challenging U.S. Pat. No. 9,270,244.
Deposition Transcript of David Kleinschmidt, dated Jun. 9, 2023, Exhibit—1034, Filed on Jun. 30, 2023—Cited in IPR2022-01106, challenging U.S. Pat. No. 11,039,259.

(56) References Cited

OTHER PUBLICATIONS

Determining All Challenged Claims Unpatentable 35 U.S.C. § 318(a), Exhibit—31, Filed on Aug. 11, 2023—Cited in IPR2022-00388, challenging U.S. Pat. No. 10,966,015.
Determining All Challenged Claims Unpatentable 35 U.S.C. § 318(a), Exhibit—32, Filed on Aug. 11, 2023—Cited in IPR2022-00369, challenging U.S. Pat. No. 10,405,082.
Determining All Challenged Claims Unpatentable 35 U.S.C. § 318(a), Exhibit—26, Filed on Nov. 13, 2023—Cited in IPR2022-01078, challenging U.S. Pat. No. 11,057,701.
Determining Some Challenged Claims Unpatentable 35 U.S.C. § 318(a), Exhibit—37, Filed on Jul. 7, 2023—Cited in IPR2022-00302, challenging U.S. Pat. No. 9,609,424.
Docket Control Order, E.D. Tex., Exhibit—1014, Filed on Apr. 20, 2022—Cited in IPR2022-00282, challenging U.S. Pat. No. 8,315,400.
Docket Control Order, E.D. Tex., Exhibit—1043, Filed on Apr. 20, 2022—Cited in IPR2022-00242, challenging U.S. Pat. No. 8,111,839.
Docket Control Order, E.D. Tex., Exhibit—1043, Filed on Apr. 20, 2022—Cited in IPR2022-00243, challenging U.S. Pat. No. 8,111,839.
Docket Control Order, E.D. Tex.; Exhibit—1033, Filed on Apr. 20, 2022—Cited in IPR2022-00234, challenging U.S. Pat. No. 9,124,982.
Edwards, The Future of Hearing Aid Technology, Exhibit—2008, Filed on Sep. 13, 2022—Cited in IPR2022-00243, challenging U.S. Pat. No. 8,111,839.
EX 1032—Protective Order (*Staton Techiya, LLC* v. *Samsung Electronics Co., Ltd*, 21-CV-00413-JRG-RSP), Exhibit—1032, Filed on Apr. 13, 2023- Cited in IPR2022-00302, challenging U.S. Pat. No. 9,609,424.
Ex 1045—Nov. 18, 2022, Deposition Transcript of Daniel P Anagnos, Exhibit—1045, Filed on Dec. 6, 2022—Cited in IPR2022-00242, challenging U.S. Pat. No. 8,111,839.
Ex 1045—Nov. 18, 2022, Deposition Transcript of Daniel P Anagnos, Exhibit—1045, Filed on Dec. 6, 2022—Cited in IPR2022-00243, challenging U.S. Pat. No. 8,111,839.
Ex 1046—Patent Owner's Response in IPR2022-00243, Paper 21, Exhibit—1046, Filed on Dec. 6, 2022—Cited in IPR2022-00242, challenging U.S. Pat. No. 8,111,839.
Ex 1047—Patent Owner Response for IPR2022-00234, Paper 17, Exhibit—1047, Filed on Dec. 6, 2022—Cited in IPR2022-00242, challenging U.S. Pat. No. 8,111,839.
Ex 1047—Patent Owner Response for IPR2022-00234, Paper 17, Exhibit—1047, Filed on Dec. 6, 2022—Cited in IPR2022-00243, challenging U.S. Pat. No. 8,111,839.
Ex 1048—Institution Decision for IPR2022-00234, Paper 12, Exhibit—1048, Filed on Dec. 6, 2022—Cited in IPR2022-00242, challenging U.S. Pat. No. 8,111,839.
Ex 1049—File History for 382 Patent, Exhibit—1049, Filed on Dec. 6, 2022—Cited in IPR2022-00242, challenging U.S. Pat. No. 8,111,839.
Ex 1053—Excerpts from The Authoritative Dictionary of IEEE Standards Terms, Exhibit—1053, Filed on 12/6/2022—Cited in IPR2022-00242, challenging U.S. Pat. No. 8,111,839.
Ex 1054—Supplemental Declaration of Les E Atlas PhD (Atlas-Supp), Exhibit—1054, Filed on Dec. 6, 2022—Cited in IPR2022-00243, challenging U.S. Pat. No. 8,111,839.
Ex. 1002—Declaration of Dr. Les Atlas, Ph.D., Exhibit—1002, Filed on Jun. 9, 2022—Cited in IPR2022-01106, challenging U.S. Pat. No. 11,039,259.
Ex. 1002—Declaration of Nathaniel Polish, Ph.D., Exhibit—1002, Filed on Jun. 9, 2022—Cited in IPR2022-01098, challenging U.S. Pat. No. 11,217,237.
Ex. 1002—Declaration of Nathaniel Polish, Ph.D., Exhibit—1002, Filed on Jun. 9, 2022—Cited in IPR2022-01099, challenging U.S. Pat. No. 11,244,666.
Ex. 1002—Kyriakakis DeclarationExhibit1002, Jun. 18, 2024—Cited in IPR2024-01033, challenging U.S. Pat. No. 8,434,966.
Ex. 1002 Declaration of Chris Kyriakakis, Exhibit—1002, Filed on Jul. 1, 2024—Cited in IPR2024-01034, challenging U.S. Pat. No. 9,279,263.
Ex. 1002 Declaration of Dr. Richard M. Stern, Exhibit—1002, Filed on Jun. 9, 2022—Cited in IPR2022-01078, challenging U.S. Pat. No. 11,057,701.
Ex. 1003—CV of Dr. Les Atlas, Ph.D., Exhibit—1003, Filed on Jun. 9, 2022—Cited in IPR2022-01106, challenging U.S. Pat. No. 11,039,259.
Ex. 1003—CV of Nathaniel Polish, Ph.D., Exhibit—1003, Filed on Jun. 9, 2022—Cited in IPR2022-01098, challenging U.S. Pat. No. 11,217,237.
Ex. 1003—CV of Nathaniel Polish, Ph.D., Exhibit—1003, Filed on Jun. 9, 2022—Cited in IPR2022-01099, challenging U.S. Pat. No. 11,244,666.
Ex. 1003—Kyriakakis CVExhibit1003, Jun. 18, 2024—Cited in IPR2024-01033, challenging U.S. Pat. No. 8,434,966.
Ex. 1003 Chris Kyriakakis CV, Exhibit—1003, Filed on Jul. 1, 2024—Cited in IPR2024-01034, challenging U.S. Pat. No. 9,279,263.
Ex. 1003 CV of Dr. Richard M. Stern, Exhibit—1003, Filed on Jun. 9, 2022—Cited in IPR2022-01078, challenging U.S. Pat. No. 11,057,701.
Ex. 1004—U.S. Appl. No. 16/571,973 File History for 259, Exhibit—1004, Filed on Jun. 9, 2022—Cited in IPR2022-01106, challenging U.S. Pat. No. 11,039,259.
Ex. 1004—File History for U.S. Pat. No. 11,750,965Exhibit1004, Jun. 18, 2024—Cited in IPR2024-01033, challenging U.S. Pat. No. 8,434,966.
Ex. 1004—File History of U.S. Appl. No. 11/217,237, Exhibit—1004, Filed on Jun. 9, 2022—Cited in IPR2022-01098, challenging U.S. Pat. No. 11,217,237.
Ex. 1004—File History of U.S. Appl. No. 11/244,666, Exhibit—1004, Filed on Jun. 9, 2022—Cited in IPR2022-01099, challenging U.S. Pat. No. 11,244,666.
Ex. 1004 File History for U.S. Pat. No. 11,665,493, Exhibit—1004, Filed on Jul. 1, 2024—Cited in IPR2024-01034, challenging U.S. Pat. No. 9,279,263.
Ex. 1004 File History of US Pat 11,057,701, Exhibit—1004, Filed on Jun. 9, 2022—Cited in IPR2022-01078, challenging U.S. Pat. No. 11,057,701.
Ex. 1005—U.S. Appl. No. 13/917,079 File History part 1 of 2, Exhibit—1005, Filed on Jun. 9, 2022—Cited in IPR2022-01106, challenging U.S. Pat. No. 11,039,259.
Ex. 1005—U.S. Appl. No. 13/917,079 File History part 2 of 2, Exhibit—1005, Filed on Jun. 9, 2022—Cited in IPR2022-01106, challenging U.S. Pat. No. 11,039,259.
Ex. 1005 U.S. Appl. No. 61/098,250, Exhibit—1005, Filed on Jul. 1, 2024—Cited in IPR2024-01034, challenging U.S. Pat. No. 9,279,263.
Ex. 1006—U.S. Appl. No. 12/555,570 File History, Exhibit—1006, Filed on Jun. 9, 2022—Cited in IPR2022-01106, challenging U.S. Pat. No. 11,039,259.
Ex. 1006 12115349 File History, Exhibit—1006, Filed on Jun. 9, 2022—Cited in IPR2022-01078, challenging U.S. Pat. No. 11,057,701.
Ex. 1006 Publication U.S. Appl. No. 12/555,864, Exhibit—1006, Filed on Jul. 1, 2024—Cited in IPR2024-01034, challenging U.S. Pat. No. 9,279,263.
Ex. 1007—U.S. Appl. No. 61/096,128 File History, Exhibit—1007, Filed on Jun. 9, 2022—Cited in IPR2022-01106, challenging U.S. Pat. No. 11,039,259.
Ex. 1007 60916271 File History, Exhibit—1007, Filed on Jun. 9, 2022—Cited in IPR2022-01078, challenging U.S. Pat. No. 11,057,701.
Ex. 1008—JP3353701B2 to Kondo with Translation, Exhibit—1008, Filed on Jun. 9, 2022—Cited in IPR2022-01098, challenging U.S. Pat. No. 11,217,237.
Ex. 1009 Translation of JPA 2002-204500 (Hayashi), Exhibit—1009, Filed on Jul. 1, 2024—Cited in IPR2024-01034, challenging U.S. Pat. No. 9,279,263.
Ex. 1010—Redline—965 versus parentExhibit1010, Jun. 18, 2024—Cited in IPR2024-01033, challenging U.S. Pat. No. 8,434,966.
Ex. 1012—Prov60893617Exhibit1012, Jun. 18, 2024—Cited in IPR2024-01033, challenging U.S. Pat. No. 8,434,966.
Ex. 1013—150139_14109987 NOA referred to in 965 NOAExhibit1013, Jun. 18, 2024—Cited in IPR2024-01033, challenging U.S. Pat. No. 8,434,966.

(56) References Cited

OTHER PUBLICATIONS

Ex. 1013 Deterministic Broad-Band Signal (Chu), Exhibit—1013, Filed on Jul. 1, 2024—Cited in IPR2024-01034, challenging U.S. Pat. No. 9,279,263.
Ex. 1013 IPR2022-00282 Patent Owner Preliminary Response, Exhibit—1013, Filed on Jun. 9, 2022—Cited in IPR2022-01078, challenging U.S. Pat. No. 11,057,701.
Ex. 1014—Mulgrew 2002, Exhibit—1014, Filed on Jun. 9, 2022—Cited in IPR2022-01099, challenging U.S. Pat. No. 11,244,666.
Ex. 1014—Redline—682 parent versus ultimate parent 812Exhibit1014, Jun. 18, 2024—Cited in IPR2024-01033, challenging U.S. Pat. No. 8,434,966.
Ex. 1014 701 Patent Family Tree, Exhibit—1014, Filed on Jun. 9, 2022—Cited in IPR2022-01078, challenging U.S. Pat. No. 11,057,701.
Ex. 1015—666 Family Tree, Exhibit—1015, Filed on Jun. 9, 2022—Cited in IPR2022-01099, challenging U.S. Pat. No. 11,244,666.
Ex. 1015—Letter re 965 IPR StipulationExhibit1015, Jun. 18, 2024—Cited in IPR2024-01033, challenging U.S. Pat. No. 8,434,966.
Ex. 1015 Complaint, E.D. Tex. 22-53, Exhibit—1015, Filed on Jun. 9, 2022—Cited in IPR2022-01078, challenging U.S. Pat. No. 11,057,701.
Ex. 1016—Complaint, E.D. Tex., 22-53, Exhibit—1016, Filed on Jun. 9, 2022—Cited in IPR2022-01099, challenging U.S. Pat. No. 11,244,666.
Ex. 1016 GSM 6.31, Exhibit—1016, Filed on Jun. 9, 2022—Cited in IPR2022-01078, challenging U.S. Pat. No. 11,057,701.
Ex. 1016 Reply Declaration of Richard Stern, PhD, Exhibit—1016, Filed on Dec. 2, 2022—Cited in IPR2022-00282, challenging U.S. Pat. No. 8,315,400.
Ex. 1017—Amended Complaint, E.D. Tex., 21-413, Exhibit—1017, Filed on Jun. 9, 2022—Cited in IPR2022-01099, challenging U.S. Pat. No. 11,244,666.
Ex. 1017—Rose 2003, Exhibit—1017, Filed on Jun. 9, 2022—Cited in IPR2022-01106, challenging U.S. Pat. No. 11,039,259.
Ex. 1017 David Kleinschmidt Depo Transcript, Exhibit—1017, Filed on Dec. 2, 2022—Cited in IPR2022-00282, challenging U.S. Pat. No. 8,315,400.
Ex. 1017 Final Rejection from U.S. Appl. No. 90/015,146, Exhibit—1017, Filed on Jul. 1, 2024—Cited in IPR2024-01034, challenging U.S. Pat. No. 9,279,263.
Ex. 1017 GSM 6.12, Exhibit—1017, Filed on Jun. 9, 2022—Cited in IPR2022-01078, challenging U.S. Pat. No. 11,057,701.
Ex. 1018—Confidential Settlement Agreement with Exhibits A-IExhibit1018, Dec. 11, 2024—Cited in IPR2024-01033, challenging U.S. Pat. No. 8,434,966. [Document not publicly available at PTAB].
Ex. 1018—Consolidation Order, E.D. Tex., 21-413 & 22-53, Exhibit—1018, Filed on Jun. 9, 2022—Cited in IPR2022-01099, challenging U.S. Pat. No. 11,244,666.
Ex. 1018 Consolidation Order, E.D. Tex. 21-413 & 22-53, Exhibit—1018, Filed on Jun. 9, 2022—Cited in IPR2022-01078, challenging U.S. Pat. No. 11,057,701.
Ex. 1018 Excerpts from Wiley Electrical & Electronics Engineering Dictionary, Exhibit—1018, Filed on Dec. 2, 2022—Cited in IPR2022-00282, challenging U.S. Pat. No. 8,315,400.
Ex. 1019 - Docket Control Order, E.D. Tex., 21-413, Exhibit—1019, Filed on Jun. 9, 2022—Cited in IPR2022-01099, challenging U.S. Pat. No. 11,244,666.
Ex. 1019—Duffner 2006, Exhibit—1019, Filed on Jun. 9, 2022—Cited in IPR2022-01098, challenging U.S. Pat. No. 11,217,237.
Ex. 1019 Docket Control Order, E.D. Tex. 21-413, Exhibit—1019, Filed on Jun. 9, 2022—Cited in IPR2022-01078, challenging U.S. Pat. No. 11,057,701.
Ex. 1019 Dual-Channel MLS-Based Test System (Schneider), Exhibit—1019, Filed on Jul. 1, 2024—Cited in IPR2024-01034, challenging U.S. Pat. No. 9,279,263.
Ex. 1020—Letter re IPR Stipulation, Exhibit—1020, Filed on Jun. 9, 2022—Cited in IPR2022-01099, challenging U.S. Pat. No. 11,244,666.
Ex. 1020 Letter re IPR Stipulation, Exhibit—1020, Filed on Jun. 9, 2022—Cited in IPR2022-01078, challenging U.S. Pat. No. 11,057,701.
Ex. 1021—Complaint. E.D. Tex., 22-00053, Exhibit—1021, Filed on Jun. 9, 2022—Cited in IPR2022-01098, challenging U.S. Pat. No. 11,217,237.
Ex. 1021—Hsu 2005, Exhibit—1021, Filed on Jun. 9, 2022—Cited in IPR2022-01106, challenging U.S. Pat. No. 11,039,259.
Ex. 1021—Stipulation Letter, Exhibit—1021, Filed on May 20, 2022—Cited in IPR2022-00253, challenging U.S. Pat. No. 9,491,542.
Ex. 1021 Amended Complaint, E.D. Tex. 21-413, Exhibit—1021, Filed on Jun. 9, 2022—Cited in IPR2022-01078, challenging U.S. Pat. No. 11,057,701.
Ex. 1021 Claim Construction Order, ED Tex, Exhibit—1021, Filed on Jul. 1, 2024—Cited in IPR2024-01034, challenging U.S. Pat. No. 9,279,263.
Ex. 1022—Amended Complaint, E.D.Tex., 21-00413, Exhibit—1022, Filed on Jun. 9, 2022—Cited in IPR2022-01098, challenging U.S. Pat. No. 11,217,237.
Ex. 1022—Complaint, E.D. Tex., Exhibit—1022, Filed on May 20, 2022—Cited in IPR2022-00253, challenging U.S. Pat. No. 9,491,542.
Ex. 1022 Letter to Techiya re 493 IPR Stipulation, Exhibit—1022, Filed on Jul. 1, 2024—Cited in IPR2024-01034, challenging U.S. Pat. No. 9,279,263.
Ex. 1023—Consolidation Order, E.D. Tex., Exhibit—1023, Filed on May 20, 2022—Cited in IPR2022-00253, challenging U.S. Pat. No. 9,491,542.
Ex. 1023—Consolidation Order, E.D.Tex., 21-00413 & 22-00053, Exhibit—1023, Filed on Jun. 9, 2022—Cited in IPR2022-01098, challenging U.S. Pat. No. 11,217,237.
Ex. 1023 Techiya Appeal Brief from Reexam U.S. Appl. No. 90/015,146, Exhibit—1023, Filed on Jul. 1, 2024—Cited in IPR2024-01034, challenging U.S. Pat. No. 9,279,263.
Ex. 1024—259 Family Tree, Exhibit—1024, Filed on Jun. 9, 2022—Cited in IPR2022-01106, challenging U.S. Pat. No. 11,039,259.
Ex. 1024—Docket Control Order, E.D. Tex., 21-00413, Exhibit—1024, Filed on Jun. 9, 2022—Cited in IPR2022-01098, challenging U.S. Pat. No. 11,217,237.
Ex. 1024 Judicial Caseload Profile, Exhibit—1024, Filed on Jul. 1, 2024—Cited in IPR2024-01034, challenging U.S. Pat. No. 9,279,263.
Ex. 1025—Complaint, E.D. Tex. 22-53, Exhibit—1025, Filed on Jun. 9, 2022—Cited in IPR2022-01106, challenging U.S. Pat. No. 11,039,259.
Ex. 1025—Letter re IPR Stipulation, Exhibit—1025, Filed on Jun. 9, 2022—Cited in IPR2022-01098, challenging U.S. Pat. No. 11,217,237.
Ex. 1025—Stipulation Letter, Exhibit—1025, Filed on May 27, 2022—Cited in IPR2022-00281, challenging U.S. Pat. No. 9,270,244.
Ex. 1026—237 Family Tree, Exhibit—1026, Filed on Jun. 9, 2022—Cited in IPR2022-01098, challenging U.S. Pat. No. 11,217,237.
Ex. 1026—Amended Complaint, E.D. Tex. 21-413, Exhibit—1026, Filed on Jun. 9, 2022—Cited in IPR2022-01106, challenging U.S. Pat. No. 11,039,259.
Ex. 1026—Complaint, E.D. Tex., Exhibit—1026, Filed on May 27, 2022—Cited in IPR2022-00281, challenging U.S. Pat. No. 9,270,244.
Ex. 1026—Confidential Settlement Agreement, Exhibit—1026, Filed on Dec. 9, 2024—Cited in IPR2024-01034, challenging U.S. Pat. No. 9,279,263. [Document not publicly available at PTAB].
Ex. 1027—Confidential Settlement Agreement with Exhibits A-I, Exhibit—1027, Filed on Dec. 11, 2024—Cited in IPR2024-01034, challenging U.S. Pat. No. 9,279,263. [Document not publicly available at PTAB].
Ex. 1027—Consolidation Order, E.D. Tex., Exhibit—1027, Filed on May 27, 2022—Cited in IPR2022-00281, challenging U.S. Pat. No. 9,270,244.
Ex. 1027—Docket Control Order, E.D. Tex. 21-413, Exhibit—1027, Filed on Jun. 9, 2022—Cited in IPR2022-01106, challenging U.S. Pat. No. 11,039,259.
Ex. 1027—Transcript of Deposition of Christopher Struck, Exhibit—1027, Filed on Jan. 10, 2023—Cited in IPR2022-00302, challenging U.S. Pat. No. 9,609,424.
Ex. 1028—Consolidation Order, E.D. Tex. 21-413 & 22-53, Exhibit—1028, Filed on Jun. 9, 2022—Cited in IPR2022-01106, challenging U.S. Pat. No. 11,039,259.

(56) References Cited

OTHER PUBLICATIONS

Ex. 1028—Errata Sheet for Deposition of Christopher Struck, Exhibit—1028, Filed on Jan. 10, 2023—Cited in IPR2022-00302, challenging U.S. Pat. No. 9,609,424.
Ex. 1029—Letter re IPR Stipulation, Exhibit—1029, Filed on Jun. 9, 2022—Cited in IPR2022-01106, challenging U.S. Pat. No. 11,039,259.
Ex. 1029—Patent Owner's Opening Claim Construction Brief, E.D. Tex., Exhibit—1029, Filed on Jan. 10, 2023—Cited in IPR2022-00302, challenging U.S. Pat. No. 9,609,424.
Ex. 1029 Petitioners' Oral Hearing Demonstratives, Exhibit—1029, Filed on Sep. 26, 2023—Cited in IPR2022-01078, challenging U.S. Pat. No. 11,057,701.
Ex. 1030—Petitioners' Oral Hearing Demonstratives, Exhibit—1030, Filed on Apr. 11, 2023—Cited in IPR2022-00302, challenging U.S. Pat. No. 9,609,424.
Ex. 1033—Confidential Deposition of Christopher Struck, E.D. Tex., Exhibit—1033, Filed on May 15, 2023—Cited in IPR2022-00302, challenging U.S. Pat. No. 9,609,424. [Document not publicly available at PTAB].
Ex. 1034—Redacted Deposition of Christopher Struck, E.D. Tex., Exhibit—1034, Filed on May 15, 2023—Cited in IPR2022-00302, challenging U.S. Pat. No. 9,609,424.
Ex. 1037—Petitioners' Oral Hearing Demonstratives, Exhibit—1037, Filed on Oct. 11, 2023—Cited in IPR2022-01106, challenging U.S. Pat. No. 11,039,259.
Ex. 3001, Exhibit—3001, Filed on Nov. 8, 2024—Cited in IPR2024-01003, challenging U.S. Pat. No. 9,191,083.
Ex. 3001, Exhibit—3001, Filed on Nov. 8, 2024—Cited in IPR2024-01004, challenging U.S. Pat. No. 9,614,943.
Ex. 3001, Exhibit—3001, Filed on Nov. 8, 2024—Cited in IPR2024-01031, challenging U.S. Pat. No. 7,049,850.
Ex. 3001, Exhibit—3001, Filed on Nov. 8, 2024—Cited in IPR2024-01033, challenging U.S. Pat. No. 8,434,966.
Ex. 3001, Exhibit—3001, Filed on Nov. 8, 2024—Cited in IPR2024-01034, challenging U.S. Pat. No. 9,279,263.
Ex. 3001, Exhibit—3001, Filed on Apr. 6, 2023—Cited in IPR2022-00388, challenging U.S. Pat. No. 10,966,015.
EX1002—Declaration of Christopher Schmandt, Exhibit—1002, Filed on Feb. 9, 2024—Cited in IPR2024-00559, challenging U.S. Pat. No. 11,610,587.
EX1002—Declaration of Nathaniel Polish, Exhibit—1002, Filed on Jun. 25, 2024—Cited in IPR2024-01031, challenging U.S. Pat. No. 7,049,850.
EX1002—Kyriakakis Declaration, Exhibit—1002, Filed on Jun. 12, 2024—Cited in IPR2024-01003, challenging U.S. Pat. No. 9,191,083.
EX1002—Kyriakakis Declaration, Exhibit—1002, Filed on Jun. 12, 2024—Cited in IPR2024-01004, challenging U.S. Pat. No. 9,614,943.
EX1003—Nathaniel Polish CV, Exhibit—1003, Filed on Jun. 25, 2024—Cited in IPR2024-01031, challenging U.S. Pat. No. 7,049,850.
EX1003—Kyriakakis CV, Exhibit—1003, Filed on Jun. 12, 2024—Cited in IPR2024-01003, challenging U.S. Pat. No. 9,191,083.
EX1003—Kyriakakis CV, Exhibit—1003, Filed on Jun. 12, 2024—Cited in IPR2024-01004, challenging U.S. Pat. No. 9,614,943.
EX1003—Schmandt CV, Exhibit—1003, Filed on Feb. 9, 2024—Cited in IPR2024-00559, challenging U.S. Pat. No. 11,610,587.
EX1004—File History for U.S. Pat. No. 11,659,315—Part 1 of 2, Exhibit—1004, Filed on Jun. 25, 2024—Cited in IPR2024-01031, challenging U.S. Pat. No. 7,049,850.
EX1004—File History for U.S. Pat. No. 11,659,315—Part 2 of 2, Exhibit—1004, Filed on Jun. 25, 2024—Cited in IPR2024-01031, challenging U.S. Pat. No. 7,049,850.
EX1004—File History for U.S. Pat. No. 11,710,473_Part 1 of 3, Exhibit—1004, Filed on Jun. 12, 2024—Cited in IPR2024-01003, challenging U.S. Pat. No. 9,191,083.
EX1004—File History for U.S. Pat. No. 11,710,473_Part 1 of 3, Exhibit—1004, Filed on Jun. 12, 2024—Cited in IPR2024-01004, challenging U.S. Pat. No. 9,614,943.
EX1004—File History for U.S. Pat. No. 11,710,473_Part 2 of 3, Exhibit—1004, Filed on Jun. 12, 2024—Cited in IPR2024-01003, challenging U.S. Pat. No. 9,191,083.
EX1004—File History for U.S. Pat. No. 11,710,473_Part 2 of 3, Exhibit—1004, Filed on Jun. 12, 2024—Cited in IPR2024-01004, challenging U.S. Pat. No. 9,614,943.
EX1004—File History for U.S. Pat. No. 11,710,473_Part 3 of 3, Exhibit—1004, Filed on Jun. 12, 2024—Cited in IPR2024-01003, challenging U.S. Pat. No. 9,191,083.
EX1004—File History for U.S. Pat. No. 11,710,473_Part 3 of 3, Exhibit—1004, Filed on Jun. 12, 2024—Cited in IPR2024-01004, challenging U.S. Pat. No. 9,614,943.
EX1004—USFH11610587 Part 1 of 2, Exhibit—1004, Filed on Feb. 9, 2024—Cited in IPR2024-00559, challenging U.S. Pat. No. 11,610,587.
EX1004—USFH11610587 Part 2 of 2, Exhibit—1004, Filed on Feb. 9, 2024—Cited in IPR2024-00559, challenging U.S. Pat. No. 11,610,587.
EX1005—U.S. Appl. No. 60/885,917, Exhibit—1005, Filed on Jun. 12, 2024—Cited in IPR2024-01003, challenging U.S. Pat. No. 9,191,083.
EX1005—U.S. Appl. No. 60/885,917, Exhibit—1005, Filed on Jun. 12, 2024—Cited in IPR2024-01004, challenging U.S. Pat. No. 9,614,943.
EX1005—USSN 61_737,932 Provisional, Exhibit—1005, Filed on Jun. 25, 2024—Cited in IPR2024-01031, challenging U.S. Pat. No. 7,049,850.
EX1005—U.S. Appl. No. 61/098,914 (Provisional Application), Exhibit—1005, Filed on Feb. 9, 2024—Cited in IPR2024-00559, challenging U.S. Pat. No. 11,610,587.
EX1006—U.S. Appl. No. 16/266,829 (829 App), Exhibit—1006, Filed on Jun. 25, 2024—Cited in IPR2024-01031, challenging U.S. Pat. No. 7,049,850.
EX1006—U.S. Appl. No. 17/321,892, Exhibit—1006, Filed on Jun. 12, 2024—Cited in IPR2024-01003, challenging U.S. Pat. No. 9,191,083.
EX1006—U.S. Appl. No. 17/321,892, Exhibit—1006, Filed on Jun. 12, 2024—Cited in IPR2024-01004, challenging U.S. Pat. No. 9,614,943.
EX1006—U.S. Appl. No. 17/203,731, Exhibit—1006, Filed on Feb. 9, 2024—Cited in IPR2024-00559, challenging U.S. Pat. No. 11,610,587.
EX1007—315 Patent Family Tree, Exhibit—1007, Filed on Jun. 25, 2024—Cited in IPR2024-01031, challenging U.S. Pat. No. 7,049,850.
EX1008—Docket Control Order, Exhibit—1008, Filed on Jun. 25, 2024—Cited in IPR2024-01031, challenging U.S. Pat. No. 7,049,850.
EX1008—File History for U.S. Pat. No. 11,244,666, Exhibit—1008, Filed on Jun. 12, 2024—Cited in IPR2024-01003, challenging U.S. Pat. No. 9,191,083.
EX1008—File History for U.S. Pat. No. 11,244,666, Exhibit—1008, Filed on Jun. 12, 2024—Cited in IPR2024-01004, challenging U.S. Pat. No. 9,614,943.
EX1009—Letter from Nikhil Krishnan to Thomas J. Friel, Jr., Exhibit—1009, Filed on Jun. 25, 2024—Cited in IPR2024-01031, challenging U.S. Pat. No. 7,049,850.
EX1009—U.S. Appl. No. 90/019,169 RE of U.S. Pat. No. 11,244,666_Part 1 of 5, Exhibit—1009, Filed on Jun. 12, 2024—Cited in IPR2024-01003, challenging U.S. Pat. No. 9,191,083.
EX1009—U.S. Appl. No. 90/019,169 RE of U.S. Pat. No. 11,244,666_Part 1 of 5, Exhibit—1009, Filed on Jun. 12, 2024—Cited in IPR2024-01004, challenging U.S. Pat. No. 9,614,943.
EX1009—U.S. Appl. No. 90/019,169 RE of U.S. Pat. No. 11,244,666_Part 2 of 5, Exhibit—1009, Filed on Jun. 12, 2024—Cited in IPR2024-01003, challenging U.S. Pat. No. 9,191,083.
EX1009—U.S. Appl. No. 90/019,169 RE of U.S. Pat. No. 11,244,666_Part 2 of 5, Exhibit—1009, Filed on Jun. 12, 2024—Cited in IPR2024-01004, challenging U.S. Pat. No. 9,614,943.
EX1009—U.S. Appl. No. 90/019,169 RE of U.S. Pat. No. 11,244,666_Part 3 of 5, Exhibit—1009, Filed on Jun. 12, 2024—Cited in IPR2024-01003, challenging U.S. Pat. No. 9,191,083.
EX1009—U.S. Appl. No. 90/019,169 RE of U.S. Pat. No. 11,244,666_Part 3 of 5, Exhibit—1009, Filed on Jun. 12, 2024—Cited in IPR2024-01004, challenging U.S. Pat. No. 9,614,943.

(56) References Cited

OTHER PUBLICATIONS

EX1009—U.S. Appl. No. 90/019,169 RE of U.S. Pat. No. 11,244,666_ Part 4 of 5, Exhibit—1009, Filed on Jun. 12, 2024—Cited in IPR2024-01003, challenging U.S. Pat. No. 9,191,083.
EX1009—U.S. Appl. No. 90/019,169 RE of U.S. Pat. No. 11,244,666_ Part 4 of 5, Exhibit—1009, Filed on Jun. 12, 2024—Cited in IPR2024-01004, challenging U.S. Pat. No. 9,614,943.
EX1009—U.S. Appl. No. 90/019,169 RE of U.S. Pat. No. 11,244,666_ Part 5 of 5, Exhibit—1009, Filed on Jun. 12, 2024—Cited in IPR2024-01003, challenging U.S. Pat. No. 9,191,083.
EX1009—U.S. Appl. No. 90/019,169 RE of U.S. Pat. No. 11,244,666_ Part 5 of 5, Exhibit—1009, Filed on Jun. 12, 2024—Cited in IPR2024-01004, challenging U.S. Pat. No. 9,614,943.
EX1010—473 Patent Family Tree, Exhibit—1010, Filed on Jun. 12, 2024—Cited in IPR2024-01003, challenging U.S. Pat. No. 9,191,083.
EX1010—473 Patent Family Tree, Exhibit—1010, Filed on Jun. 12, 2024—Cited in IPR2024-01004, challenging U.S. Pat. No. 9,614,943.
EX1011—Claim Construction Order, ED Tex, Exhibit—1011, Filed on Jun. 12, 2024—Cited in IPR2024-01003, challenging U.S. Pat. No. 9,191,083.
EX1011—Claim Construction Order, ED Tex, Exhibit—1011, Filed on Jun. 12, 2024—Cited in IPR2024-01004, challenging U.S. Pat. No. 9,614,943.
EX1012—Docket Control Order, ED Tex, Exhibit—1012, Filed on Jun. 12, 2024—Cited in IPR2024-01003, challenging U.S. Pat. No. 9,191,083.
EX1012—Docket Control Order, ED Tex, Exhibit—1012, Filed on Jun. 12, 2024—Cited in IPR2024-01004, challenging U.S. Pat. No. 9,614,943.
EX1013—Letter from Nikhil Krishnan to Thomas J Friel, Jr, Exhibit—1013, Filed on Jun. 12, 2024—Cited in IPR2024-01003, challenging U.S. Pat. No. 9,191,083.
EX1013—Letter from Nikhil Krishnan to Thomas J Friel, Jr, Exhibit—1013, Filed on Jun. 12, 2024—Cited in IPR2024-01004, challenging U.S. Pat. No. 9,614,943.
EX1016—Stay Order from E.D. Tex. Exhibit1016, Nov. 20, 2024—Cited in IPR2024-01033, challenging U.S. Pat. No. 8,434,966.
EX1019—U.S. Appl. No. 60/841,990 (Rosenberg Provisional) (annotated), Exhibit—1019, Filed on Jun. 12, 2024—Cited in IPR2024-01003, challenging U.S. Pat. No. 9,191,083.
EX1023—Preliminary Constructions, E.D. Tex., Exhibit—1023, Filed on Jan. 31, 2023—Cited in IPR2022-00369, challenging U.S. Pat. No. 10,405,082.
EX1023—Preliminary Constructions, E.D. Tex., Exhibit—1023, Filed on Jan. 31, 2023—Cited in IPR2022-00388, challenging U.S. Pat. No. 10,966,015.
EX1024—Cohen, Exhibit—1024, Filed on Feb. 9, 2024—Cited in IPR2024-00559, challenging U.S. Pat. No. 11,610,587.
EX1024—Transcript of Deposition of Marshall Buck, Exhibit—1024, Filed on Jan. 31, 2023—Cited in IPR2022-00369, challenging U.S. Pat. No. 10,405,082.
EX1024—Transcript of Deposition of Marshall Buck, Exhibit—1024, Filed on Jan. 31, 2023—Cited in IPR2022-00388, challenging U.S. Pat. No. 10,966,015.
EX1025—Blattner et al., Earcons and Icons, Exhibit—1025, Filed on Jun. 25, 2024—Cited in IPR2024-01031, challenging U.S. Pat. No. 7,049,850.
Ex1025—Deposition Transcript of David Kleinschmidt, Exhibit—1025, Filed on Jan. 11, 2023—Cited in IPR2022-00253, challenging U.S. Pat. No. 9,491,542.
EX1025—Stay Order from E.D. Tex., Exhibit—1025, Filed on Nov. 20, 2024—Cited in IPR2024-01034, challenging U.S. Pat. No. 9,279,263.
EX1025—Tanenbaum, Exhibit—1025, Filed on Feb. 9, 2024—Cited in IPR2024-00559, challenging U.S. Pat. No. 11,610,587.
EX1025 Petitioners' Oral Hearing Demonstratives, Exhibit—1025, Filed on May 9, 2023—Cited in IPR2022-00369, challenging U.S. Pat. No. 10,405,082.
EX1025 Petitioners' Oral Hearing Demonstratives, Exhibit—1025, Filed on May 9, 2023—Cited in IPR2022-00388, challenging U.S. Pat. No. 10,966,015.
Ex1026—Cessation from Merriam-Webster's Collegiate Dictionary, 10th Ed, Exhibit—1026, Filed on Jan. 11, 2023—Cited in IPR2022-00253, challenging U.S. Pat. No. 9,491,542.
EX1026—Computer Dictionary 2nd Ed, Exhibit—1026, Filed on Feb. 9, 2024—Cited in IPR2024-00559, challenging U.S. Pat. No. 11,610,587.
Ex1027—Cessation from New World Dictionary, 2d College Ed, Exhibit—1027, Filed on Jan. 11, 2023—Cited in IPR2022-00253, challenging U.S. Pat. No. 9,491,542.
EX1028—Basu, Exhibit—1028, Filed on Jun. 12, 2024—Cited in IPR2024-01003, challenging U.S. Pat. No. 9,191,083.
EX1028—Basu, Smart Headphones, Exhibit—1028, Filed on Jun. 12, 2024—Cited in IPR2024-01004, challenging U.S. Pat. No. 9,614,943.
Ex1028—Supplemental Declaration of Nathanial Polish, Ph.D., Exhibit—1028, Filed on Jan. 11, 2023—Cited in IPR2022-00253, challenging U.S. Pat. No. 9,491,542.
EX1029—Declaration of Nathanial Polish, Exhibit—1029, Filed on Jan. 11, 2023—Cited in IPR2022-00281, challenging U.S. Pat. No. 9,270,244.
EX1029—Mueller, Transparent Hearing, Exhibit—1029, Filed on Jun. 12, 2024—Cited in IPR2024-01003, challenging U.S. Pat. No. 9,191,083.
EX1029—Mueller, Transparent Hearing, Exhibit—1029, Filed on Jun. 12, 2024—Cited in IPR2024-01004, challenging U.S. Pat. No. 9,614,943.
EX1030—Deposition Transcript of David Kleinschmidt, Exhibit—1030, Filed on Jan. 11, 2023—Cited in IPR2022-00281, challenging U.S. Pat. No. 9,270,244.
EX1031—587 Patent Family Tree, Exhibit—1031, Filed on Feb. 9, 2024—Cited in IPR2024-00559, challenging U.S. Pat. No. 11,610,587.
EX1031—Basu, et al., Smart Headphones, Exhibit—1031, Filed on Jun. 25, 2024—Cited in IPR2024-01031, challenging U.S. Pat. No. 7,049,850.
EX1031—Cessation from Merriam-Webster's Collegiate Dictionary, 10th Ed, Exhibit—1031, Filed on Jan. 11, 2023—Cited in IPR2022-00281, challenging U.S. Pat. No. 9,270,244.
EX1031—Patent Rule 4-3 Joint Claim Construction and Prehearing Statement, E.D. Tx, Exhibit—1031, Filed on Mar. 7, 2023—Cited in IPR2022-00253, challenging U.S. Pat. No. 9,491,542.
EX1032—Cessation from New World Dictionary, 2d College Ed, Exhibit—1032, Filed on Jan. 11, 2023—Cited in IPR2022-00281, challenging U.S. Pat. No. 9,270,244.
EX1032—Ex. A-01_US11610587 Samsung Infringement Claim Chart, Exhibit—1032, Filed on Feb. 9, 2024—Cited in IPR2024-00559, challenging U.S. Pat. No. 11,610,587.
EX1032—Excerpts from Microsoft Computer Dictionary, 4th ed, Exhibit—1032, Filed on Jun. 25, 2024—Cited in IPR2024-01031, challenging U.S. Pat. No. 7,049,850.
Ex1032—Petitioners' Oral Hearing Demonstratives, Exhibit—1032, Filed on Apr. 12, 2023—Cited in IPR2022-00253, challenging U.S. Pat. No. 9,491,542.
EX1033—Order Granting Proposed Docket Control Order, Exhibit—1033, Filed on Feb. 9, 2024—Cited in IPR2024-00559, challenging U.S. Pat. No. 11,610,587.
EX1033—Pending from Merriam-Webster's Collegiate Dictionary, 10th Ed, Exhibit—1033, Filed on Jan. 11, 2023—Cited in IPR2022-00281, challenging U.S. Pat. No. 9,270,244.
EX1034—Computer Dictionary 2nd Ed, Exhibit—1034, Filed on Jun. 12, 2024—Cited in IPR2024-01003, challenging U.S. Pat. No. 9,191,083.
EX1034—D Del Statistics, Exhibit—1034, Filed on Feb. 9, 2024—Cited in IPR2024-00559, challenging U.S. Pat. No. 11,610,587.
EX1034—Pause from Merriam-Webster's Collegiate Dictionary, 10th Ed, Exhibit—1034, Filed on Jan. 11, 2023—Cited in IPR2022-00281, challenging U.S. Pat. No. 9,270,244.
EX1035—Deposition Transcript for Daniel P. Anagnos, Exhibit—1035, Filed on Jan. 10, 2023—Cited in IPR2022-00324, challenging U.S. Pat. No. 8,254,591.

(56) References Cited

OTHER PUBLICATIONS

EX1035—File History of U.S. Pat. No. 10,635,382; Exhibit—1035, Filed on Dec. 2, 2022—Cited in IPR2022-00234, challenging U.S. Pat. No. 9124982.
EX1035—Letter to Techiya re 587 IPR Stipulation, Exhibit—1035, Filed on Feb. 9, 2024—Cited in IPR2024-00559, challenging U.S. Pat. No. 11,610,587.
EX1035—National Judicial Caseload Profile, Exhibit—1035, Filed on Jun. 25, 2024—Cited in IPR2024-01031, challenging U.S. Pat. No. 7,049,850.
EX1035—Patent Rule 4-3 Joint Claim Construction and Prehearing Statement, E.D. Tx, Exhibit—1035, Filed on Mar. 7, 2023—Cited in IPR2022-00281, challenging U.S. Pat. No. 9,270,244.
EX1035—Tanenbaum Excerpt, Exhibit—1035, Filed on Jun. 12, 2024—Cited in IPR2024-01003, challenging U.S. Pat. No. 9,191,083.
EX1036—Linkedin Profile for Harish Jonnalagadda, Exhibit—1036, Filed on Jan. 10, 2023—Cited in IPR2022-00324, challenging U.S. Pat. No. 8,254,591.
EX1036—Oshana excerpt, Exhibit—1036, Filed on Jun. 12, 2024—Cited in IPR2024-01003, challenging U.S. Pat. No. 9,191,083.
EX1036—Oshana excerpt, Exhibit—1036, Filed on Jun. 12, 2024—Cited in IPR2024-01004, challenging U.S. Pat. No. 9,614,943.
EX1036—Petitioners' Oral Hearing Demonstratives, Exhibit—1036, Filed on Apr. 13, 2023—Cited in IPR2022-00281, challenging U.S. Pat. No. 9,270,244.
EX1036—Stay Order from E.D. Tex., Exhibit—1036, Filed on Nov. 20, 2024—Cited in IPR2024-01031, challenging U.S. Pat. No. 7,049,850.
EX1037—Confidential Settlement Agrement with Exhibits A-I, Exhibit—1037, Filed on Nov. 11, 2024—Cited in IPR2024-00559, challenging U.S. Pat. No. 11,610,587. [Document not publicly available at PTAB].
EX1038—Confidential Settlement Agrement with Exhibits A-I, Exhibit—1038, Filed on Dec. 11, 2024—Cited in IPR2024-01031, challenging U.S. Pat. No. 7,049,850. [Document not publicly available at PTAB].
EX1038—Handbook for Sound Engineers_Part 1 of 2, Exhibit—1038, Filed on Jun. 12, 2024—Cited in IPR2024-01003, challenging U.S. Pat. No. 9,191,083.
EX1038—Handbook for Sound Engineers_Part 2 of 2, Exhibit—1038, Filed on Jun. 12, 2024—Cited in IPR2024-01003, challenging U.S. Pat. No. 9,191,083.
EX1040—IPR2022-00234, Ex 2001, Declaration of Daniel P Anagnos; Exhibit—1040, Filed on Dec. 2, 2022—Cited in IPR2022-00234, challenging U.S. Pat. No. 9124982.
EX1041—Nov. 18, 2022, Deposition Transcript of Daniel P Anagnos; Exhibit—1041, Filed on Dec. 2, 2022—Cited in IPR2022-00234, challenging U.S. Pat. No. 9124982.
EX1041—Supplemental Declaration of Les E. Atlas, Ph.D., Exhibit—1041, Filed on Jan. 10, 2023—Cited in IPR2022-00324, challenging U.S. Pat. No. 8,254,591.
EX1042—Excerpts from the Authoritative Dictionary of IEEE Standards Terms; Exhibit—1042, Filed on Dec. 2, 2022—Cited in IPR2022-00234, challenging U.S. Pat. No. 9124982.
Ex1042—Petitioners' Oral Hearing Demonstratives, Exhibit—1042, Filed on Apr. 4, 2023—Cited in IPR2022-00324, challenging U.S. Pat. No. 8,254,591.
EX1043—Institution Decision, IPR2022-00234, Paper 16; Exhibit—1043, Filed on Dec. 2, 2022—Cited in IPR2022-00234, challenging U.S. Pat. No. 9124982.
EX1044—Patent Owner Response, IPR2022-00234, Paper 22; Exhibit—1044, Filed on Dec. 2, 2022—Cited in IPR2022-00234, challenging U.S. Pat. No. 9124982.
EX1045—Excerpt of Prosecution History of U.S. Appl. No. 17/483,190, Exhibit—1045, Filed on Jun. 12, 2024—Cited in IPR2024-01003, challenging U.S. Pat. No. 9,191,083.
EX1056—USP11710473 Samsung Infringement Claim Chart, Ex. A-06, Exhibit—1056, Filed on Jun. 12, 2024—Cited in IPR2024-01003, challenging U.S. Pat. No. 9,191,083.
EX1056—USP11710473 Samsung Infringement Claim Chart, Ex. A-06, Exhibit—1056, Filed on Jun. 12, 2024—Cited in IPR2024-01004, challenging U.S. Pat. No. 9,614,943.
EX1058—Kuo, Active Noise Control, Exhibit—1058, Filed on Jun. 12, 2024—Cited in IPR2024-01004, challenging U.S. Pat. No. 9,614,943.
Ex1058—Petitioners' Oral Hearing Demonstratives, Exhibit—1058, Filed on Mar. 16, 2023—Cited in IPR2022-00242, challenging U.S. Pat. No. 8,111,839.
Ex1058—Petitioners' Oral Hearing Demonstratives, Exhibit—1058, Filed on Mar. 16, 2023—Cited in IPR2022-00243, challenging U.S. Pat. No. 8,111,839.
EX1059—Stay Order from E.D. Tex., Exhibit—1059, Filed on Nov. 20, 2024—Cited in IPR2024-01003, challenging U.S. Pat. No. 9,191,083.
EX1059—Stay Order from E.D. Tex., Exhibit—1059, Filed on Nov. 20, 2024—Cited in IPR2024-01004, challenging U.S. Pat. No. 9,614,943.
EX1061—Confidential Settlement Agrement with Exhibits A-I, Exhibit—1061, Filed on Dec. 11, 2024—Cited in IPR2024-01004, challenging U.S. Pat. No. 9,614,943. [Document not publicly available at PTAB].
EX1061—Confidential Settlement Agrement with Exhibits A-I, Exhibit—1061, Filed on Dec. 11, 2024—Cited in IPR2024-01003, challenging U.S. Pat. No. 9,191,083. [Document not publicly available at PTAB].
Excerpt from Computer Dictionary, 2d ed., Exhibit—1027, Filed on Dec. 13, 2021—Cited in IPR2022-00242, challenging U.S. Pat. No. 8,111,839.
Excerpt from Computer Dictionary, 2d ed., Exhibit—1027, Filed on Dec. 13, 2021—Cited in IPR2022-00243, challenging U.S. Pat. No. 8,111,839.
Excerpt from Computer Dictionary, 2d ed.; Exhibit—1029, Filed on Dec. 13, 2021—Cited in IPR2022-00234, challenging U.S. Pat. No. 9,124,982.
Excerpt from Dictionary of Scientific and Technical Terms, 5th ed., Exhibit—1026, Filed on Dec. 20, 2021—Cited in IPR2022-00324, challenging U.S. Pat. No. 8,254,591.
Excerpt from McGraw Hill Dictionary of Scientific and Technical Terms, 5th ed., Exhibit—1025, Filed on Dec. 13, 2021—Cited in IPR2022-00242, challenging U.S. Pat. No. 8,111,839.
Excerpt from McGraw-Hill Dictionary of Scientific and Technical Terms, 5th ed., Exhibit—1025, Filed on Dec. 13, 2021—Cited in IPR2022-00243, challenging U.S. Pat. No. 8,111,839.
Excerpt from Oshana; Exhibit—1030, Filed on Dec. 13, 2021—Cited in IPR2022-00234, challenging U.S. Pat. No. 9,124,982.
Excerpt of File History of U.S. Appl. No. 12/100,281; Exhibit—1006, Filed on Dec. 13, 2021—Cited in IPR2022-00234, challenging U.S. Pat. No. 9,124,982.
Excerpt of File History of U.S. Appl. No. 13/352,694; Exhibit—1007, Filed on Dec. 13, 2021—Cited in IPR2022-00234, challenging U.S. Pat. No. 9124982.
Excerpts from Federal Court Management Statistics, Exhibit—1022, Filed on Jul. 1, 2022—Cited in IPR2022-00369, challenging U.S. Pat. No. 10,405,082.
Excerpts from Federal Court Management Statistics, Exhibit—1022, Filed on Jul. 1, 2022—Cited in IPR2022-00388, challenging U.S. Pat. No. 10,966,015.
Excerpts from Federal Court Management Statistics, Exhibit—1023, Filed on Jul. 1, 2022—Cited in IPR2022-00410, challenging U.S. Pat. No. 10,979,836.
Excerpts from Federal Court Management Statistics, Exhibit—1024, Filed on Jul. 1, 2022—Cited in IPR2022-00253, challenging U.S. Pat. No. 9,491,542.
Excerpts from Federal Court Management Statistics, Exhibit—1026, Filed on Jul. 1, 2022—Cited in IPR2022-00302, challenging U.S. Pat. No. 9,609,424.
Excerpts from Federal Court Management Statistics, Exhibit—1028, Filed on Jul. 1, 2022—Cited in IPR2022-00281, challenging U.S. Pat. No. 9,270,244.
Excerpts from Federal Court Management Statistics, Exhibit—1034, Filed on Jul. 1, 2022—Cited in IPR2022-00324, challenging U.S. Pat. No. 8,254,591.

(56) References Cited

OTHER PUBLICATIONS

Excerpts from McGraw-Hill Dictionary of Scientific and Technical Terms, 5th ed.; Exhibit—1021, Filed on Dec. 13, 2021—Cited in IPR2022-00234, challenging U.S. Pat. No. 9124982.
Excerpts from Openheim, Exhibit—1016, Filed on Jan. 4, 2022—Cited in IPR2022-00388, challenging U.S. Pat. No. 10,966,015.
Excerpts from Oppenheim & Schafer, 3rd ed., Exhibit—1016, Filed on Dec. 30, 2021—Cited in IPR2022-00369, challenging U.S. Pat. No. 10,405,082.
Excerpts from Oshana, Exhibit—1027, Filed on Dec. 20, 2021—Cited in IPR2022-00324, challenging U.S. Pat. No. 8,254,591.
Excerpts from Oshana, Exhibit—1028, Filed on Dec. 13, 2021—Cited in IPR2022-00242, challenging U.S. Pat. No. 8,111,839.
Excerpts from Oshana, Exhibit—1028, Filed on Dec. 13, 2021—Cited in IPR2022-00243, challenging U.S. Pat. No. 8,111,839.
Exhibit 3001, Exhibit—3001, Filed on Jan. 5, 2023—Cited in IPR2022-00282, challenging U.S. Pat. No. 8,315,400.
Exhibit 3001, Exhibit—3001, Filed on Nov. 3, 2022—Cited in IPR2022-01078, challenging U.S. Pat. No. 11,057,701.
Exhibit 3001, Exhibit—3001, Filed on Nov. 3, 2022—Cited in IPR2022-01106, challenging U.S. Pat. No. 11,039,259.
Exhibit 3001, Exhibit—3001, Filed on Apr. 6, 2023—Cited in IPR2022-00369, challenging U.S. Pat. No. 10,405,082.
Expunged, Exhibit—1002, Filed on Jan. 4, 2022—Cited in IPR2022-00388, challenging U.S. Pat. No. 10,966,015. [Document expunged from PTAB record].
Expunged, Exhibit—1006, Filed on Dec. 13, 2021—Cited in IPR2022-00242, challenging U.S. Pat. No. 8,111,839.
Expunged, Exhibit—1006, Filed on Dec. 13, 2021—Cited in IPR2022-00243, challenging U.S. Pat. No. 8,111,839.
Expunged, Exhibit—1031, Filed on Apr. 13, 2023—Cited in IPR2022-00302, challenging U.S. Pat. No. 9,609,424.
Expunged, Exhibit—1036, Filed on Dec. 9, 2024—Cited in IPR2024-00559, challenging U.S. Pat. No. 11,610,587. [Document expunged from PTAB record].
Expunged, Exhibit—1037, Filed on Dec. 9, 2024—Cited in IPR2024-01031, challenging U.S. Pat. No. 7,049,850. [Document expunged from PTAB record].
Expunged, Exhibit—1060, Filed on Dec. 9, 2024—Cited in IPR2024-01003, challenging U.S. Pat. No. 9,191,083. [Document expunged from PTAB record].
Expunged, Exhibit—1060, Filed on Dec. 9, 2024—Cited in IPR2024-01004, challenging U.S. Pat. No. 9,614,943. [Document expunged from PTAB record].
Expunged, Exhibit—11, Filed on Jan. 18, 2023—Cited in IPR2022-01099, challenging U.S. Pat. No. 11,244,666. [Document expunged from PTAB record].
Expunged, Exhibit—12, Filed on Jan. 18, 2023—Cited in IPR2022-01098, challenging U.S. Pat. No. 11,217,237. [Document expunged from PTAB record].
Expunged, Exhibit—2008, Filed on Feb. 22, 2023—Cited in IPR2022-00281, challenging U.S. Pat. No. 9,270,244.
Expunged, Exhibit—3, Filed on Dec. 10, 2021—Cited in IPR2022-00282, challenging U.S. Pat. No. 8,315,400. [Document expunged from PTAB record].
Expunged, Exhibit—3, Filed on Jun. 9, 2022—Cited in IPR2022-01098, challenging U.S. Pat. No. 11,217,237. [Document expunged from PTAB record].
Expunged, Exhibit—3002, Filed on Apr. 6, 2023—Cited in IPR2022-00388, challenging U.S. Pat. No. 10,966,015. [Document expunged from PTAB record].
Expunged, Exhibit—37, Filed on Aug. 15, 2023—Cited in IPR2022-00243, challenging U.S. Pat. No. 8,111,839.
Expungedexhibit1017, Dec. 9, 2024—Cited in IPR2024-01033, challenging U.S. Pat. No. 8,434,966. [Document expunged from PTAB record].
Extract from Federal Court Management Statistics, Exhibit—1021, Filed on Nov. 10, 2022—Cited in IPR2022-01099, challenging U.S. Pat. No. 11,244,666.
Extract from Federal Court Management Statistics, Exhibit—1024, Filed on Nov. 10, 2022—Cited in IPR2022-01078, challenging U.S. Pat. No. 11,057,701.
Extract from Federal Court Management Statistics, Exhibit—1027, Filed on Nov. 15, 2022—Cited in IPR2022-01098, challenging U.S. Pat. No. 11,217,237.
Extract from Federal Court Management Statistics, Exhibit—1030, Filed on Nov. 10, 2022—Cited in IPR2022-01106, challenging U.S. Pat. No. 11,039,259.
Federal Court Management Statistics (excerpt), Exhibit—2004, Filed on Jul. 1, 2022—Cited in IPR2022-00253, challenging U.S. Pat. No. 9,491,542.
Federal Court Management Statistics (excerpt), Exhibit—2004, Filed on Jul. 1, 2022—Cited in IPR2022-00281, challenging U.S. Pat. No. 9,270,244.
Federal Court Management Statistics (excerpt), Exhibit—2004, Filed on Jul. 1, 2022—Cited in IPR2022-00302, challenging U.S. Pat. No. 9,609,424.
Federal Court Management Statistics (excerpt), Exhibit—2004, Filed on Jul. 1, 2022—Cited in IPR2022-00324, challenging U.S. Pat. No. 8,254,591.
Federal Court Management Statistics (excerpt), Exhibit—2005, Filed on Jul. 1, 2022—Cited in IPR2022-00369, challenging U.S. Pat. No. 10,405,082.
Federal Court Management Statistics (excerpt), Exhibit—2005, Filed on Jul. 1, 2022—Cited in IPR2022-00410, challenging U.S. Pat. No. 10,979,836.
Federal Court Management Statistics (excerpt), Exhibit—2006, Filed on Jul. 1, 2022—Cited in IPR2022-00388, challenging U.S. Pat. No. 10,966,015.
File History for U.S. Pat. No. 9,491,542, Exhibit—1004, Filed on Dec. 17, 2021—Cited in IPR2022-00253, challenging U.S. Pat. No. 9,491,542.
File History of U.S. Appl. No. 16/168,752, Exhibit—2005, Filed on May 18, 2022—Cited in IPR2022-00388, challenging U.S. Pat. No. 10,966,015.
File History of U.S. Appl. No. 12/555,864, Exhibit—1012, Filed on Jan. 14, 2022—Cited in IPR2022-00410, challenging U.S. Pat. No. 10,979,836.
File History of U.S. Appl. No. 14/054,015, Exhibit—1011, Filed on Jan. 14, 2022—Cited in IPR2022-00410, challenging U.S. Pat. No. 10,979,836.
File History of U.S. Appl. No. 14/827,332, Exhibit—1010, Filed on Jan. 14, 2022—Cited in IPR2022-00410, challenging U.S. Pat. No. 10,979,836.
File History of U.S. Appl. No. 15/700,511, Exhibit—1009, Filed on Jan. 14, 2022—Cited in IPR2022-00410, challenging U.S. Pat. No. 10,979,836.
File History of U.S. Appl. No. 16/414,136, Exhibit—1013, Filed on Jan. 14, 2022—Cited in IPR2022-00410, challenging U.S. Pat. No. 10,979,836.
File History of U.S. Pat. No. 8,111,839, Exhibit—1005, Filed on Dec. 13, 2021—Cited in IPR2022-00242, challenging U.S. Pat. No. 8,111,839.
File History of U.S. Pat. No. 8,111,839, Exhibit—1005, Filed on Dec. 13, 2021—Cited in IPR2022-00243, challenging U.S. Pat. No. 8,111,839.
File History of U.S. Pat. No. 8,254,591, Exhibit—1004, Filed on Dec. 20, 2021—Cited in IPR2022-00324, challenging U.S. Pat. No. 8,254,591.
File History of U.S. Pat. No. 9,124,982; Exhibit—1004, Filed on Dec. 13, 2021—Cited in IPR2022-00234, challenging U.S. Pat. No. 9124982.
File History of U.S. Pat. No. 10,405,082, Exhibit—1004, Filed on Dec. 30, 2021—Cited in IPR2022-00369, challenging U.S. Pat. No. 10,405,082.
File History of U.S. Pat. No. 10,966,015, Exhibit—1005, Filed on Jan. 4, 2022—Cited in IPR2022-00388, challenging U.S. Pat. No. 10,966,015.
File History of U.S. Pat. No. 10,979,836,, U.S. Appl. No. 16/838,277, Exhibit—1004, Filed on Jan. 14, 2022—Cited in IPR2022-00410, challenging U.S. Pat. No. 10,979,836.

(56) References Cited

OTHER PUBLICATIONS

File History of U.S. Pat. No. 8,315,400, Exhibit—1004, Filed on Dec. 10, 2021—Cited in IPR2022-00282, challenging U.S. Pat. No. 8,315,400.
File History of U.S. Pat. No. 8,774,433, Exhibit—1009, Filed on Dec. 21, 2021—Cited in IPR2022-00302, challenging U.S. Pat. No. 9,609,424.
File History of U.S. Pat. No. 9,270,244, Exhibit—1004, Filed on Dec. 21, 2021—Cited in IPR2022-00281, challenging U.S. Pat. No. 9,270,244.
File History of U.S. Pat. No. 9,332,364, Exhibit—1005, Filed on Dec. 21, 2021—Cited in IPR2022-00302, challenging U.S. Pat. No. 9,609,424.
File History of U.S. Pat. No. 9,609,424, Exhibit—1004, Filed on Dec. 21, 2021—Cited in IPR2022-00302, challenging U.S. Pat. No. 9,609,424.
File History of U.S. Appl. No. 60/910,808; Exhibit—1005, Filed on Dec. 13, 2021—Cited in IPR2022-00234, challenging U.S. Pat. No. 9124982.
File History of U.S. Appl. No. 61/098,250, Exhibit—1005, Filed on Jan. 14, 2022—Cited in IPR2022-00410, challenging U.S. Pat. No. 10,979,836.
File History of U.S. Appl. No. 60/619,517 (Allen Provisional), Exhibit—1020, Filed on Dec. 21, 2021—Cited in IPR2022-00302, challenging U.S. Pat. No. 9,609,424.
File History of U.S. Appl. No. 60/866,420, Exhibit—1010, Filed on Dec. 21, 2021—Cited in IPR2022-00302, challenging U.S. Pat. No. 9,609,424.
Final Written Decision, IPR2022-00282 (Paper No. 28, Jun. 14, 2023), Exhibit—1035, Filed on Jun. 30, 2023—Cited in IPR2022-01106, challenging U.S. Pat. No. 11,039,259.
Final Written Decision: Final Written Decision Determining All Challenged Claims Unpatentable 35 U.S.C. sec. 318a, Exhibit—32, Filed on Jan. 5, 2024—Cited in IPR2022-01106, challenging U.S. Pat. No. 11,039,259.
Final Written Decision: original, Exhibit—28, Filed on Jun. 14, 2023—Cited in IPR2022-00282, challenging U.S. Pat. No. 8,315,400.
Final Written Decision: original, Exhibit—31, Filed on Jul. 13, 2023—Cited in IPR2022-00281, challenging U.S. Pat. No. 9,270,244.
Final Written Decision: original, Exhibit—33, Filed on Jul. 10, 2023—Cited in IPR2022-00324, challenging U.S. Pat. No. 8,254,591.
Final Written Decision: original, Exhibit—33, Filed on Jul. 14, 2023—Cited in IPR2022-00253, challenging U.S. Pat. No. 9,491,542.
Final Written Decision: original, Exhibit—36, Filed on Jun. 16, 2023—Cited in IPR2022-00242, challenging U.S. Pat. No. 8,111,839.
Final Written Decision: original; Exhibit—29, Filed on Jun. 14, 2023—Cited in IPR2022-00234, challenging U.S. Pat. No. 9,124,982.
Final Written Decision: JUDGMENT Final Written Decision Determining All Challenged Claims Unpatentable 35 U.S. C. § 318(a), Exhibit—35, Filed on Jun. 20, 2023—Cited in IPR2022-00243, challenging U.S. Pat. No. 8,111,839.
First Amended Complaint, *Staton Techiya* v. *Samsung*, E.D. Tex., Exhibit—1008, Filed on Dec. 10, 2021—Cited in IPR2022-00282, challenging U.S. Pat. No. 8,315,400.
First Amended Complaint, *Techiya* v. *Samsung*, E.D. Tex., Exhibit—1018, Filed on Dec. 21, 2021—Cited in IPR2022-00281, challenging U.S. Pat. No. 9,270,244.
First Amended Complaint, *Techiya* v. *Samsung*, E.D. Tex., Exhibit—1020, Filed on Dec. 17, 2021—Cited in IPR2022-00253, challenging U.S. Pat. No. 9,491,542.
First Amended Complaint, *Techiya* v. *Samsung*, E.D. Tex., Exhibit—1029, Filed on Dec. 20, 2021—Cited in IPR2022-00324, challenging U.S. Pat. No. 8,254,591.
First Amended Complaint, *Techiya* v. *Samsung*, E.D. Tex., Exhibit—1040, Filed on Dec. 13, 2021—Cited in IPR2022-00242, challenging U.S. Pat. No. 8,111,839.
First Amended Complaint, *Techiya* v. *Samsung*, E.D. Tex., Exhibit—1040, Filed on Dec. 13, 2021—Cited in IPR2022-00243, challenging U.S. Pat. No. 8,111,839.
First Amended Complaint, *Techiya* v. *Samsung*, E.D. Tex.; Exhibit—1031, Filed on Dec. 13, 2021—Cited in IPR2022-00234, challenging U.S. Pat. No. 9124982.
Granting Institution of Inter Partes Review 35 U.S.C. § 314, Exhibit—13, Filed on Jul. 15, 2022—Cited in IPR2022-00253, challenging U.S. Pat. No. 9,491,542.
Granting Institution of Inter Partes Review 35 U.S.C. § 314, Exhibit—13, Filed on Jul. 15, 2022—Cited in IPR2022-00281, challenging U.S. Pat. No. 9,270,244.
Granting Institution of Inter Partes Review 35 U.S.C. § 314, Exhibit—13, Filed on Aug. 16, 2022—Cited in IPR2022-00388, challenging U.S. Pat. No. 10,966,015.
Granting Institution of Inter Partes Review 35 U.S.C. § 314, Exhibit—14, Filed on Aug. 16, 2022—Cited in IPR2022-00369, challenging U.S. Pat. No. 10,405,082.
Harman Q&As about Microphone Windscreens, Exhibit—2013, Filed on Sep. 13, 2022—Cited in IPR2022-00242, challenging U.S. Pat. No. 8,111,839.
Harman, Q&As about Microphone Screens; Exhibit—2012, Filed on Sep. 9, 2022—Cited in IPR2022-00234, challenging U.S. Pat. No. 9,124,982.
IEEE Dictionary of Standards Terms (excerpts), Exhibit—2006, Filed on Mar. 21, 2022—Cited in IPR2022-00282, challenging U.S. Pat. No. 8,315,400.
Institution Decision: Deny, Exhibit—12, Filed on Aug. 12, 2022—Cited in IPR2022-00410, challenging U.S. Pat. No. 10,979,836.
Institution Decision: Grant, Exhibit—10, Filed on Jan. 9, 2023—Cited in IPR2022-01106, challenging U.S. Pat. No. 11,039,259.
Institution Decision: Grant, Exhibit—12, Filed on Jun. 17, 2022—Cited in IPR2022-00282, challenging U.S. Pat. No. 8,315,400.
Institution Decision: Grant, Exhibit—13, Filed on Jul. 11, 2022—Cited in IPR2022-00302, challenging U.S. Pat. No. 9,609,424.
Institution Decision: Grant, Exhibit—13, Filed on Jul. 11, 2022—Cited in IPR2022-00324, challenging U.S. Pat. No. 8,254,591.
Institution Decision: Grant, Exhibit—15, Filed on Jun. 21, 2022—Cited in IPR2022-00243, challenging U.S. Pat. No. 8,111,839.
Institution Decision: Grant, Exhibit—16, Filed on Jun. 21, 2022—Cited in IPR2022-00242, challenging U.S. Pat. No. 8,111,839.
Institution Decision: Grant, Exhibit—8, Filed on Aug. 16, 2024—Cited in IPR2024-00559, challenging U.S. Pat. No. 11,610,587.
Institution Decision: Grant; Exhibit—12, Filed on Jun. 17, 2022—Cited in IPR2022-00234, challenging U.S. Pat. No. 9124982.
Joint Motion to Consolidate; Exhibit—2005, Filed on Apr. 29, 2022—Cited in IPR2022-00234, challenging U.S. Pat. No. 9,124,982.
Joint Motion to Terminate Proceeding, Exhibit—17, Filed on Dec. 9, 2024—Cited in IPR2024-00559, challenging U.S. Pat. No. 11,610,587.
Joint Request to Treat Settlement Agreement as Business Confidential Information, Exhibit—14, Filed on Dec. 9, 2024—Cited in IPR2024-01003, challenging U.S. Pat. No. 9,191,083.
Joint Request to Treat Settlement Agreement as Business Confidential Information, Exhibit—14, Filed on Dec. 9, 2024—Cited in IPR2024-01004, challenging U.S. Pat. No. 9,614,943.
Joint Request to Treat Settlement Agreement as Business Confidential Information, Exhibit—14, Filed on Dec. 9, 2024—Cited in IPR2024-01031, challenging U.S. Pat. No. 7,049,850.
Joint Request to Treat Settlement Agreement as Business Confidential Information, Exhibit—15, Filed on Dec. 9, 2024—Cited in IPR2024-01034, challenging U.S. Pat. No. 9,279,263.
Joint Request to Treat Settlement Agreement as Business Confidential Information, Exhibit—18, Filed on Dec. 9, 2024—Cited in IPR2024-00559, challenging U.S. Pat. No. 11,610,587.
Joint Request to Treat Settlement Agreement as Business Confidential InformationPaper13, Dec. 9, 2024—Cited in IPR2024-01033, challenging U.S. Pat. No. 8,434,966.
Joint Statement Regarding Oral Argument, Exhibit—15, Filed on Jul. 29, 2022—Cited in IPR2022-00253, challenging U.S. Pat. No. 9,491,542.
Joint Statement Regarding Oral Argument, Exhibit—15, Filed on Jul. 29, 2022—Cited in IPR2022-00281, challenging U.S. Pat. No. 9,270,244.

(56) References Cited

OTHER PUBLICATIONS

Joint Statement Regarding Oral Argument, Exhibit—15, Filed on Jul. 29, 2022—Cited in IPR2022-00302, challenging U.S. Pat. No. 9,609,424.
Joint Statement Regarding Oral Argument, Exhibit—15, Filed on Aug. 24, 2022—Cited in IPR2022-00388, challenging U.S. Pat. No. 10,966,015.
Joint Statement Regarding Oral Argument, Exhibit—16, Filed on Jul. 29, 2022—Cited in IPR2022-00324, challenging U.S. Pat. No. 8,254,591.
Joint Statement Regarding Oral Argument, Exhibit—16, Filed on Aug. 24, 2022—Cited in IPR2022-00369, challenging U.S. Pat. No. 10,405,082.
Joint Statement Regarding Oral Argument, Exhibit—18, Filed on Jul. 29, 2022—Cited in IPR2022-00243, challenging U.S. Pat. No. 8,111,839.
Joint Statement Regarding Oral Argument, Exhibit—19, Filed on Jul. 29, 2022—Cited in IPR2022-00242, challenging U.S. Pat. No. 8,111,839.
Joint Stipulation to Modify Due Dates 1-3, Exhibit—10, Filed on Oct. 25, 2024—Cited in IPR2024-00559, challenging U.S. Pat. No. 11,610,587.
Joint Stipulation to Modify Due Dates 1-3, Exhibit—12, Filed on Nov. 22, 2024—Cited in IPR2024-00559, challenging U.S. Pat. No. 11,610,587.
Joint Stipulation to Modify Scheduling Order, Exhibit—14, Filed on Mar. 14, 2023—Cited in IPR2022-01106, challenging U.S. Pat. No. 11,039,259.
Joint Stipulation to Modify the Scheduling Order, Exhibit—16, Filed on Aug. 16, 2022—Cited in IPR2022-00253, challenging U.S. Pat. No. 9,491,542.
Joint Stipulation to Modify the Scheduling Order, Exhibit—16, Filed on Aug. 16, 2022—Cited in IPR2022-00281, challenging U.S. Pat. No. 9,270,244.
Joint Stipulation to Modify the Scheduling Order, Exhibit—16, Filed on Aug. 16, 2022—Cited in IPR2022-00302, challenging U.S. Pat. No. 9,609,424.
Joint Stipulation to Modify the Scheduling Order, Exhibit—19, Filed on Aug. 16, 2022—Cited in IPR2022-00324, challenging U.S. Pat. No. 8,254,591.
Kleinschmidt Declaration in Support of Patent Owner Response, Exhibit—2018, Filed on Apr. 10, 2023—Cited in IPR2022-01106, challenging U.S. Pat. No. 11,039,259.
LEAP Practitioner Request and Verification Form (Patent Owner), Exhibit—29, Filed on Feb. 28, 2023—Cited in IPR2022-00243, challenging U.S. Pat. No. 8,111,839.
LEAP Practitioner Request and Verification Form (Patent Owner), Exhibit—30, Filed on Feb. 28, 2023—Cited in IPR2022-00242, challenging U.S. Pat. No. 8,111,839.
LEAP Practitioner Request and Verification Form (Petitioner), Exhibit—30, Filed on Mar. 13, 2023—Cited in IPR2022-00243, challenging U.S. Pat. No. 8,111,839.
LEAP Practitioner Request and Verification Form (Petitioner), Exhibit—31, Filed on Mar. 13, 2023—Cited in IPR2022-00242, challenging U.S. Pat. No. 8,111,839.
Letter from Petitioners' Counsel to PO's Counsel Apr. 20, 2022, Exhibit—2004, Filed on May 18, 2022—Cited in IPR2022-00369, challenging U.S. Pat. No. 10,405,082.
Letter from Petitioners' Counsel to PO's Counsel Apr. 20, 2022, Exhibit—2004, Filed on May 18, 2022—Cited in IPR2022-00388, challenging U.S. Pat. No. 10,966,015.
Letter from Petitioners' Counsel to PO's Counsel Apr. 20, 2022, Exhibit—2004, Filed on May 18, 2022—Cited in IPR2022-00410, challenging U.S. Pat. No. 10,979,836.
Markman Hearing Transcript (excerpts), Exhibit—2022, Filed on Oct. 19, 2023—Cited in IPR2022-01106, challenging U.S. Pat. No. 11,039,259.
Mauer, Embedded Indexing, Exhibit—2008, Filed on Sep. 13, 2022—Cited in IPR2022-00242, challenging U.S. Pat. No. 8,111,839.
Mauer, Embedded Indexing: Pros and Cons for the Indexer; Exhibit—2008, Filed on Sep. 9, 2022—Cited in IPR2022-00234, challenging U.S. Pat. No. 9,124,982.
McGraw-Hill Dictionary of Scientific and Technical Terms, Exhibit—2010, Filed on Sep. 13, 2022—Cited in IPR2022-00242, challenging U.S. Pat. No. 8,111,839.
McGraw-Hill Dictionary of Scientific and Technical Terms; Exhibit—2009, Filed on Sep. 9, 2022—Cited in IPR2022-00234, challenging U.S. Pat. No. 9,124,982.
Merriam-Webster's Collegiate Dictionary (excerpt), Exhibit—2010, Filed on Oct. 11, 2022—Cited in IPR2022-01106, challenging U.S. Pat. No. 11,039,259.
Montgomery Declaration with Exhibit A, Exhibit—1018, Filed on Jan. 14, 2022—Cited in IPR2022-00410, challenging U.S. Pat. No. 10,979,836.
Motion for Leave to File Corrected Petition, Exhibit—10, Filed on Jan. 31, 2022—Cited in IPR2022-00242, challenging U.S. Pat. No. 8,111,839.
Motion: Motion to dismiss due to settlement (pre-DI), Exhibit—13, Filed on Feb. 9, 2024—Cited in IPR2024-01003, challenging U.S. Pat. No. 9,191,083.
Motion: Motion to dismiss due to settlement (pre-DI), Exhibit—13, Filed on Dec. 9, 2024—Cited in IPR2024-01004, challenging U.S. Pat. No. 9,614,943.
Motion: Motion to dismiss due to settlement (pre-DI), Exhibit—13, Filed on Dec. 9, 2024—Cited in IPR2024-01031, challenging U.S. Pat. No. 7,049,850.
Motion: Motion to dismiss due to settlement (pre-DI), Exhibit—14, Filed on Dec. 9, 2024—Cited in IPR2024-01034, challenging U.S. Pat. No. 9,279,263.
Motion: Motion to dismiss due to settlement (pre-DI)Paper12, Dec. 9, 2024—Cited in IPR2024-01033, challenging U.S. Pat. No. 8,434,966.
Notice : Mandatory Notice, Exhibit—5, Filed on Jul. 16, 2024—Cited in IPR2024-01031, challenging U.S. Pat. No. 7,049,850.
Notice : Mandatory Notice, Exhibit—6, Filed on Jul. 16, 2024—Cited in IPR2024-01034, challenging U.S. Pat. No. 9,279,263.
Notice : Mandatory Notice, Exhibit—7, Filed on Mar. 1, 2024—Cited in IPR2024-00559, challenging U.S. Pat. No. 11,610,587.
Notice : Other—Notice of Ranking, Exhibit—4, Filed on Jul. 1, 2024—Cited in IPR2024-01034, challenging U.S. Pat. No. 9,279,263.
Notice : Power of Attorney for Harman International Industries, Exhibit—3, Filed on Feb. 9, 2024—Cited in IPR2024-00559, challenging U.S. Pat. No. 11,610,587.
Notice : Power of Attorney for Harman International Industries, Inc., Exhibit—3, Filed on Jun. 25, 2024—Cited in IPR2024-01031, challenging U.S. Pat. No. 7,049,850.
Notice : Power of Attorney for Harman International Industries, Inc., Exhibit—3, Filed on Jul. 1, 2024—Cited in IPR2024-01034, challenging U.S. Pat. No. 9,279,263.
Notice : Power of Attorney for Samsung Electronics America, Exhibit—2, Filed on Feb. 9, 2024—Cited in IPR2024-00559, challenging U.S. Pat. No. 11,610,587.
Notice : Power of Attorney for Samsung Electronics America, Inc., Exhibit—2, Filed on Jun. 12, 2024—Cited in IPR2024-01003, challenging U.S. Pat. No. 9,191,083.
Notice : Power of Attorney for Samsung Electronics America, Inc., Exhibit—2, Filed on Jun. 12, 2024—Cited in IPR2024-01004, challenging U.S. Pat. No. 9,614,943.
Notice : Power of Attorney for Samsung Electronics America, Inc., Exhibit—2, Filed on Jun. 25, 2024—Cited in IPR2024-01031, challenging U.S. Pat. No. 7,049,850.
Notice : Power of Attorney for Samsung Electronics America, Inc., Exhibit—2, Filed on Jul. 1, 2024—Cited in IPR2024-01034, challenging U.S. Pat. No. 9,279,263.
Notice : Power of Attorney for Samsung Electronics America, Inc. Paper2, Jun. 18, 2024—Cited in IPR2024-01033, challenging U.S. Pat. No. 8,434,966.
Notice : Power of Attorney for Samsung Electronics Co., Ltd., Exhibit—1, Filed on Feb. 9, 2024—Cited in IPR2024-00559, challenging U.S. Pat. No. 11,610,587.
Notice : Power of Attorney for Samsung Electronics Co., Ltd., Exhibit—1, Filed on Jun. 12, 2024—Cited in IPR2024-01003, challenging U.S. Pat. No. 9,191,083.

(56) References Cited

OTHER PUBLICATIONS

Notice : Power of Attorney for Samsung Electronics Co., Ltd., Exhibit—1, Filed on Jun. 12, 2024—Cited in IPR2024-01004, challenging U.S. Pat. No. 9,614,943.
Notice : Power of Attorney for Samsung Electronics Co., Ltd., Exhibit—1, Filed on Jul. 1, 2024—Cited in IPR2024-01034, challenging U.S. Pat. No. 9,279,263.
Notice : Power of Attorney for Samsung Electronics Co., Ltd. Paper1, Jun. 18, 2024—Cited in IPR2024-01033, challenging U.S. Pat. No. 8,434,966.
Notice : Power of Attorney for Samsung Electronics Corp., Exhibit—1, Filed on Jun. 25, 2024—Cited in IPR2024-01031, challenging U.S. Pat. No. 7,049,850.
Notice : Power of Attorney, Exhibit—6, Filed on Mar. 1, 2024—Cited in IPR2024-00559, challenging U.S. Pat. No. 11,610,587.
Notice : Power of Attorney, Exhibit—6, Filed on Jul. 16, 2024—Cited in IPR2024-01031, challenging U.S. Pat. No. 7,049,850.
Notice : Power of Attorney, Exhibit—7, Filed on Jul. 16, 2024—Cited in IPR2024-01034, challenging U.S. Pat. No. 9,279,263.
Notice of Deposition of Chris Kyriakakis, Ph.D., Exhibit—17, Filed on Sep. 13, 2022—Cited in IPR2022-00302, challenging U.S. Pat. No. 9,609,424.
Notice of Deposition of Daniel P Anagnos, Exhibit—21, Filed on Dec. 14, 2022—Cited in IPR2022-00324, challenging U.S. Pat. No. 8,254,591.
Notice of Deposition of David Kleinschmidt, Exhibit—20, Filed on Dec. 2, 2022—Cited in IPR2022-00253, challenging U.S. Pat. No. 9,491,542.
Notice of Deposition of David Kleinschmidt, Exhibit—20, Filed on Dec. 2, 2022—Cited in IPR2022-00281, challenging U.S. Pat. No. 9,270,244.
Notice of Deposition of Les E. Atlas, Ph.D., Exhibit—13, Filed on Mar. 9, 2023—Cited in IPR2022-01106, challenging U.S. Pat. No. 11,039,259.
Notice of Deposition of Les E. Atlas, Ph.D., Exhibit—17, Filed on Aug. 8, 2022—Cited in IPR2022-00324, challenging U.S. Pat. No. 8,254,591.
Notice of Deposition of Les E. Atlas, Ph. D., Exhibit—19, Filed on Aug. 4, 2022—Cited in IPR2022-00243, challenging U.S. Pat. No. 8,111,839.
Notice of Deposition of Les E. Atlas, Ph.D., Exhibit—20, Filed on Aug. 4, 2022—Cited in IPR2022-00242, challenging U.S. Pat. No. 8,111,839.
Notice of Deposition of Les E. Atlas, Ph.D.; Exhibit—15, Filed on Aug. 4, 2022—Cited in IPR2022-00234, challenging U.S. Pat. No. 9124982.
Notice of Deposition of Marshall Buck, Exhibit—19, Filed on Dec. 16, 2022—Cited in IPR2022-00388, challenging U.S. Pat. No. 10,966,015.
Notice of Deposition of Marshall Buck, Exhibit—20, Filed on Dec. 16, 2022—Cited in IPR2022-00369, challenging U.S. Pat. No. 10,405,082.
Notice of Deposition of Nathaniel Polish, Ph.D., Exhibit—18, Filed on Sep. 13, 2022—Cited in IPR2022-00253, challenging U.S. Pat. No. 9,491,542.
Notice of Deposition of Nathaniel Polish, Ph.D., Exhibit—18, Filed on Sep. 13, 2022—Cited in IPR2022-00281, challenging U.S. Pat. No. 9,270,244.
Notice of Deposition of Richard M. Stern, Ph.D., Exhibit—13, Filed on Feb. 28, 2023—Cited in IPR2022-01078, challenging U.S. Pat. No. 11,057,701.
Notice of Deposition of Richard M. Stern, Ph.D., Exhibit—14, Filed on Aug. 5, 2022—Cited in IPR2022-00282, challenging U.S. Pat. No. 8,315,400.
Notice of Deposition of Richard M. Stern, Ph.D., Exhibit—17, Filed on Oct. 14, 2022—Cited in IPR2022-00388, challenging U.S. Pat. No. 10,966,015.
Notice of Deposition of Richard M. Stern, Ph.D., Exhibit—18, Filed on Oct. 14, 2022—Cited in IPR2022-00369, challenging U.S. Pat. No. 10,405,082.
Notice of Filing Date Accorded to Petition, Exhibit—5, Filed on Dec. 23, 2021—Cited in IPR2022-00242, challenging U.S. Pat. No. 8,111,839.
Notice of Filing Date Accorded to Petition, Exhibit—5, Filed on Dec. 23, 2021—Cited in IPR2022-00243, challenging U.S. Pat. No. 8,111,839.
Notice of Ranking, Exhibit—4, Filed on Dec. 13, 2021—Cited in IPR2022-00242, challenging U.S. Pat. No. 8,111,839.
Notice of Ranking, Exhibit—4, Filed on Dec. 13, 2021—Cited in IPR2022-00243, challenging U.S. Pat. No. 8,111,839.
Notice of Ranking, Exhibit—4, Filed on Jun. 12, 2024—Cited in IPR2024-01003, challenging U.S. Pat. No. 9,191,083.
Notice of Ranking, Exhibit—4, Filed on Jun. 12, 2024—Cited in IPR2024-01004, challenging U.S. Pat. No. 9,614,943.
Notice Regarding Transcript of Markman Hearing, Exhibit—29, Filed on Oct. 19, 2023—Cited in IPR2022-01106, challenging U.S. Pat. No. 11,039,259.
Notice: Notice filing date accorded, Exhibit—5, Filed on Dec. 21, 2021—Cited in IPR2022-00282, challenging U.S. Pat. No. 8,315,400.
Notice: Notice filing date accorded, Exhibit—5, Filed on Feb. 27, 2024—Cited in IPR2024-00559, challenging U.S. Pat. No. 11,610,587.
Notice: Notice filing date accorded, Exhibit—5, Filed on Jun. 17, 2024—Cited in IPR2024-01003, challenging U.S. Pat. No. 9,191,083.
Notice: Notice filing date accorded, Exhibit—5, Filed on Jun. 18, 2024—Cited in IPR2024-01004, challenging U.S. Pat. No. 9,614,943.
Notice: Notice filing date accorded, Exhibit—6, Filed on Jan. 13, 2022—Cited in IPR2022-00302, challenging U.S. Pat. No. 9,609,424.
Notice: Notice filing date accorded, Exhibit—6, Filed on Jan. 13, 2022—Cited in IPR2022-00324, challenging U.S. Pat. No. 8,254,591.
Notice: Notice filing date accorded, Exhibit—6, Filed on Jan. 18, 2022—Cited in IPR2022-00253, challenging U.S. Pat. No. 9,491,542.
Notice: Notice filing date accorded, Exhibit—6, Filed on Jan. 18, 2022—Cited in IPR2022-00281, challenging U.S. Pat. No. 9,270,244.
Notice: Notice filing date accorded, Exhibit—6, Filed on Feb. 18, 2022—Cited in IPR2022-00410, challenging U.S. Pat. No. 10,979,836.
Notice: Notice filing date accorded, Exhibit—6, Filed on Jul. 7, 2022—Cited in IPR2022-01078, challenging U.S. Pat. No. 11,057,701.
Notice: Notice filing date accorded, Exhibit—6, Filed on Jul. 7, 2022—Cited in IPR2022-01099, challenging U.S. Pat. No. 11,244,666.
Notice: Notice filing date accorded, Exhibit—6, Filed on Jul. 8, 2022—Cited in IPR2022-01106, challenging U.S. Pat. No. 11,039,259.
Notice: Notice filing date accorded, Exhibit—7, Filed on Feb. 18, 2022—Cited in IPR2022-00388, challenging U.S. Pat. No. 10,966,015.
Notice: Notice filing date accorded, Exhibit—7, Filed on Jul. 7, 2022—Cited in IPR2022-01098, challenging U.S. Pat. No. 11,217,237.
Notice: Notice filing date accorded, Exhibit—8, Filed on Feb. 18, 2022—Cited in IPR2022-00369, challenging U.S. Pat. No. 10,405,082.
Notice: Notice filing date accorded, Exhibit—8, Filed on Jul. 24, 2024—Cited in IPR2024-01031, challenging U.S. Pat. No. 7,049,850.
Notice: Notice filing date accorded, Exhibit—9, Filed on Aug. 16, 2024—Cited in IPR2024-01034, challenging U.S. Pat. No. 9,279,263.
Notice: Notice filing date accorded; Exhibit—4, Filed on Dec. 21, 2021—Cited in IPR2022-00234, challenging U.S. Pat. No. 9124982.
Notice: Notice filing date accordedPaper4, Jun. 20, 2024—Cited in IPR2024-01033, challenging U.S. Pat. No. 8,434,966.
Notice: refund approved, Exhibit—13, Filed on Mar. 7, 2023—Cited in IPR2022-01099, challenging U.S. Pat. No. 11,244,666.
Notice: refund approved, Exhibit—14, Filed on Jan. 20, 2023—Cited in IPR2022-00410, challenging U.S. Pat. No. 10,979,836.
Notice: refund approved, Exhibit—14, Filed on Mar. 7, 2023—Cited in IPR2022-01098, challenging U.S. Pat. No. 11,217,237.
Notice: refund approved, Exhibit—18, Filed on Dec. 17, 2024—Cited in IPR2024-01003, challenging U.S. Pat. No. 9,191,083.
Notice: refund approved, Exhibit—18, Filed on Dec. 17, 2024—Cited in IPR2024-01004, challenging U.S. Pat. No. 9,614,943.
Notice: refund approved, Exhibit—18, Filed on Dec. 17, 2024—Cited in IPR2024-01031, challenging U.S. Pat. No. 7,049,850.
Notice: refund approved, Exhibit—19, Filed on Dec. 17, 2024—Cited in IPR2024-01034, challenging U.S. Pat. No. 9,279,263.
Notice: refund approvedPaper17, Dec. 17, 2024—Cited in IPR2024-01033, challenging U.S. Pat. No. 8,434,966.
Olwal 2005, Exhibit—1023, Filed on Dec. 21, 2021—Cited in IPR2022-00281, challenging U.S. Pat. No. 9,270,244.

(56) References Cited

OTHER PUBLICATIONS

Order Adopting Claim Construction Order, Exhibit—2015, Filed on Apr. 10, 2023—Cited in IPR2022-01106, challenging U.S. Pat. No. 11,039,259.
Order Clarifying Claim Construction Order, Exhibit—2014, Filed on Apr. 10, 2023—Cited in IPR2022-01106, challenging U.S. Pat. No. 11,039,259.
ORDER Conditionally Granting Patent Owner's Motion to Withdraw and Substitute Counsel 37 C.F.R. § 42.10, Exhibit—12, Filed on Dec. 9, 2024—Cited in IPR2024-01003, challenging U.S. Pat. No. 9,191,083.
ORDER Conditionally Granting Patent Owner's Motion to Withdraw and Substitute Counsel 37 C.F.R. § 42.10, Exhibit—12, Filed on Dec. 9, 2024—Cited in IPR2024-01004, challenging U.S. Pat. No. 9,614,943.
ORDER Conditionally Granting Patent Owner's Motion to Withdraw and Substitute Counsel 37 C.F.R. § 42.10, Exhibit—12, Filed on Dec. 9, 2024—Cited in IPR2024-01031, challenging U.S. Pat. No. 7,049,850.
ORDER Conditionally Granting Patent Owner's Motion to Withdraw and Substitute Counsel 37 C.F.R. § 42.10, Exhibit—13, Filed on Dec. 9, 2024—Cited in IPR2024-01034, challenging U.S. Pat. No. 9,279,263.
ORDER Conditionally Granting Patent Owner's Motion to Withdraw and Substitute Counsel 37 C.F.R. § 42.10Paper11, Dec. 9, 2024—Cited in IPR2024-01033, challenging U.S. Pat. No. 8,434,966.
Order Conditionally Granting Patent Owner's Motion to Withdraw and Substitute Counsel, Exhibit—13, Filed on Dec. 5, 2024—Cited in IPR2024-00559, challenging U.S. Pat. No. 11,610,587.
ORDER Granting Patent Owner's Motions for Pro Hac Vice Admission of Roy Falik 37 C.F.R. § 42.10(c), Exhibit—9, Filed on Sep. 23, 2024—Cited in IPR2024-01031, challenging U.S. Pat. No. 7,049,850.
ORDER Trial Hearing 37 C.F.R. 42.70, Exhibit—23, Filed on Feb. 6, 2023—Cited in IPR2022-00282, challenging U.S. Pat. No. 8,315,400.
ORDER Trial Hearing 37 C.F.R. 42.70; Exhibit—24, Filed on Feb. 6, 2023—Cited in IPR2022-00234, challenging U.S. Pat. No. 9,124,982.
ORDER Trial Hearing 37 C.F.R. § 42.70, Exhibit—24, Filed on Mar. 1, 2023—Cited in IPR2022-00302, challenging U.S. Pat. No. 9,609,424.
ORDER Trial Hearing 37 C.F.R. § 42.70, Exhibit—26, Filed on Oct. 10, 2023—Cited in IPR2022-01106, challenging U.S. Pat. No. 11,039,259.
ORDER Trial Hearing 37 C.F.R. § 42.70, Exhibit—26, Filed on Mar. 1, 2023—Cited in IPR2022-00324, challenging U.S. Pat. No. 8,254,591.
ORDER Trial Hearing 37 C.F.R. sec 42.70, Exhibit - 28, Filed on 2/8/2023- Cited in IPR2022-00243, challenging U.S. Pat. No. 8,111,839.
ORDER Trial Hearing 37 C.F.R. sec 42.70, Exhibit - 29, Filed on 2/8/2023- Cited in IPR2022-00242, challenging U.S. Pat. No. 8,111,839.
ORDER Trial Hearing, Exhibit - 25, Filed on 3/1/2023- Cited in IPR2022-00281, challenging U.S. Pat. No. 9,270,244.
Order Vacating Standing Orders, Exhibit - 2005, Filed on 7/1/2022- Cited in IPR2022-00253, challenging U.S. Pat. No. 9,491,542.
Order Vacating Standing Orders, Exhibit - 2005, Filed on 7/1/2022- Cited in IPR2022-00281, challenging U.S. Pat. No. 9,270,244.
Order Vacating Standing Orders, Exhibit - 2005, Filed on 7/1/2022- Cited in IPR2022-00302, challenging U.S. Pat. No. 9,609,424.
Order Vacating Standing Orders, Exhibit - 2005, Filed on 7/1/2022- Cited in IPR2022-00324, challenging U.S. Pat. No. 8,254,591.
Order Vacating Standing Orders, Exhibit - 2006, Filed on 7/1/2022- Cited in IPR2022-00369, challenging U.S. Pat. No. 10,405,082.
Order Vacating Standing Orders, Exhibit - 2006, Filed on 7/1/2022- Cited in IPR2022-00410, challenging U.S. Pat. No. 10,979,836.
Order Vacating Standing Orders, Exhibit - 2007, Filed on 7/1/2022- Cited in IPR2022-00388, challenging U.S. Pat. No. 10,966,015.
Order: Conduct of the Proceeding 37 C.F.R. sec. 42.5, Exhibit - 18, Filed on 1/5/2023- Cited in IPR2022-00282, challenging U.S. Pat. No. 8,315,400.
Order: Granting Patent Owner's Motion for Pro Hac Vice Admission of Roy Falik 37 C.F.R. § 42.10, Exhibit—10, Filed on Oct. 4, 2024—Cited in IPR2024-01034, challenging U.S. Pat. No. 9,279,263.
Order: Granting Patent Owner's Motions for Admission Pro Hac Vice of Roy Falik 37 C.F.R. § 42.10, Exhibit—9, Filed on Oct. 4, 2024—Cited in IPR2024-01004, challenging U.S. Pat. No. 9,614,943.
Order: Granting Patent Owner's Motions for Admission Pro Hac Vice of Roy Falik 37 C.F.R. § 42.10Paper8, Oct. 4, 2024—Cited in IPR2024-01033, challenging U.S. Pat. No. 8,434,966.
Order: on Motion, Exhibit—9, Filed on Oct. 4, 2024—Cited in IPR2024-01003, challenging U.S. Pat. No. 9,191,083.
Order: ORDER Setting Oral Argument 37 C.F.R. § 42.70, Exhibit—22, Filed on Aug. 21, 2023—Cited in IPR2022-01078, challenging U.S. Pat. No. 11,057,701.
Order: Other, Exhibit—12, Filed on Feb. 22, 2023—Cited in IPR2022-01078, challenging U.S. Pat. No. 11,057,701.
Order: Panel Change Order, Exhibit—22, Filed on Feb. 10, 2023—Cited in IPR2022-00253, challenging U.S. Pat. No. 9,491,542.
Order: Scheduling Order, Exhibit—13, Filed on Jun. 17, 2022—Cited in IPR2022-00282, challenging U.S. Pat. No. 8,315,400.
Order: Scheduling Order; Exhibit—13, Filed on Jun. 17, 2022—Cited in IPR2022-00234, challenging U.S. Pat. No. 9124982.
Order: Trial Hearing (Revised), Exhibit—27, Filed on Mar. 3, 2023—Cited in IPR2022-00324, challenging U.S. Pat. No. 8,254,591.
Order: Trial Hearing—37 CFR 42.70, Exhibit—26, Filed on Mar. 2, 2023—Cited in IPR2022-00253, challenging U.S. Pat. No. 9,491,542.
Order: Hearing Order, Exhibit—26, Filed on Apr. 7, 2023—Cited in IPR2022-00388, challenging U.S. Pat. No. 10,966,015.
Order: Hearing Order, Exhibit—27, Filed on Apr. 7, 2023—Cited in IPR2022-00369, challenging U.S. Pat. No. 10,405,082.
Order: Trial Hearing (Revised), Exhibit—25, Filed on Mar. 3, 2023—Cited in IPR2022-00302, challenging U.S. Pat. No. 9,609,424.
Osha, Appx A to 1910.95—Noise Exposure Computation, Exhibit—2014, Filed on Sep. 13, 2022—Cited in IPR2022-00242, challenging U.S. Pat. No. 8,111,839.
Osha, Appx A to 1910.95—Noise Exposure Computation; Exhibit—2013, Filed on Sep. 9, 2022—Cited in IPR2022-00234, challenging U.S. Pat. No. 9124982.
Oshana, Chapters 3-4, Exhibit—1017, Filed on Jan. 14, 2022—Cited in IPR2022-00410, challenging U.S. Pat. No. 10,979,836.
Other: Hearing transcript, Exhibit—25, Filed on Oct. 16, 2023—Cited in IPR2022-01078, challenging U.S. Pat. No. 11,057,701.
Other: Hearing transcript, Exhibit—27, Filed on Apr. 18, 2023—Cited in IPR2022-00282, challenging U.S. Pat. No. 8,315,400.
Other: Hearing transcript, Exhibit—30, Filed on Jul. 25, 2023—Cited in IPR2022-00388, challenging U.S. Pat. No. 10,966,015.
Other: Hearing transcript, Exhibit—31, Filed on Dec. 13, 2023—Cited in IPR2022-01106, challenging U.S. Pat. No. 11,039,259.
Other: Hearing transcript, Exhibit—31, Filed on Jul. 25, 2023—Cited in IPR2022-00369, challenging U.S. Pat. No. 10,405,082.
Other: Hearing transcript, Exhibit—32, Filed on Jul. 3, 2023—Cited in IPR2022-00324, challenging U.S. Pat. No. 8,254,591.
Other: Hearing transcript, Exhibit—32, Filed on Jul. 31, 2023—Cited in IPR2022-00281, challenging U.S. Pat. No. 9,270,244.
Other: Hearing transcript, Exhibit—32, Filed on Jul. 6, 2023—Cited in IPR2022-00253, challenging U.S. Pat. No. 9,491,542.
Other: Hearing transcript, Exhibit—34, Filed on Jun. 1, 2023—Cited in IPR2022-00243, challenging U.S. Pat. No. 8,111,839.
Other: Hearing transcript, Exhibit—34, Filed on Jun. 22, 2023—Cited in IPR2022-00302, challenging U.S. Pat. No. 9,609,424.
Other: Hearing transcript, Exhibit—35, Filed on Jun. 1, 2023—Cited in IPR2022-00242, challenging U.S. Pat. No. 8,111,839.
Other: Hearing transcript, Exhibit—36, Filed on Jul. 6, 2023—Cited in IPR2022-00302, challenging U.S. Pat. No. 9,609,424.
Other: Hearing transcript; Exhibit—28, Filed on Apr. 18, 2023—Cited in IPR2022-00234, challenging U.S. Pat. No. 9124982.
Other: ORDER Granting Motion for Leave to File Corrected Petition , Exhibit—10, Filed on Feb. 2, 2022—Cited in IPR2022-00243, challenging U.S. Pat. No. 8,111,839.

(56) References Cited

OTHER PUBLICATIONS

Other: ORDER Granting Motion for Leave to File Corrected Petition , Exhibit—11, Filed on Feb. 2, 2022—Cited in IPR2022-00242, challenging U.S. Pat. No. 8,111,839.
Other: Fed Circuit mandate, Exhibit—34, Filed on Jun. 27, 2024—Cited in IPR2022-01106, challenging U.S. Pat. No. 11,039,259.
Other: Fed Circuit mandate, Exhibit—36, Filed on Jun. 27, 2024—Cited in IPR2022-00324, challenging U.S. Pat. No. 8,254,591.
Oxford Dictionary of Elecs and Electrical Eng (excerpts), Exhibit—2005, Filed on Mar. 21, 2022—Cited in IPR2022-00282, challenging U.S. Pat. No. 8,315,400.
P.R. 4-5(d) Joint Claim Construction Chart, Exhibit—2009, Filed on Feb. 22, 2023—Cited in IPR2022-00253, challenging U.S. Pat. No. 9,491,542.
P.R. 4-5(d) Joint Claim Construction Chart, Exhibit—2009, Filed on Feb. 22, 2023—Cited in IPR2022-00281, challenging U.S. Pat. No. 9,270,244.
Panel Change Order, Exhibit—12, Filed on Feb. 3, 2023—Cited in IPR2022-01106, challenging U.S. Pat. No. 11,039,259.
Patent Owner Brief Regarding Interim Procedure for Discretionary Denials, Exhibit—12, Filed on Jul. 1, 2022—Cited in IPR2022-00253, challenging U.S. Pat. No. 9,491,542.
Patent Owner Response; Exhibit—17, Filed on Sep. 9, 2022—Cited in IPR2022-00234, challenging U.S. Pat. No. 9124982.
Patent Owner Stanton Techiya LLC's Mandatory NoticePaper6, Jul. 3, 2024—Cited in IPR2024-01033, challenging U.S. Pat. No. 8,434,966.
Patent Owner Staton Techiya, LLC's Mandatory Notice, Exhibit—7, Filed on Jul. 3, 2024—Cited in IPR2024-01004, challenging U.S. Pat. No. 9,614,943.
Patent Owner Staton Techiya, LLC's Mandatory Notices, Exhibit—7, Filed on Jul. 3, 2024—Cited in IPR2024-01003, challenging U.S. Pat. No. 9,191,083.
Patent Owner Staton Techiya, LLC's Motion for the Pro Hac Vice Admission of Roy Falik, Exhibit—8, Filed on Jul. 5, 2024—Cited in IPR2024-01003, challenging U.S. Pat. No. 9,191,083.
Patent Owner Staton Techiya, LLC's Motion for the Pro Hac Vice Admission of Roy Falik, Exhibit—8, Filed on Jul. 5, 2024—Cited in IPR2024-01004, challenging U.S. Pat. No. 9,614,943.
Patent Owner Staton Techiya, LLC's Motion for the Pro Hac Vice Admission of Roy FalikPaper7, Jul. 5, 2024—Cited in IPR2024-01033, challenging U.S. Pat. No. 8,434,966.
Patent Owner Staton Techiya, LLC's Power of Attorney, Exhibit—6, Filed on Jul. 3, 2024—Cited in IPR2024-01003, challenging U.S. Pat. No. 9,191,083.
Patent Owner Staton Techiya, LLC's Power of Attorney, Exhibit—6, Filed on Jul. 3, 2024—Cited in IPR2024-01004, challenging U.S. Pat. No. 9,614,943.
Patent Owner Staton Techiya, LLC's Power of AttorneyPaper5, Jul. 3, 2024—Cited in IPR2024-01033, challenging U.S. Pat. No. 8,434,966.
Patent Owner's Brief Regarding Interim Procedure for Discretionary Denials, Exhibit—11, Filed on Jul. 1, 2022—Cited in IPR2022-00410, challenging U.S. Pat. No. 10,979,836.
Patent Owner's Brief Regarding Interim Procedure for Discretionary Denials, Exhibit—12, Filed on Jul. 1, 2022—Cited in IPR2022-00281, challenging U.S. Pat. No. 9,270,244.
Patent Owner's Brief Regarding Interim Procedure for Discretionary Denials, Exhibit—12, Filed on Jul. 1, 2022—Cited in IPR2022-00302, challenging U.S. Pat. No. 9,609,424.
Patent Owner's Brief Regarding Interim Procedure for Discretionary Denials, Exhibit—12, Filed on Jul. 1, 2022—Cited in IPR2022-00324, challenging U.S. Pat. No. 8,254,591.
Patent Owner's Brief Regarding Interim Procedure for Discretionary Denials, Exhibit—12, Filed on Jul. 1, 2022—Cited in IPR2022-00388, challenging U.S. Pat. No. 10,966,015.
Patent Owner's Brief Regarding Interim Procedure for Discretionary Denials, Exhibit—13, Filed on Jul. 1, 2022—Cited in IPR2022-00369, challenging U.S. Pat. No. 10,405,082.
Patent Owner's Corrected Notice of Appeal, Exhibit—38, Filed on Aug. 15, 2023—Cited in IPR2022-00243, challenging U.S. Pat. No. 8,111,839.
Patent Owner's Demonstratives, Exhibit—2008, Filed on Apr. 11, 2023—Cited in IPR2022-00302, challenging U.S. Pat. No. 9,609,424.
Patent Owner's Demonstratives, Exhibit—2010, Filed on Apr. 12, 2023—Cited in IPR2022-00253, challenging U.S. Pat. No. 9,491,542.
Patent Owner's Demonstratives, Exhibit—2010, Filed on Apr. 13, 2023—Cited in IPR2022-00281, challenging U.S. Pat. No. 9,270,244.
Patent Owner's Demonstratives, Exhibit—2010, Filed on Apr. 4, 2023—Cited in IPR2022-00324, challenging U.S. Pat. No. 8,254,591.
Patent Owner's Demonstratives, Exhibit—2012, Filed on May 9, 2023—Cited in IPR2022-00369, challenging U.S. Pat. No. 10,405,082.
Patent Owner's Demonstratives, Exhibit—2012, Filed on May 9, 2023—Cited in IPR2022-00388, challenging U.S. Pat. No. 10,966,015.
Patent Owner's Demonstratives, Exhibit—2014, Filed on Mar. 14, 2023—Cited in IPR2022-00282, challenging U.S. Pat. No. 8,315,400.
Patent Owner's Demonstratives, Exhibit—2014, Filed on Sep. 25, 2023—Cited in IPR2022-01078, challenging U.S. Pat. No. 11,057,701.
Patent Owner's Demonstratives, Exhibit—2015, Filed on Mar. 16, 2023—Cited in IPR2022-00242, challenging U.S. Pat. No. 8,111,839.
Patent Owner's Demonstratives, Exhibit—2015, Filed on Mar. 16, 2023—Cited in IPR2022-00243, challenging U.S. Pat. No. 8,111,839.
Patent Owner's Demonstratives, Exhibit—2021, Filed on Oct. 11, 2023—Cited in IPR2022-01106, challenging U.S. Pat. No. 11,039,259.
Patent Owner's Demonstratives; Exhibit—2014, Filed on Mar. 14, 2023—Cited in IPR2022-00234, challenging U.S. Pat. No. 9124982.
Patent Owner's Mandatory Notice under 37 C.F.R. 42.8, Exhibit—5, Filed on Jan. 19, 2022—Cited in IPR2022-00388, challenging U.S. Pat. No. 10,966,015.
Patent Owner's Mandatory Notice under 37 C.F.R. 42.8, Exhibit—5, Filed on Jan. 19, 2022—Cited in IPR2022-00410, challenging U.S. Pat. No. 10,979,836.
Patent Owner's Mandatory Notice under 37 C.F.R. 42.8, Exhibit—5, Filed on Dec. 28, 2021—Cited in IPR2022-00253, challenging U.S. Pat. No. 9,491,542.
Patent Owner's Mandatory Notice under 37 C.F.R. 42.8, Exhibit—5, Filed on Dec. 28, 2021—Cited in IPR2022-00281, challenging U.S. Pat. No. 9,270,244.
Patent Owner's Mandatory Notice under 37 C.F.R. 42.8, Exhibit—5, Filed on Dec. 28, 2021—Cited in IPR2022-00302, challenging U.S. Pat. No. 9,609,424.
Patent Owner's Mandatory Notice under 37 C.F.R. 42.8, Exhibit—5, Filed on Dec. 28, 2021—Cited in IPR2022-00324, challenging U.S. Pat. No. 8,254,591.
Patent Owner's Mandatory Notice under 37 C.F.R. 42.8, Exhibit—5, Filed on Jun. 22, 2022—Cited in IPR2022-01078, challenging U.S. Pat. No. 11,057,701.
Patent Owner's Mandatory Notice under 37 C.F.R. 42.8, Exhibit—5, Filed on Jun. 22, 2022—Cited in IPR2022-01099, challenging U.S. Pat. No. 11,244,666.
Patent Owner's Mandatory Notice under 37 C.F.R. 42.8, Exhibit—5, Filed on Jun. 22, 2022—Cited in IPR2022-01106, challenging U.S. Pat. No. 11,039,259.
Patent Owner's Mandatory Notice under 37 C.F.R. 42.8, Exhibit—6, Filed on Jun. 22, 2022—Cited in IPR2022-01098, challenging U.S. Pat. No. 11,217,237.
Patent Owner's Mandatory Notice under 37 C.F.R. 42.8, Exhibit—7, Filed on Dec. 28, 2021—Cited in IPR2022-00242, challenging U.S. Pat. No. 8,111,839.
Patent Owner's Mandatory Notice under 37 C.F.R. 42.8, Exhibit—7, Filed on Dec. 28, 2021—Cited in IPR2022-00243, challenging U.S. Pat. No. 8,111,839.
Patent Owner's Mandatory Notice under 37 C.F.R. 42.8, Exhibit—7, Filed on Dec. 28, 2021—Cited in IPR2022-00282, challenging U.S. Pat. No. 8,315,400.
Patent Owner's Mandatory Notice under 37 C.F.R. 42.8; Exhibit—6, Filed on Dec. 28, 2021—Cited in IPR2022-00234, challenging U.S. Pat. No. 9,124,982.
Patent Owner's Mandatory Notice under 37 CFR 42.8, Exhibit—6, Filed on Jan. 19, 2022—Cited in IPR2022-00369, challenging U.S. Pat. No. 10,405,082.
Patent Owner's Notice of Appeal, Exhibit—30, Filed on Aug. 11, 2023—Cited in IPR2022-00282, challenging U.S. Pat. No. 8,315,400.
Patent Owner's Notice of Appeal, Exhibit—33, Filed on Mar. 5, 2024—Cited in IPR2022-01106, challenging U.S. Pat. No. 11,039,259.

(56) References Cited

OTHER PUBLICATIONS

Patent Owner's Notice of Appeal, Exhibit—33, Filed on Sep. 8, 2023—Cited in IPR2022-00281, challenging U.S. Pat. No. 9,270,244.
Patent Owner's Notice of Appeal, Exhibit—34, Filed on Sep. 8, 2023—Cited in IPR2022-00253, challenging U.S. Pat. No. 9,491,542.
Patent Owner's Notice of Appeal, Exhibit—34, Filed on Sep. 8, 2023—Cited in IPR2022-00324, challenging U.S. Pat. No. 8,254,591.
Patent Owner's Notice of Appeal, Exhibit—38, Filed on Aug. 15, 2023—Cited in IPR2022-00242, challenging U.S. Pat. No. 8,111,839.
Patent Owner's Notice of Appeal; Exhibit—31, Filed on Aug. 11, 2023—Cited in IPR2022-00234, challenging U.S. Pat. No. 9124982.
Patent Owner's Notice of Cross-Appeal, Exhibit—39, Filed on Aug. 23, 2023—Cited in IPR2022-00302, challenging U.S. Pat. No. 9,609,424.
Patent Owner's Power of Attorney, Exhibit—4, Filed on Jan. 19, 2022—Cited in IPR2022-00388, challenging U.S. Pat. No. 10,966,015.
Patent Owner's Power of Attorney, Exhibit—4, Filed on Jan. 19, 2022—Cited in IPR2022-00410, challenging U.S. Pat. No. 10,979,836.
Patent Owner's Power of Attorney, Exhibit—4, Filed on Dec. 28, 2021—Cited in IPR2022-00253, challenging U.S. Pat. No. 9,491,542.
Patent Owner's Power of Attorney, Exhibit—4, Filed on Dec. 28, 2021—Cited in IPR2022-00281, challenging U.S. Pat. No. 9,270,244.
Patent Owner's Power of Attorney, Exhibit—4, Filed on Dec. 28, 2021—Cited in IPR2022-00302, challenging U.S. Pat. No. 9,609,424.
Patent Owner's Power of Attorney, Exhibit—4, Filed on Dec. 28, 2021—Cited in IPR2022-00324, challenging U.S. Pat. No. 8,254,591.
Patent Owner's Power of Attorney, Exhibit—4, Filed on Jun. 22, 2022—Cited in IPR2022-01078, challenging U.S. Pat. No. 11,057,701.
Patent Owner's Power of Attorney, Exhibit—4, Filed on Jun. 22, 2022—Cited in IPR2022-01099, challenging U.S. Pat. No. 11,244,666.
Patent Owner's Power of Attorney, Exhibit—4, Filed on Jun. 22, 2022—Cited in IPR2022-01106, challenging U.S. Pat. No. 11,039,259.
Patent Owner's Power of Attorney, Exhibit—5, Filed on Jan. 19, 2022—Cited in IPR2022-00369, challenging U.S. Pat. No. 10,405,082.
Patent Owner's Power of Attorney, Exhibit—5, Filed on Jun. 22, 2022—Cited in IPR2022-01098, challenging U.S. Pat. No. 11,217,237.
Patent Owner's Power of Attorney, Exhibit—6, Filed on Dec. 28, 2021—Cited in IPR2022-00242, challenging U.S. Pat. No. 8,111,839.
Patent Owner's Power of Attorney, Exhibit—6, Filed on Dec. 28, 2021—Cited in IPR2022-00243, challenging U.S. Pat. No. 8,111,839.
Patent Owner's Power of Attorney, Exhibit—6, Filed on Dec. 28, 2021—Cited in IPR2022-00282, challenging U.S. Pat. No. 8,315,400.
Patent Owner's Power of Attorney; Exhibit—5, Filed on Dec. 28, 2021—Cited in IPR2022-00234, challenging U.S. Pat. No. 9124982.
Patent Owner's Preliminary Response, Exhibit—12, Filed on Mar. 23, 2022—Cited in IPR2022-00243, challenging U.S. Pat. No. 8,111,839.
Patent Owner's Preliminary Response, Exhibit—13, Filed on Mar. 23, 2022—Cited in IPR2022-00242, challenging U.S. Pat. No. 8,111,839.
Patent Owner's Preliminary Response, Exhibit—7, Filed on Oct. 11, 2022—Cited in IPR2022-01106, challenging U.S. Pat. No. 11,039,259.
Patent Owner's Preliminary Response, Exhibit—7, Filed on Oct. 7, 2022—Cited in IPR2022-01078, challenging U.S. Pat. No. 11,057,701.
Patent Owner's Preliminary Response, Exhibit—7, Filed on Oct. 7, 2022—Cited in IPR2022-01099, challenging U.S. Pat. No. 11,244,666.
Patent Owner's Preliminary Response, Exhibit—7, Filed on May 18, 2022—Cited in IPR2022-00410, challenging U.S. Pat. No. 10,979,836.
Patent Owner's Preliminary Response, Exhibit—8, Filed on Oct. 7, 2022—Cited in IPR2022-01098, challenging U.S. Pat. No. 11,217,237.
Patent Owner's Preliminary Response, Exhibit—8, Filed on Apr. 13, 2022—Cited in IPR2022-00302, challenging U.S. Pat. No. 9,609,424.
Patent Owner's Preliminary Response, Exhibit—8, Filed on Apr. 13, 2022—Cited in IPR2022-00324, challenging U.S. Pat. No. 8,254,591.
Patent Owner's Preliminary Response, Exhibit—8, Filed on Apr. 18, 2022—Cited in IPR2022-00253, challenging U.S. Pat. No. 9,491,542.
Patent Owner's Preliminary Response, Exhibit—8, Filed on Apr. 18, 2022—Cited in IPR2022-00281, challenging U.S. Pat. No. 9,270,244.
Patent Owner's Preliminary Response, Exhibit—8, Filed on May 18, 2022—Cited in IPR2022-00388, challenging U.S. Pat. No. 10,966,015.
Patent Owner's Preliminary Response, Exhibit—9, Filed on Mar. 21, 2022—Cited in IPR2022-00282, challenging U.S. Pat. No. 8,315,400.
Patent Owner's Preliminary Response, Exhibit—9, Filed on May 18, 2022—Cited in IPR2022-00369, challenging U.S. Pat. No. 10,405,082.
Patent Owner's Preliminary Response; Exhibit—9, Filed on Mar. 21, 2022—Cited in IPR2022-00234, challenging U.S. Pat. No. 9124982.
Patent Owner's Preliminary Sur-Reply, Exhibit—10, Filed on Nov. 22, 2022—Cited in IPR2022-01098, challenging U.S. Pat. No. 11,217,237.
Patent Owner's Preliminary Sur-Reply, Exhibit—10, Filed on May 19, 2022—Cited in IPR2022-00302, challenging U.S. Pat. No. 9,609,424.
Patent Owner's Preliminary Sur-Reply, Exhibit—10, Filed on May 20, 2022—Cited in IPR2022-00324, challenging U.S. Pat. No. 8,254,591.
Patent Owner's Preliminary Sur-Reply, Exhibit—10, Filed on May 31, 2022—Cited in IPR2022-00253, challenging U.S. Pat. No. 9,491,542.
Patent Owner's Preliminary Sur-Reply, Exhibit—10, Filed on Jun. 23, 2022—Cited in IPR2022-00388, challenging U.S. Pat. No. 10,966,015.
Patent Owner's Preliminary Sur-Reply, Exhibit—10, Filed on Jun. 7, 2022—Cited in IPR2022-00281, challenging U.S. Pat. No. 9,270,244.
Patent Owner's Preliminary Sur-Reply, Exhibit—11, Filed on Apr. 29, 2022—Cited in IPR2022-00282, challenging U.S. Pat. No. 8,315,400.
Patent Owner's Preliminary Sur-Reply, Exhibit—11, Filed on Jun. 23, 2022—Cited in IPR2022-00369, challenging U.S. Pat. No. 10,405,082.
Patent Owner's Preliminary Sur-Reply, Exhibit—14, Filed on Apr. 29, 2022—Cited in IPR2022-00243, challenging U.S. Pat. No. 8,111,839.
Patent Owner's Preliminary Sur-Reply, Exhibit—15, Filed on Apr. 29, 2022—Cited in IPR2022-00242, challenging U.S. Pat. No. 8,111,839.
Patent Owner's Preliminary Sur-Reply, Exhibit—9, Filed on Nov. 17, 2022—Cited in IPR2022-01099, challenging U.S. Pat. No. 11,244,666.
Patent Owner's Preliminary Sur-Reply, Exhibit—9, Filed on Nov. 18, 2022—Cited in IPR2022-01078, challenging U.S. Pat. No. 11,057,701.
Patent Owner's Preliminary Sur-Reply, Exhibit—9, Filed on Nov. 18, 2022—Cited in IPR2022-01106, challenging U.S. Pat. No. 11,039,259.
Patent Owner's Preliminary Sur-Reply, Exhibit—9, Filed on Jun. 23, 2022—Cited in IPR2022-00410, challenging U.S. Pat. No. 10,979,836.
Patent Owner's Preliminary Sur-Reply; Exhibit—11, Filed on Apr. 29, 2022—Cited in IPR2022-00234, challenging U.S. Pat. No. 9124982.
Patent Owner's Request for Oral Argument, Exhibit—21, Filed on Feb. 3, 2023—Cited in IPR2022-00282, challenging U.S. Pat. No. 8,315,400.
Patent Owner's Request for Oral Argument, Exhibit—21, Filed on Aug. 17, 2023—Cited in IPR2022-01078, challenging U.S. Pat. No. 11,057,701.
Patent Owner's Request for Oral Argument, Exhibit—22, Filed on Feb. 28, 2023—Cited in IPR2022-00302, challenging U.S. Pat. No. 9,609,424.
Patent Owner's Request for Oral Argument, Exhibit—23, Filed on Mar. 1, 2023—Cited in IPR2022-00281, challenging U.S. Pat. No. 9,270,244.

(56) References Cited

OTHER PUBLICATIONS

Patent Owner's Request for Oral Argument, Exhibit—24, Filed on Feb. 28, 2023—Cited in IPR2022-00324, challenging U.S. Pat. No. 8,254,591.
Patent Owner's Request for Oral Argument, Exhibit—24, Filed on Mar. 1, 2023—Cited in IPR2022-00253, challenging U.S. Pat. No. 9,491,542.
Patent Owner's Request for Oral Argument, Exhibit—24, Filed on Apr. 4, 2023—Cited in IPR2022-00388, challenging U.S. Pat. No. 10,966,015.
Patent Owner's Request for Oral Argument, Exhibit—25, Filed on Apr. 4, 2023—Cited in IPR2022-00369, challenging U.S. Pat. No. 10,405,082.
Patent Owner's Request for Oral Argument, Exhibit—25, Filed on Aug. 28, 2023—Cited in IPR2022-01106, challenging U.S. Pat. No. 11,039,259.
Patent Owner's Request for Oral Argument, Exhibit—26, Filed on Feb. 7, 2023—Cited in IPR2022-00243, challenging U.S. Pat. No. 8,111,839.
Patent Owner's Request for Oral Argument, Exhibit—27, Filed on Feb. 7, 2023—Cited in IPR2022-00242, challenging U.S. Pat. No. 8,111,839.
Patent Owner's Request for Oral Argument; Exhibit—22, Filed on Feb. 3, 2023—Cited in IPR2022-00234, challenging U.S. Pat. No. 9124982.
Patent Owner's Response, Exhibit—14, Filed on Mar. 23, 2023—Cited in IPR2022-01078, challenging U.S. Pat. No. 11,057,701.
Patent Owner's Response, Exhibit—15, Filed on Sep. 9, 2022—Cited in IPR2022-00282, challenging U.S. Pat. No. 8,315,400.
Patent Owner's Response, Exhibit—16, Filed on Dec. 6, 2024—Cited in IPR2024-00559, challenging U.S. Pat. No. 11,610,587.
Patent Owner's Response, Exhibit—17, Filed on Apr. 10, 2023—Cited in IPR2022-01106, challenging U.S. Pat. No. 11,039,259.
Patent Owner's Response, Exhibit—18, Filed on Oct. 17, 2022—Cited in IPR2022-00302, challenging U.S. Pat. No. 9,609,424.
Patent Owner's Response, Exhibit—18, Filed on Nov. 8, 2022—Cited in IPR2022-00388, challenging U.S. Pat. No. 10,966,015.
Patent Owner's Response, Exhibit—19, Filed on Oct. 19, 2022—Cited in IPR2022-00253, challenging U.S. Pat. No. 9,491,542.
Patent Owner's Response, Exhibit—19, Filed on Oct. 19, 2022—Cited in IPR2022-00281, challenging U.S. Pat. No. 9,270,244.
Patent Owner's Response, Exhibit—19, Filed on Nov. 8, 2022—Cited in IPR2022-00369, challenging U.S. Pat. No. 10,405,082.
Patent Owner's Response, Exhibit—20, Filed on Oct. 17, 2022—Cited in IPR2022-00324, challenging U.S. Pat. No. 8,254,591.
Patent Owner's Response, Exhibit—21, Filed on Sep. 13, 2022—Cited in IPR2022-00243, challenging U.S. Pat. No. 8,111,839.
Patent Owner's Response, Exhibit—22, Filed on Sep. 13, 2022—Cited in IPR2022-00242, challenging U.S. Pat. No. 8,111,839.
Patent Owner's Sur-Reply, Exhibit—19, Filed on Jan. 12, 2023—Cited in IPR2022-00282, challenging U.S. Pat. No. 8,315,400.
Patent Owner's Sur-Reply, Exhibit—19, Filed on Jul. 26, 2023—Cited in IPR2022-01078, challenging U.S. Pat. No. 11,057,701.
Patent Owner's Sur-Reply, Exhibit—21, Filed on Feb. 21, 2023—Cited in IPR2022-00302, challenging U.S. Pat. No. 9,609,424.
Patent Owner's Sur-Reply, Exhibit—22, Filed on Feb. 22, 2023—Cited in IPR2022-00281, challenging U.S. Pat. No. 9,270,244.
Patent Owner's Sur-Reply, Exhibit—22, Filed on Mar. 13, 2023—Cited in IPR2022-00388, challenging U.S. Pat. No. 10,966,015.
Patent Owner's Sur-Reply, Exhibit—23, Filed on Feb. 20, 2023—Cited in IPR2022-00324, challenging U.S. Pat. No. 8,254,591.
Patent Owner's Sur-Reply, Exhibit—23, Filed on Feb. 22, 2023—Cited in IPR2022-00253, challenging U.S. Pat. No. 9,491,542.
Patent Owner's Sur-Reply, Exhibit—23, Filed on Mar. 13, 2023—Cited in IPR2022-00369, challenging U.S. Pat. No. 10,405,082.
Patent Owner's Sur-Reply, Exhibit—23, Filed on Aug. 14, 2023—Cited in IPR2022-01106, challenging U.S. Pat. No. 11,039,259.
Patent Owner's Sur-Reply, Exhibit—25, Filed on Jan. 17, 2023—Cited in IPR2022-00243, challenging U.S. Pat. No. 8,111,839.
Patent Owner's Sur-Reply, Exhibit—26, Filed on Jan. 12, 2023—Cited in IPR2022-00242, challenging U.S. Pat. No. 8,111,839.
Patent Owner's Sur-Reply; Exhibit—21, Filed on Jan. 13, 2023—Cited in IPR2022-00234, challenging U.S. Pat. No. 9124982.
Patent Owner's Unopposed Motion to Withdraw and Substitute Counsel Under 37 CFR 11.116, Exhibit—11, Filed on Nov. 13, 2024—Cited in IPR2024-00559, challenging U.S. Pat. No. 11,610,587.
Patent Owner's Unopposed Motion to Withdraw and Substitute Counsel Under 37 CFR 11.116, Exhibit—11, Filed on Nov. 21, 2024—Cited in IPR2024-01003, challenging U.S. Pat. No. 9,191,083.
Patent Owner's Unopposed Motion to Withdraw and Substitute Counsel Under 37 CFR 11.116, Exhibit—11, Filed on Nov. 21, 2024—Cited in IPR2024-01004, challenging U.S. Pat. No. 9,614,943.
Patent Owner's Unopposed Motion to Withdraw and Substitute Counsel Under 37 CFR 11.116, Exhibit—11, Filed on Nov. 21, 2024—Cited in IPR2024-01031, challenging U.S. Pat. No. 7,049,850.
Patent Owner's Unopposed Motion to Withdraw and Substitute Counsel Under 37 CFR 11.116, Exhibit—12, Filed on Nov. 21, 2024—Cited in IPR2024-01034, challenging U.S. Pat. No. 9,279,263.
Patent Owner's Unopposed Motion to Withdraw and Substitute Counsel Under 37 CFR 11.116Paper10, Nov. 21, 2024—Cited in IPR2024-01033, challenging U.S. Pat. No. 8,434,966.
Patent Owner's Updated Exhibit List, Exhibit—23, Filed on Sep. 25, 2023—Cited in IPR2022-01078, challenging U.S. Pat. No. 11,057,701.
Patent Owner's Updated Mandatory Notice under 37 C.F.R. 42.8, Exhibit—15, Filed on Jul. 27, 2022—Cited in IPR2022-00324, challenging U.S. Pat. No. 8,254,591.
Patent Owner's Updated Mandatory Notice under 37 C.F.R. 42.8, Exhibit—17, Filed on Jul. 27, 2022—Cited in IPR2022-00243, challenging U.S. Pat. No. 8,111,839.
Patent Owner's Updated Mandatory Notice under 37 C.F.R. 42.8, Exhibit—18, Filed on Jul. 27, 2022—Cited in IPR2022-00242, challenging U.S. Pat. No. 8,111,839.
Patent Owner's Updated Mandatory Notice under 37 C.F.R. 42.8, Exhibit—8, Filed on Dec. 28, 2021—Cited in IPR2022-00242, challenging U.S. Pat. No. 8,111,839.
Patent Owner's Updated Mandatory Notice under 37 C.F.R. 42.8; Exhibit—14, Filed on Jul. 27, 2022—Cited in IPR2022-00234, challenging U.S. Pat. No. 9124982.
Patent Owner's Updated Mandatory Notice under 37 C.F.R. 42.8; Exhibit—7, Filed on Dec. 28, 2021—Cited in IPR2022-00234, challenging U.S. Pat. No. 9124982.
Patent Owner's Updated Mandatory Notice, Exhibit—17, Filed on Sep. 13, 2022—Cited in IPR2022-00253, challenging U.S. Pat. No. 9,491,542.
Patent Owner's Updated Mandatory Notice, Exhibit—17, Filed on Sep. 13, 2022—Cited in IPR2022-00281, challenging U.S. Pat. No. 9,270,244.
Patent Owner's Updated Mandatory Notice, Exhibit—18, Filed on Jun. 28, 2023—Cited in IPR2022-01078, challenging U.S. Pat. No. 11,057,701.
Patent Owner's Updated Mandatory Notice, Exhibit—20, Filed on Jun. 28, 2023—Cited in IPR2022-01106, challenging U.S. Pat. No. 11,039,259.
Patent Owner's Updated Mandatory Notice, Exhibit—29, Filed on Jun. 28, 2023—Cited in IPR2022-00282, challenging U.S. Pat. No. 8,315,400.
Patent Owner's Updated Mandatory Notice, Exhibit—29, Filed on Jun. 28, 2023—Cited in IPR2022-00388, challenging U.S. Pat. No. 10,966,015.
Patent Owner's Updated Mandatory Notice, Exhibit—30, Filed on Jun. 28, 2023—Cited in IPR2022-00281, challenging U.S. Pat. No. 9,270,244.
Patent Owner's Updated Mandatory Notice, Exhibit—30, Filed on Jun. 28, 2023—Cited in IPR2022-00369, challenging U.S. Pat. No. 10,405,082.
Patent Owner's Updated Mandatory Notice, Exhibit—31, Filed on Jun. 28, 2023—Cited in IPR2022-00253, challenging U.S. Pat. No. 9,491,542.
Patent Owner's Updated Mandatory Notice, Exhibit—31, Filed on Jun. 28, 2023—Cited in IPR2022-00324, challenging U.S. Pat. No. 8,254,591.

(56) References Cited

OTHER PUBLICATIONS

Patent Owner's Updated Mandatory Notice, Exhibit—35, Filed on Jun. 28, 2023—Cited in IPR2022-00302, challenging U.S. Pat. No. 9,609,424.
Patent Owner's Updated Mandatory Notice, Exhibit—36, Filed on Jun. 28, 2023—Cited in IPR2022-00243, challenging U.S. Pat. No. 8,111,839.
Patent Owner's Updated Mandatory Notice, Exhibit—37, Filed on Jun. 28, 2023—Cited in IPR2022-00242, challenging U.S. Pat. No. 8,111,839.
Patent Owner's Updated Mandatory Notice; Exhibit—30, Filed on Jun. 28, 2023—Cited in IPR2022-00234, challenging U.S. Pat. No. 9,124,982.
Patent Owner's Updated Mandatory Notices, Exhibit—15, Filed on Dec. 6, 2024—Cited in IPR2024-00559, challenging U.S. Pat. No. 11,610,587.
Patent Owner's Updated Power of Attorney Pursuant to 37 CFR 41.10(b), Exhibit—14, Filed on Dec. 6, 2024—Cited in IPR2024-00559, challenging U.S. Pat. No. 11,610,587.
Petition : as filed for Inter Partes Review of U.S. Pat. No. 11,610,587, Exhibit—4, Filed on Feb. 9, 2024—Cited in IPR2024-00559, challenging U.S. Pat. No. 11,610,587.
Petition : as filed, Exhibit—3, Filed on Jun. 12, 2024—Cited in IPR2024-01003, challenging U.S. Pat. No. 9,191,083.
Petition : as filed, Exhibit—3, Filed on Jun. 12, 2024—Cited in IPR2024-01004, challenging U.S. Pat. No. 9,614,943.
Petition : as filed, Exhibit—4, Filed on Jun. 25, 2024—Cited in IPR2024-01031, challenging U.S. Pat. No. 7,049,850.
Petition : as filed, Exhibit—5, Filed on Jul. 1, 2024—Cited in IPR2024-01034, challenging U.S. Pat. No. 9,279,263.
Petition : as filedPaper3, Jun. 18, 2024—Cited in IPR2024-01033, challenging U.S. Pat. No. 8,434,966.
Petition for Inter Partes Review of U.S. Pat. No. 11,217,237, Exhibit—4, Filed on Jun. 9, 2022—Cited in IPR2022-01098, challenging U.S. Pat. No. 11,217,237.
Petition for Inter Partes Review of U.S. Pat. No. 11,244,666, Exhibit—3, Filed on Jun. 9, 2022—Cited in IPR2022-01099, challenging U.S. Pat. No. 11,244,666.
Petition for Inter Partes Review of U.S. Pat. No. 8,254,591, Exhibit—3, Filed on Dec. 20, 2021—Cited in IPR2022-00324, challenging U.S. Pat. No. 8,254,591.
Petition for Inter Partes Review of U.S. Pat. No. 10,405,082, Exhibit—3, Filed on Dec. 30, 2021—Cited in IPR2022-00369, challenging U.S. Pat. No. 10,405,082.
Petition for Inter Partes Review of U.S. Pat. No. 10,966,015, Exhibit—3, Filed on Jan. 4, 2022—Cited in IPR2022-00388, challenging U.S. Pat. No. 10,966,015.
Petition for Inter Partes Review of U.S. Pat. No. 10,979,836, Exhibit—3, Filed on Jan. 14, 2022—Cited in IPR2022-00410, challenging U.S. Pat. No. 10,979,836.
Petition for Inter Partes Review of U.S. Pat. No. 11,039,259, Exhibit—3, Filed on Jun. 9, 2022—Cited in IPR2022-01106, challenging U.S. Pat. No. 11,039,259.
Petition for Inter Partes Review of U.S. Pat. No. 8,111,839, Exhibit—3, Filed on Dec. 13, 2021—Cited in IPR2022-00242, challenging U.S. Pat. No. 8,111,839.
Petition for Inter Partes Review of U.S. Pat. No. 8,111,839, Exhibit—3, Filed on Dec. 13, 2021—Cited in IPR2022-00243, challenging U.S. Pat. No. 8,111,839.
Petition for Inter Partes Review of U.S. Pat. No. 9,124,982; Exhibit—3, Filed on Dec. 13, 2021—Cited in IPR2022-00234, challenging U.S. Pat. No. 9124982.
Petition for Inter Partes Review of U.S. Pat. No. 9,270,244, Exhibit—3, Filed on Dec. 21, 2021—Cited in IPR2022-00281, challenging U.S. Pat. No. 9,270,244.
Petition for Inter Partes Review of U.S. Pat. No. 9,491,542, Exhibit—3, Filed on Dec. 17, 2021—Cited in IPR2022-00253, challenging U.S. Pat. No. 9,491,542.
Petition for Inter Partes Review of U.S. Pat. No. 9,609,424, Exhibit—3, Filed on Dec. 21, 2021—Cited in IPR2022-00302, challenging U.S. Pat. No. 9,609,424.
Petition of Inter Partes Review of U.S. Pat. No. 11,057,701, Exhibit—3, Filed on Jun. 9, 2022—Cited in IPR2022-01078, challenging U.S. Pat. No. 11,057,701.
Petition with Proposed Corrections in Redline, Exhibit—1042, Filed on Jan. 31, 2022—Cited in IPR2022-00242, challenging U.S. Pat. No. 8,111,839.
Petition with Proposed Corrections in Redline, Exhibit—1042, Filed on Jan. 31, 2022—Cited in IPR2022-00243, challenging U.S. Pat. No. 8,111,839.
Petitioner's Power of Attorney from Samsung Electronics Co., Ltd.; Exhibit—1, Filed on Dec. 13, 2021—Cited in IPR2022-00234, challenging U.S. Pat. No. 9124982.
Petitioner's Power of Attorney from Samsung Electronics, America, Inc.; Exhibit—2, Filed on Dec. 13, 2021—Cited in IPR2022-00234, challenging U.S. Pat. No. 9,124,982.
Petitioner's Updated Mandatory Notices, Exhibit—16, Filed on Oct. 13, 2022—Cited in IPR2022-00388, challenging U.S. Pat. No. 10,966,015.
Petitioner's Updated Mandatory Notices, Exhibit—17, Filed on Oct. 13, 2022—Cited in IPR2022-00369, challenging U.S. Pat. No. 10,405,082.
Petitioner's Updated Mandatory Notices; Exhibit—27, Filed on Apr. 3, 2023—Cited in IPR2022-00234, challenging U.S. Pat. No. 9124982.
Petitioners Supplemental Brief on Interim Fintiv Guidance, Exhibit—10, Filed on Jul. 1, 2022—Cited in IPR2022-00410, challenging U.S. Pat. No. 10,979,836.
Petitioners Supplemental Brief on Interim Fintiv Guidance, Exhibit—11, Filed on Jul. 1, 2022—Cited in IPR2022-00253, challenging U.S. Pat. No. 9,491,542.
Petitioners Supplemental Brief on Interim Fintiv Guidance, Exhibit—11, Filed on Jul. 1, 2022—Cited in IPR2022-00281, challenging U.S. Pat. No. 9,270,244.
Petitioners Supplemental Brief on Interim Fintiv Guidance, Exhibit—11, Filed on Jul. 1, 2022—Cited in IPR2022-00302, challenging U.S. Pat. No. 9,609,424.
Petitioners Supplemental Brief on Interim Fintiv Guidance, Exhibit—11, Filed on Jul. 1, 2022—Cited in IPR2022-00324, challenging U.S. Pat. No. 8,254,591.
Petitioners Supplemental Brief on Interim Fintiv Guidance, Exhibit—11, Filed on Jul. 1, 2022—Cited in IPR2022-00388, challenging U.S. Pat. No. 10,966,015.
Petitioners Supplemental Brief on Interim Fintiv Guidance, Exhibit—12, Filed on Jul. 1, 2022—Cited in IPR2022-00369, challenging U.S. Pat. No. 10,405,082.
Petitioners' Demonstrative Exhibits for Oral Argument, Exhibit—1019, Filed on Mar. 14, 2023—Cited in IPR2022-00282, challenging U.S. Pat. No. 8,315,400.
Petitioners' Demonstrative Exhibits for Oral Argument; Exhibit—1045, Filed on Mar. 14, 2023—Cited in IPR2022-00234, challenging U.S. Pat. No. 9124982.
Petitioners' Motion for Leave to File Corrected Petition, Exhibit—9, Filed on Jan. 31, 2022—Cited in IPR2022-00243, challenging U.S. Pat. No. 8,111,839.
Petitioners' Motion to Submit Supplemental Information Pursuant to 37 C.F.R. §42.123(b), Exhibit—29, Filed on Apr. 13, 2023—Cited in IPR2022-00302, challenging U.S. Pat. No. 9,609,424.
Petitioners' Notice of Appeal, Exhibit—31, Filed on Aug. 11, 2023—Cited in IPR2022-00282, challenging U.S. Pat. No. 8,315,400.
Petitioners' Notice of Appeal, Exhibit—38, Filed on Aug. 11, 2023—Cited in IPR2022-00302, challenging U.S. Pat. No. 9,609,424.
Petitioners' Notice of Cross-Appeal, Exhibit—34, Filed on Sep. 20, 2023—Cited in IPR2022-00281, challenging U.S. Pat. No. 9,270,244.
Petitioners' Notice of Cross-Appeal, Exhibit—35, Filed on Sep. 20, 2023—Cited in IPR2022-00253, challenging U.S. Pat. No. 9,491,542.
Petitioners' Notice of Cross-Appeal, Exhibit—35, Filed on Sep. 20, 2023—Cited in IPR2022-00324, challenging U.S. Pat. No. 8,254,591.
Petitioners' Notice of Cross-Appeal, Exhibit—39, Filed on Aug. 24, 2023—Cited in IPR2022-00242, challenging U.S. Pat. No. 8,111,839.

(56) References Cited

OTHER PUBLICATIONS

Petitioners' Notice of Cross-Appeal; Exhibit—32, Filed on Aug. 24, 2023—Cited in IPR2022-00234, challenging U.S. Pat. No. 9124982.
Petitioners' Notice of Depo of Chrisotpher Struck, Exhibit—16, Filed on May 15, 2023—Cited in IPR2022-01078, challenging U.S. Pat. No. 11,057,701.
Petitioners' Notice of Deposition of Christopher Struck, Exhibit—19, Filed on Nov. 15, 2022—Cited in IPR2022-00302, challenging U.S. Pat. No. 9,609,424.
Petitioners' Notice of Deposition of Daniel P. Anagnos, Exhibit—23, Filed on Nov. 9, 2022—Cited in IPR2022-00243, challenging U.S. Pat. No. 8,111,839.
Petitioners' Notice of Deposition of Daniel P. Anagnos, Exhibit—24, Filed on Nov. 9, 2022—Cited in IPR2022-00242, challenging U.S. Pat. No. 8,111,839.
Petitioners' Notice of Deposition of Daniel P. Anagnos; Exhibit—19, Filed on Nov. 9, 2022—Cited in IPR2022-00234, challenging U.S. Pat. No. 9124982.
Petitioners' Notice of Deposition of David Kleinschmidt, Exhibit—19, Filed on May 24, 2023—Cited in IPR2022-01106, challenging U.S. Pat. No. 11,039,259.
Petitioners' Notice of Objections to Evidence, Exhibit—18, Filed on Apr. 19, 2023—Cited in IPR2022-01106, challenging U.S. Pat. No. 11,039,259.
Petitioners' Notice of Objections to Evidence, Exhibit—22, Filed on Sep. 20, 2022—Cited in IPR2022-00243, challenging U.S. Pat. No. 8,111,839.
Petitioners' Notice of Objections to Evidence, Exhibit—23, Filed on Sep. 20, 2022—Cited in IPR2022-00242, challenging U.S. Pat. No. 8,111,839.
Petitioners' Notice of Objections to Evidence; Exhibit—18, Filed on Sep. 16, 2022—Cited in IPR2022-00234, challenging U.S. Pat. No. 9,124,982.
Petitioners' Preliminary Reply, Exhibit—10, Filed on Apr. 20, 2022—Cited in IPR2022-00282, challenging U.S. Pat. No. 8,315,400.
Petitioners' Preliminary Reply, Exhibit—10, Filed on Jun. 14, 2022—Cited in IPR2022-00369, challenging U.S. Pat. No. 10,405,082.
Petitioners' Preliminary Reply, Exhibit—13, Filed on Apr. 20, 2022—Cited in IPR2022-00243, challenging U.S. Pat. No. 8,111,839.
Petitioners' Preliminary Reply, Exhibit—14, Filed on Apr. 20, 2022—Cited in IPR2022-00242, challenging U.S. Pat. No. 8,111,839.
Petitioners' Preliminary Reply, Exhibit—8, Filed on Nov. 10, 2022—Cited in IPR2022-01078, challenging U.S. Pat. No. 11,057,701.
Petitioners' Preliminary Reply, Exhibit—8, Filed on Nov. 10, 2022—Cited in IPR2022-01099, challenging U.S. Pat. No. 11,244,666.
Petitioners' Preliminary Reply, Exhibit—8, Filed on Nov. 10, 2022—Cited in IPR2022-01106, challenging U.S. Pat. No. 11,039,259.
Petitioners' Preliminary Reply, Exhibit—8, Filed on Jun. 14, 2022—Cited in IPR2022-00410, challenging U.S. Pat. No. 10,979,836.
Petitioners' Preliminary Reply, Exhibit—9, Filed on Nov. 15, 2022—Cited in IPR2022-01098, challenging U.S. Pat. No. 11,217,237.
Petitioners' Preliminary Reply, Exhibit—9, Filed on May 10, 2022—Cited in IPR2022-00302, challenging U.S. Pat. No. 9,609,424.
Petitioners' Preliminary Reply, Exhibit—9, Filed on May 11, 2022—Cited in IPR2022-00324, challenging U.S. Pat. No. 8,254,591.
Petitioners' Preliminary Reply, Exhibit—9, Filed on May 20, 2022—Cited in IPR2022-00253, challenging U.S. Pat. No. 9,491,542.
Petitioners' Preliminary Reply, Exhibit—9, Filed on May 27, 2022—Cited in IPR2022-00281, challenging U.S. Pat. No. 9,270,244.
Petitioners' Preliminary Reply, Exhibit—9, Filed on Jun. 14, 2022—Cited in IPR2022-00388, challenging U.S. Pat. No. 10,966,015.
Petitioners' Preliminary Reply; Exhibit—10, Filed on Apr. 20, 2022—Cited in IPR2022-00234, challenging U.S. Pat. No. 9124982.
Petitioners' Reply to Patent Owner's Response, Exhibit—17, Filed on Dec. 2, 2022—Cited in IPR2022-00282, challenging U.S. Pat. No. 8,315,400.
Petitioners' Reply to Patent Owner's Response, Exhibit—17, Filed on Jun. 15, 2023—Cited in IPR2022-01078, challenging U.S. Pat. No. 11,057,701.
Petitioners' Reply to Patent Owner's Response, Exhibit—20, Filed on Jan. 10, 2023—Cited in IPR2022-00302, challenging U.S. Pat. No. 9,609,424.
Petitioners' Reply to Patent Owner's Response, Exhibit—20, Filed on Jan. 31, 2023—Cited in IPR2022-00388, challenging U.S. Pat. No. 10,966,015.
Petitioners' Reply to Patent Owner's Response, Exhibit—21, Filed on Jan. 11, 2023—Cited in IPR2022-00281, challenging U.S. Pat. No. 9,270,244.
Petitioners' Reply to Patent Owner's Response, Exhibit—21, Filed on Jan. 31, 2023—Cited in IPR2022-00369, challenging U.S. Pat. No. 10,405,082.
Petitioners' Reply to Patent Owner's Response, Exhibit—21, Filed on Jun. 30, 2023—Cited in IPR2022-01106, challenging U.S. Pat. No. 11,039,259.
Petitioners' Reply to Patent Owner's Response, Exhibit—22, Filed on Jan. 10, 2023—Cited in IPR2022-00324, challenging U.S. Pat. No. 8,254,591.
Petitioners' Reply to Patent Owner's Response, Exhibit—24, Filed on Dec. 6, 2022—Cited in IPR2022-00243, challenging U.S. Pat. No. 8,111,839.
Petitioners' Reply to Patent Owner's Response, Exhibit—25, Filed on Dec. 6, 2022—Cited in IPR2022-00242, challenging U.S. Pat. No. 8,111,839.
Petitioners' Reply to Patent Owner's Response; Exhibit—20, Filed on Dec. 2, 2022—Cited in IPR2022-00234, challenging U.S. Pat. No. 9124982.
Petitioners' Reply to Patent Owners Response, Exhibit—21, Filed on Jan. 11, 2023—Cited in IPR2022-00253, challenging U.S. Pat. No. 9,491,542.
Petitioners' Request for Oral Argument, Exhibit—20, Filed on Aug. 17, 2023—Cited in IPR2022-01078, challenging U.S. Pat. No. 11,057,701.
Petitioners' Request for Oral Argument, Exhibit—22, Filed on Feb. 3, 2023—Cited in IPR2022-00282, challenging U.S. Pat. No. 8,315,400.
Petitioners' Request for Oral Argument, Exhibit—23, Filed on Feb. 28, 2023—Cited in IPR2022-00302, challenging U.S. Pat. No. 9,609,424.
Petitioners' Request for Oral Argument, Exhibit—24, Filed on Mar. 1, 2023—Cited in IPR2022-00281, challenging U.S. Pat. No. 9,270,244.
Petitioners' Request for Oral Argument, Exhibit—24, Filed on Aug. 28, 2023—Cited in IPR2022-01106, challenging U.S. Pat. No. 11,039,259.
Petitioners' Request for Oral Argument, Exhibit—25, Filed on Feb. 28, 2023—Cited in IPR2022-00324, challenging U.S. Pat. No. 8,254,591.
Petitioners' Request for Oral Argument, Exhibit—25, Filed on Mar. 1, 2023—Cited in IPR2022-00253, challenging U.S. Pat. No. 9,491,542.
Petitioners' Request for Oral Argument, Exhibit—25, Filed on Apr. 4, 2023—Cited in IPR2022-00388, challenging U.S. Pat. No. 10,966,015.
Petitioners' Request for Oral Argument, Exhibit—26, Filed on Apr. 4, 2023—Cited in IPR2022-00369, challenging U.S. Pat. No. 10,405,082.
Petitioners' Request for Oral Argument, Exhibit—27, Filed on Feb. 7, 2023—Cited in IPR2022-00243, challenging U.S. Pat. No. 8,111,839.
Petitioners' Request for Oral Argument, Exhibit—28, Filed on Feb. 7, 2023—Cited in IPR2022-00242, challenging U.S. Pat. No. 8,111,839.
Petitioners' Request for Oral Argument; Exhibit—23, Filed on Feb. 3, 2023—Cited in IPR2022-00234, challenging U.S. Pat. No. 9124982.
Petitioners' Request for Refund of Post-Institution Fee, Exhibit—12, Filed on Mar. 2, 2023—Cited in IPR2022-01099, challenging U.S. Pat. No. 11,244,666.
Petitioners' Request for Refund of Post-Institution Fee, Exhibit—13, Filed on Jan. 18, 2023—Cited in IPR2022-00410, challenging U.S. Pat. No. 10,979,836.
Petitioners' Request for Refund of Post-Institution Fee, Exhibit—13, Filed on Mar. 2, 2023—Cited in IPR2022-01098, challenging U.S. Pat. No. 11,217,237.
Petitioners' Request for Refund of Post-Institution Fees, Exhibit—17, Filed on Dec. 16, 2024—Cited in IPR2024-01003, challenging U.S. Pat. No. 9,191,083.

(56) References Cited

OTHER PUBLICATIONS

Petitioners' Request for Refund of Post-Institution Fees, Exhibit—17, Filed on Dec. 16, 2024—Cited in IPR2024-01004, challenging U.S. Pat. No. 9,614,943.
Petitioners' Request for Refund of Post-Institution Fees, Exhibit—17, Filed on Dec. 16, 2024—Cited in IPR2024-01031, challenging U.S. Pat. No. 7,049,850.
Petitioners' Request for Refund of Post-Institution Fees, Exhibit—18, Filed on Dec. 16, 2024—Cited in IPR2024-01034, challenging U.S. Pat. No. 9,279,263.
Petitioners' Request for Refund of Post-Institution FeesPaper16, Dec. 16, 2024—Cited in IPR2024-01033, challenging U.S. Pat. No. 8,434,966.
Petitioners' Submission of Supplemental Information, Exhibit—33, Filed on May 15, 2023—Cited in IPR2022-00302, challenging U.S. Pat. No. 9,609,424.
Petitioners' Sur-Sur-Reply to Patent Owner's Sur-Reply, Exhibit—20, Filed on Jan. 27, 2023—Cited in IPR2022-00282, challenging U.S. Pat. No. 8,315,400.
Petitioners' Sur-Sur-Reply to Patent Owner's Sur-Reply, Exhibit—26, Filed on Mar. 7, 2023—Cited in IPR2022-00281, challenging U.S. Pat. No. 9,270,244.
Petitioners' Sur-Sur-Reply to Patent Owner's Sur-Reply, Exhibit—27, Filed on Mar. 7, 2023—Cited in IPR2022-00253, challenging U.S. Pat. No. 9,491,542.
Petitioners' Updated Exhibit List, Exhibit—10, Filed on Nov. 20, 2024—Cited in IPR2024-01003, challenging U.S. Pat. No. 9,191,083.
Petitioners' Updated Exhibit List, Exhibit—10, Filed on Nov. 20, 2024—Cited in IPR2024-01004, challenging U.S. Pat. No. 9,614,943.
Petitioners' Updated Exhibit List, Exhibit—10, Filed on Nov. 20, 2024—Cited in IPR2024-01031, challenging U.S. Pat. No. 7,049,850.
Petitioners' Updated Exhibit List, Exhibit—11, Filed on Nov. 20, 2024—Cited in IPR2024-01034, challenging U.S. Pat. No. 9,279,263.
Petitioners' Updated Exhibit List, Exhibit—15, Filed on Dec. 11, 2024—Cited in IPR2024-01003, challenging U.S. Pat. No. 9,191,083.
Petitioners' Updated Exhibit List, Exhibit—15, Filed on Dec. 11, 2024—Cited in IPR2024-01004, challenging U.S. Pat. No. 9,614,943.
Petitioners' Updated Exhibit List, Exhibit—15, Filed on Dec. 11, 2024—Cited in IPR2024-01031, challenging U.S. Pat. No. 7,049,850.
Petitioners' Updated Exhibit List, Exhibit—16, Filed on Dec. 11, 2024—Cited in IPR2024-01034, challenging U.S. Pat. No. 9,279,263.
Petitioners' Updated Exhibit List, Exhibit—19, Filed on Dec. 11, 2024—Cited in IPR2024-00559, challenging U.S. Pat. No. 11,610,587.
Petitioners' Updated Exhibit List, Exhibit—24, Filed on Mar. 14, 2023—Cited in IPR2022-00282, challenging U.S. Pat. No. 8,315,400.
Petitioners' Updated Exhibit List, Exhibit—24, Filed on Sep. 26, 2023—Cited in IPR2022-01078, challenging U.S. Pat. No. 11,057,701.
Petitioners' Updated Exhibit List, Exhibit—27, Filed on May 9, 2023—Cited in IPR2022-00388, challenging U.S. Pat. No. 10,966,015.
Petitioners' Updated Exhibit List, Exhibit—28, Filed on Oct. 11, 2023—Cited in IPR2022-01106, challenging U.S. Pat. No. 11,039,259.
Petitioners' Updated Exhibit List, Exhibit—28, Filed on Apr. 11, 2023—Cited in IPR2022-00302, challenging U.S. Pat. No. 9,609,424.
Petitioners' Updated Exhibit List, Exhibit—28, Filed on Apr. 13, 2023—Cited in IPR2022-00281, challenging U.S. Pat. No. 9,270,244.
Petitioners' Updated Exhibit List, Exhibit—28, Filed on May 9, 2023—Cited in IPR2022-00369, challenging U.S. Pat. No. 10,405,082.
Petitioners' Updated Exhibit List, Exhibit—30, Filed on Apr. 12, 2023—Cited in IPR2022-00253, challenging U.S. Pat. No. 9,491,542.
Petitioners' Updated Exhibit List, Exhibit—30, Filed on Apr. 13, 2023—Cited in IPR2022-00302, challenging U.S. Pat. No. 9,609,424.
Petitioners' Updated Exhibit List, Exhibit—30, Filed on Apr. 4, 2023—Cited in IPR2022-00324, challenging U.S. Pat. No. 8,254,591.
Petitioners' Updated Exhibit List, Exhibit—31, Filed on Mar. 16, 2023—Cited in IPR2022-00243, challenging U.S. Pat. No. 8,111,839.
Petitioners' Updated Exhibit List, Exhibit—31, Filed on Apr. 13, 2023—Cited in IPR2022-00302, challenging U.S. Pat. No. 9,609,424.
Petitioners' Updated Exhibit List, Exhibit—32, Filed on Mar. 16, 2023—Cited in IPR2022-00242, challenging U.S. Pat. No. 8,111,839.
Petitioners' Updated Exhibit List; Exhibit—25, Filed on Mar. 14, 2023—Cited in IPR2022-00234, challenging U.S. Pat. No. 9124982.
Petitioners' Updated Exhibit ListPaper14, Dec. 11, 2024—Cited in IPR2024-01033, challenging U.S. Pat. No. 8,434,966.
Petitioners' Updated Exhibit ListPaper9, Nov. 20, 2024—Cited in IPR2024-01033, challenging U.S. Pat. No. 8,434,966.
Petitioners' Updated Mandatory Notices, Exhibit—15, Filed on Apr. 3, 2023—Cited in IPR2022-01078, challenging U.S. Pat. No. 11,057,701.
Petitioners' Updated Mandatory Notices, Exhibit—16, Filed on Mar. 28, 2023—Cited in IPR2022-01106, challenging U.S. Pat. No. 11,039,259.
Petitioners' Updated Mandatory Notices, Exhibit—18, Filed on Aug. 10, 2022—Cited in IPR2022-00324, challenging U.S. Pat. No. 8,254,591.
Petitioners' Updated Mandatory Notices, Exhibit—20, Filed on Aug. 10, 2022—Cited in IPR2022-00243, challenging U.S. Pat. No. 8,111,839.
Petitioners' Updated Mandatory Notices, Exhibit—21, Filed on Feb. 8, 2023—Cited in IPR2022-00388, challenging U.S. Pat. No. 10,966,015.
Petitioners' Updated Mandatory Notices, Exhibit—21, Filed on Aug. 10, 2022—Cited in IPR2022-00242, challenging U.S. Pat. No. 8,111,839.
Petitioners' Updated Mandatory Notices, Exhibit—22, Filed on Feb. 8, 2023—Cited in IPR2022-00369, challenging U.S. Pat. No. 10,405,082.
Petitioners' Updated Mandatory Notices, Exhibit—23, Filed on Apr. 3, 2023—Cited in IPR2022-00388, challenging U.S. Pat. No. 10,966,015.
Petitioners' Updated Mandatory Notices, Exhibit—24, Filed on Apr. 3, 2023—Cited in IPR2022-00369, challenging U.S. Pat. No. 10,405,082.
Petitioners' Updated Mandatory Notices, Exhibit—26, Filed on Apr. 3, 2023—Cited in IPR2022-00282, challenging U.S. Pat. No. 8,315,400.
Petitioners' Updated Mandatory Notices, Exhibit—26, Filed on Apr. 3, 2023—Cited in IPR2022-00302, challenging U.S. Pat. No. 9,609,424.
Petitioners' Updated Mandatory Notices, Exhibit—27, Filed on Apr. 3, 2023—Cited in IPR2022-00281, challenging U.S. Pat. No. 9,270,244.
Petitioners' Updated Mandatory Notices, Exhibit—28, Filed on Apr. 3, 2023—Cited in IPR2022-00253, challenging U.S. Pat. No. 9,491,542.
Petitioners' Updated Mandatory Notices, Exhibit—28, Filed on Apr. 3, 2023—Cited in IPR2022-00324, challenging U.S. Pat. No. 8,254,591.
Petitioners' Updated Mandatory Notices, Exhibit—33, Filed on Apr. 3, 2023—Cited in IPR2022-00243, challenging U.S. Pat. No. 8,111,839.
Petitioners' Updated Mandatory Notices, Exhibit—34, Filed on Apr. 3, 2023—Cited in IPR2022-00242, challenging U.S. Pat. No. 8,111,839.
Petitioners' Updated Mandatory Notices, Exhibit—4, Filed on Jan. 6, 2022—Cited in IPR2022-00369, challenging U.S. Pat. No. 10,405,082.
Petitioners' Updated Mandatory Notices, Exhibit—6, Filed on Jan. 20, 2022—Cited in IPR2022-00388, challenging U.S. Pat. No. 10,966,015.
Petitioners' Updated Mandatory Notices, Exhibit—7, Filed on Jan. 20, 2022—Cited in IPR2022-00253, challenging U.S. Pat. No. 9,491,542.
Petitioners' Updated Mandatory Notices, Exhibit—7, Filed on Jan. 20, 2022—Cited in IPR2022-00281, challenging U.S. Pat. No. 9,270,244.
Petitioners' Updated Mandatory Notices, Exhibit—7, Filed on Jan. 20, 2022—Cited in IPR2022-00302, challenging U.S. Pat. No. 9,609,424.
Petitioners' Updated Mandatory Notices, Exhibit—7, Filed on Jan. 20, 2022—Cited in IPR2022-00324, challenging U.S. Pat. No. 8,254,591.

(56) References Cited

OTHER PUBLICATIONS

Petitioners' Updated Mandatory Notices, Exhibit—7, Filed on Jan. 20, 2022—Cited in IPR2022-00369, challenging U.S. Pat. No. 10,405,082.
Petitioners' Updated Mandatory Notices, Exhibit—8, Filed on Jan. 20, 2022—Cited in IPR2022-00243, challenging U.S. Pat. No. 8,111,839.
Petitioners' Updated Mandatory Notices, Exhibit—8, Filed on Jan. 20, 2022—Cited in IPR2022-00282, challenging U.S. Pat. No. 8,315,400.
Petitioners' Updated Mandatory Notices, Exhibit—9, Filed on Jan. 20, 2022—Cited in IPR2022-00242, challenging U.S. Pat. No. 8,111,839.
Petitioners' Updated Mandatory Notices; Exhibit—16, Filed on Aug. 10, 2022—Cited in IPR2022-00234, challenging U.S. Pat. No. 9124982.
Petitioners' Updated Mandatory Notices; Exhibit—8, Filed on Jan. 20, 2022—Cited in IPR2022-00234, challenging U.S. Pat. No. 9124982.
PO's Opposition to Motion to File Supplemental Information, Exhibit—32, Filed on Apr. 17, 2023—Cited in IPR2022-00302, challenging U.S. Pat. No. 9,609,424.
PO's Updated Exhibit List, Exhibit—25, Filed on Mar. 14, 2023—Cited in IPR2022-00282, challenging U.S. Pat. No. 8,315,400.
PO's Updated Exhibit List, Exhibit—27, Filed on Oct. 11, 2023—Cited in IPR2022-01106, challenging U.S. Pat. No. 11,039,259.
PO's Updated Exhibit List, Exhibit—27, Filed on Apr. 11, 2023—Cited in IPR2022-00302, challenging U.S. Pat. No. 9,609,424.
PO's Updated Exhibit List, Exhibit—28, Filed on May 9, 2023—Cited in IPR2022-00388, challenging U.S. Pat. No. 10,966,015.
PO's Updated Exhibit List, Exhibit—29, Filed on Apr. 12, 2023—Cited in IPR2022-00253, challenging U.S. Pat. No. 9,491,542.
PO's Updated Exhibit List, Exhibit—29, Filed on Apr. 13, 2023—Cited in IPR2022-00281, challenging U.S. Pat. No. 9,270,244.
PO's Updated Exhibit List, Exhibit—29, Filed on Apr. 4, 2023—Cited in IPR2022-00324, challenging U.S. Pat. No. 8,254,591.
PO's Updated Exhibit List, Exhibit—29, Filed on May 9, 2023—Cited in IPR2022-00369, challenging U.S. Pat. No. 10,405,082.
PO's Updated Exhibit List, Exhibit—30, Filed on Oct. 19, 2023—Cited in IPR2022-01106, challenging U.S. Pat. No. 11,039,259.
PO's Updated Exhibit List, Exhibit—32, Filed on Mar. 16, 2023—Cited in IPR2022-00243, challenging U.S. Pat. No. 8,111,839.
PO's Updated Exhibit List, Exhibit—33, Filed on Mar. 16, 2023—Cited in IPR2022-00242, challenging U.S. Pat. No. 8,111,839.
PO's Updated Exhibit List; Exhibit—26, Filed on Mar. 14, 2023—Cited in IPR2022-00234, challenging U.S. Pat. No. 9124982.
Power of Attorney for Samsung Electronics America, Inc., Exhibit—2, Filed on Dec. 30, 2021—Cited in IPR2022-00369, challenging U.S. Pat. No. 10,405,082.
Power of Attorney for Samsung Electronics America, Inc., Exhibit—2, Filed on Jun. 9, 2022—Cited in IPR2022-01078, challenging U.S. Pat. No. 11,057,701.
Power of Attorney for Samsung Electronics America, Inc., Exhibit—2, Filed on Jun. 9, 2022—Cited in IPR2022-01098, challenging U.S. Pat. No. 11,217,237.
Power of Attorney for Samsung Electronics America, Inc., Exhibit—2, Filed on Jun. 9, 2022—Cited in IPR2022-01099, challenging U.S. Pat. No. 11,244,666.
Power of Attorney for Samsung Electronics America, Inc., Exhibit—2, Filed on Jun. 9, 2022—Cited in IPR2022-01106, challenging U.S. Pat. No. 11,039,259.
Power of Attorney for Samsung Electronics Co. Ltd., Exhibit—1, Filed on Jun. 9, 2022—Cited in IPR2022-01078, challenging U.S. Pat. No. 11,057,701.
Power of Attorney for Samsung Electronics Co., Ltd., Exhibit—1, Filed on Dec. 10, 2021—Cited in IPR2022-00282, challenging U.S. Pat. No. 8,315,400.
Power of Attorney for Samsung Electronics Co., Ltd., Exhibit—1, Filed on Dec. 30, 2021—Cited in IPR2022-00369, challenging U.S. Pat. No. 10,405,082.
Power of Attorney for Samsung Electronics Co., Ltd., Exhibit—1, Filed on Jun. 9, 2022—Cited in IPR2022-01098, challenging U.S. Pat. No. 11,217,237.
Power of Attorney for Samsung Electronics Co., Ltd., Exhibit—1, Filed on Jun. 9, 2022—Cited in IPR2022-01099, challenging U.S. Pat. No. 11,244,666.
Power of Attorney for Samsung Electronics Co., Ltd., Exhibit—1, Filed on Jun. 9, 2022—Cited in IPR2022-01106, challenging U.S. Pat. No. 11,039,259.
Power of Attorney for Samsung Electronics, America, Inc., Exhibit—2, Filed on Dec. 10, 2021—Cited in IPR2022-00282, challenging U.S. Pat. No. 8,315,400.
Power of Attorney from Samsung Electronics America, Inc., Exhibit—2, Filed on Jan. 14, 2022—Cited in IPR2022-00410, challenging U.S. Pat. No. 10,979,836.
Power of Attorney from Samsung Electronics America, Inc., Exhibit—2, Filed on Jan. 4, 2022—Cited in IPR2022-00388, challenging U.S. Pat. No. 10,966,015.
Power of Attorney from Samsung Electronics America, Inc., Exhibit—2, Filed on Dec. 13, 2021—Cited in IPR2022-00242, challenging U.S. Pat. No. 8,111,839.
Power of Attorney from Samsung Electronics America, Inc., Exhibit—2, Filed on Dec. 13, 2021—Cited in IPR2022-00243, challenging U.S. Pat. No. 8,111,839.
Power of Attorney from Samsung Electronics America, Inc., Exhibit—2, Filed on Dec. 17, 2021—Cited in IPR2022-00253, challenging U.S. Pat. No. 9,491,542.
Power of Attorney from Samsung Electronics America, Inc., Exhibit—2, Filed on Dec. 20, 2021—Cited in IPR2022-00324, challenging U.S. Pat. No. 8,254,591.
Power of Attorney from Samsung Electronics America, Inc., Exhibit—2, Filed on Dec. 21, 2021—Cited in IPR2022-00281, challenging U.S. Pat. No. 9,270,244.
Power of Attorney from Samsung Electronics America, Inc., Exhibit—2, Filed on Dec. 21, 2021—Cited in IPR2022-00302, challenging U.S. Pat. No. 9,609,424.
Power of Attorney from Samsung Electronics Co., Ltd., Exhibit—1, Filed on Jan. 14, 2022—Cited in IPR2022-00410, challenging U.S. Pat. No. 10,979,836.
Power of Attorney from Samsung Electronics Co., Ltd., Exhibit—1, Filed on Jan. 4, 2022—Cited in IPR2022-00388, challenging U.S. Pat. No. 10,966,015.
Power of Attorney from Samsung Electronics Co., Ltd., Exhibit—1, Filed on Dec. 13, 2021—Cited in IPR2022-00242, challenging U.S. Pat. No. 8,111,839.
Power of Attorney from Samsung Electronics Co., Ltd., Exhibit—1, Filed on Dec. 13, 2021—Cited in IPR2022-00243, challenging U.S. Pat. No. 8,111,839.
Power of Attorney from Samsung Electronics Co., Ltd., Exhibit—1, Filed on Dec. 17, 2021—Cited in IPR2022-00253, challenging U.S. Pat. No. 9,491,542.
Power of Attorney from Samsung Electronics Co., Ltd., Exhibit—1, Filed on Dec. 20, 2021—Cited in IPR2022-00324, challenging U.S. Pat. No. 8,254,591.
Power of Attorney from Samsung Electronics Co., Ltd., Exhibit—1, Filed on Dec. 21, 2021—Cited in IPR2022-00281, challenging U.S. Pat. No. 9,270,244.
Power of Attorney from Samsung Electronics Co., Ltd., Exhibit—1, Filed on Dec. 21, 2021—Cited in IPR2022-00302, challenging U.S. Pat. No. 9,609,424.
PR 4-3 JCC Statement, Exhibit—2013, Filed on Jan. 12, 2023—Cited in IPR2022-00282, challenging U.S. Pat. No. 8,315,400.
PR 4-5(d) JCC Chart, Exhibit—2011, Filed on Jan. 12, 2023—Cited in IPR2022-00282, challenging U.S. Pat. No. 8,315,400.
Revised Scheduling Order, Exhibit—22, Filed on Jul. 12, 2023—Cited in IPR2022-01106, challenging U.S. Pat. No. 11,039,259.
Roy Falik, Exhibit—7, Filed on Jul. 18, 2024—Cited in IPR2024-01031, challenging U.S. Pat. No. 7,049,850.
Roy Falik, Exhibit—8, Filed on Jul. 18, 2024—Cited in IPR2024-01034, challenging U.S. Pat. No. 9,279,263.
Sage Journal, The Future of Hearing Aid Technology, Exhibit—2008, Filed on Oct. 17, 2022—Cited in IPR2022-00324, challenging U.S. Pat. No. 8,254,591.

(56) References Cited

OTHER PUBLICATIONS

*Samsung Elecs. Co., Ltd., et al.* v. *Staton Techiya, LLC*, IPR2022-00302, Paper 11, Exhibit—2006, Filed on Oct. 11, 2022—Cited in IPR2022-01106, challenging U.S. Pat. No. 11,039,259.
*Samsung Elecs. Co., Ltd., et al.* v. *Staton Techiya, LLC*, IPR2022-00302, Paper 11, Exhibit—2006, Filed on Oct. 7, 2022—Cited in IPR2022-01078, challenging U.S. Pat. No. 11,057,701.
*Samsung Elecs. Co., Ltd., et al.* v. *Staton Techiya, LLC*, IPR2022-00302, Paper 11, Exhibit—2006, Filed on Oct. 7, 2022—Cited in IPR2022-01098, challenging U.S. Pat. No. 11,217,237.
*Samsung Elecs. Co., Ltd., et al.* v. *Staton Techiya, LLC*, IPR2022-00302, Paper 11, Exhibit—2006, Filed on Oct. 7, 2022—Cited in IPR2022-01099, challenging U.S. Pat. No. 11,244,666.
Samsung's Claim Construction Brief, Exhibit—2012, Filed on Jan. 12, 2023—Cited in IPR2022-00282, challenging U.S. Pat. No. 8,315,400.
Samsung's Responsive Claim Construction Brief, Exhibit—2012, Filed on Apr. 10, 2023—Cited in IPR2022-01106, challenging U.S. Pat. No. 11,039,259.
Scheduling Order, Exhibit—11, Filed on Jan. 9, 2023—Cited in IPR2022-01106, challenging U.S. Pat. No. 11,039,259.
Scheduling Order, Exhibit—11, Filed on Dec. 30, 2022—Cited in IPR2022-01078, challenging U.S. Pat. No. 11,057,701.
Scheduling Order, Exhibit—14, Filed on Jul. 12, 2022—Cited in IPR2022-00302, challenging U.S. Pat. No. 9,609,424.
Scheduling Order, Exhibit—14, Filed on Jul. 12, 2022—Cited in IPR2022-00324, challenging U.S. Pat. No. 8,254,591.
Scheduling Order, Exhibit—14, Filed on Jul. 15, 2022—Cited in IPR2022-00253, challenging U.S. Pat. No. 9,491,542.
Scheduling Order, Exhibit—14, Filed on Jul. 15, 2022—Cited in IPR2022-00281, challenging U.S. Pat. No. 9,270,244.
Scheduling Order, Exhibit—14, Filed on Aug. 16, 2022—Cited in IPR2022-00388, challenging U.S. Pat. No. 10,966,015.
Scheduling Order, Exhibit—15, Filed on Aug. 16, 2022—Cited in IPR2022-00369, challenging U.S. Pat. No. 10,405,082.
Scheduling Order, Exhibit—16, Filed on Jun. 21, 2022—Cited in IPR2022-00243, challenging U.S. Pat. No. 8,111,839.
Scheduling Order, Exhibit—17, Filed on Jun. 21, 2022—Cited in IPR2022-00242, challenging U.S. Pat. No. 8,111,839.
Scheduling Order, Exhibit—9, Filed on Aug. 22, 2024—Cited in IPR2024-00559, challenging U.S. Pat. No. 11,610,587.
*Staton Techiya* v *Samsung*—Docket Control Order, Exhibit—2003, Filed on Apr. 18, 2022—Cited in IPR2022-00253, challenging U.S. Pat. No. 9,491,542.
*Staton Techiya* v *Samsung*—Docket Control Order, Exhibit—2003, Filed on Apr. 18, 2022—Cited in IPR2022-00281, challenging U.S. Pat. No. 9,270,244.
*Staton Techiya* v *Samsung*, Docket Control Order, Exhibit—2003, Filed on Mar. 21, 2022—Cited in IPR2022-00282, challenging U.S. Pat. No. 8,315,400.
*Staton Techiya* v *Samsung*, Docket Control Order, Exhibit—2003, Filed on Apr. 13, 2022—Cited in IPR2022-00302, challenging U.S. Pat. No. 9,609,424.
*Staton Techiya* v *Samsung*, Docket Control Order, Exhibit—2003, Filed on Apr. 13, 2022—Cited in IPR2022-00324, challenging U.S. Pat. No. 8,254,591.
*Staton Techiya* v. *Samsung*, Claim Construction Order, Exhibit—2012, Filed on Mar. 23, 2023—Cited in IPR2022-01078, challenging U.S. Pat. No. 11,057,701.
*Staton Techiya* v. *Samsung*, Docket Control Order, Exhibit—2003, Filed on Mar. 23, 2022—Cited in IPR2022-00242, challenging U.S. Pat. No. 8,111,839.
*Staton Techiya* v. *Samsung*, Docket Control Order, Exhibit—2003, Filed on Mar. 23, 2022—Cited in IPR2022-00243, challenging U.S. Pat. No. 8,111,839.
*Staton Techiya* v. *Samsung*, Docket Control Order, Exhibit—2003, Filed on May 18, 2022—Cited in IPR2022-00369, challenging U.S. Pat. No. 10,405,082.
*Staton Techiya* v. *Samsung*, Docket Control Order, Exhibit—2003, Filed on May 18, 2022—Cited in IPR2022-00388, challenging U.S. Pat. No. 10,966,015.
*Staton Techiya* v. *Samsung*, Docket Control Order, Exhibit—2003, Filed on May 18, 2022—Cited in IPR2022-00410, challenging U.S. Pat. No. 10,979,836.
*Staton Techiya* v. *Samsung*, Docket Control Order; Exhibit—2003, Filed on Mar. 21, 2022—Cited in IPR2022-00234, challenging U.S. Pat. No. 9124982.
*Staton Techiya* v. *Samsung*, Joint Motion to Consolidate, Exhibit—2005, Filed on Apr. 29, 2022—Cited in IPR2022-00242, challenging U.S. Pat. No. 8,111,839.
*Staton Techiya* v. *Samsung*, Joint Mtn to Consolidate, Exhibit—2005, Filed on Apr. 29, 2022—Cited in IPR2022-00243, challenging U.S. Pat. No. 8,111,839.
*Staton Techiya* v. *Samsung*, Joint Mtn to Consolidate, Exhibit—2008, Filed on Apr. 29, 2022—Cited in IPR2022-00282, challenging U.S. Pat. No. 8,315,400.
*Staton Techiya* v. *Samsung*, P.R. 4-5(d) Joint Claim Construction Chart, Exhibit—2011, Filed on Mar. 23, 2023—Cited in IPR2022-01078, challenging U.S. Pat. No. 11,057,701.
*Staton Techiya, LLC* v. *Samsung Elecs. Co., Ltd.*, Appendix B to P.R. 4-3 Statement, Exhibit—2007, Filed on Nov. 8, 2022—Cited in IPR2022-00369, challenging U.S. Pat. No. 10,405,082.
*Staton Techiya, LLC* v. *Samsung Elecs. Co., Ltd.*, Appendix B to P.R. 4-3 Statement, Exhibit—2009, Filed on Nov. 18, 2022—Cited in IPR2022-01078, challenging U.S. Pat. No. 11,057,701.
*Staton Techiya, LLC* v. *Samsung Elecs. Co., Ltd.*, Appendix B to P.R. 4-3 Statement, Exhibit—2010, Filed on Nov. 8, 2022—Cited in IPR2022-00388, challenging U.S. Pat. No. 10,966,015.
*Staton Techiya, LLC* v. *Samsung Elecs. Co., Ltd.*, Appendix B to P.R. 4-3 Statement, Exhibit—2011, Filed on Nov. 18, 2022—Cited in IPR2022-01106, challenging U.S. Pat. No. 11,039,259.
*Staton Techiya, LLC, et al.* v. *Samsung Elecs. Co., Ltd., et al.*, Defendants' P.R. 4-2 Disclosures, Exhibit—2004, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.*, Defendants' P.R. 4-2 Disclosures, Exhibit—2004, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.*, Defendants' P.R. 4-2 Disclosures, Exhibit—2004, Filed on Oct. 7, 2022—Cited in IPR2022-01098, challenging U.S. Pat. No. 11,217,237.
*Staton Techiya, LLC, et al.* v. *Samsung Elecs. Co., Ltd., et al.*, Defendants' P.R. 4-2 Disclosures, Exhibit—2004, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.*, Docket Control Order, Exhibit—2005, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.*, Docket Control Order, Exhibit—2005, Filed on Oct. 7, 2022—Cited in IPR2022-01098, challenging U.S. Pat. No. 11,217,237.
*Staton Techiya, LLC, et al.* v. *Samsung Elecs. Co., Ltd., et al.*, Docket Control Order, Exhibit—2005, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.*, Docket Control Order, Exhibit—2005, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.*, Joint Motion to Consolidate, Exhibit—2007, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.*, Joint Motion to Consolidate, Exhibit—2007, Filed on Oct. 7, 2022—Cited in IPR2022-01098, challenging U.S. Pat. No. 11,217,237.
*Staton Techiya, LLC, et al.* v. *Samsung Elecs. Co., Ltd., et al.*, Joint Motion to Consolidate, Exhibit—2007, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.*, Joint Motion to Consolidate, Exhibit—2007, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.*, et al., Plaintiff's Infringement Contentions, dated Apr. 6, 2022, Exhibit—2008, Filed on Oct. 7, 2022—Cited in IPR2022-01078, challenging U.S. Pat. No. 11,057,701.

(56) References Cited

OTHER PUBLICATIONS

*Staton Techiya, LLC, et al.* v. *Samsung Elecs. Co., Ltd., et al.*, Plaintiff's P.R. 4-2 Disclosures, Exhibit—2003, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.*, Plaintiffs' Infringement Contentions dated Apr. 6, 2022, Exhibit—2008, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.*, Plaintiffs' Infringement Contentions, dated Apr. 6, 2022, Exhibit—2008, Filed on Oct. 7, 2022—Cited in IPR2022-01098, challenging U.S. Pat. No. 11,217,237.
*Staton Techiya, LLC, et al.* v. *Samsung Elecs. Co., Ltd., et al.*, Plaintiffs' Infringement Contentions, dated Apr. 6, 2022, Exhibit—2008, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.*, Plaintiffs' P.R. 4-2 Disclosures, Exhibit—2003, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.*, Plaintiffs' P.R. 4-2 Disclosures, Exhibit—2003, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.*, Plaintiffs' P.R. 4-2 Disclosures, Exhibit—2003, Filed on Oct. 7, 2022—Cited in IPR2022-01098, challenging U.S. Pat. No. 11,217,237.
Stipulation Letter dated Apr. 20, 2022, Exhibit—1031, Filed on May 11, 2022—Cited in IPR2022-00324, challenging U.S. Pat. No. 8,254,591.
Stipulation Letter from D. Rokach to J. Snodgrass, Exhibit—1025, Filed on Nov. 10, 2022—Cited in IPR2022-01099, challenging U.S. Pat. No. 11,244,666.
Stipulation Letter from D. Rokach to J. Snodgrass, Exhibit—1027, Filed on Nov. 10, 2022—Cited in IPR2022-01078, challenging U.S. Pat. No. 11,057,701.
Stipulation Letter from D. Rokach to J. Snodgrass, Exhibit—1030, Filed on Nov. 15, 2022—Cited in IPR2022-01098, challenging U.S. Pat. No. 11,217,237.
Stipulation Letter from D. Rokach to J. Snodgrass, Exhibit—1033, Filed on Nov. 10, 2022—Cited in IPR2022-01106, challenging U.S. Pat. No. 11,039,259.
Stipulation Letter, Exhibit—1015, Filed on Apr. 20, 2022—Cited in IPR2022-00282, challenging U.S. Pat. No. 8,315,400.
Stipulation Letter, Exhibit—1019, Filed on Jun. 14, 2022—Cited in IPR2022-00369, challenging U.S. Pat. No. 10,405,082.
Stipulation Letter, Exhibit—1019, Filed on Jun. 14, 2022—Cited in IPR2022-00388, challenging U.S. Pat. No. 10,966,015.
Stipulation Letter, Exhibit—1020, Filed on Jun. 14, 2022—Cited in IPR2022-00410, challenging U.S. Pat. No. 10,979,836.
Stipulation Letter, Exhibit—1023, Filed on May 10, 2022—Cited in IPR2022-00302, challenging U.S. Pat. No. 9,609,424.
Stipulation Letter, Exhibit—1044, Filed on Apr. 20, 2022—Cited in IPR2022-00242, challenging U.S. Pat. No. 8,111,839.
Stipulation Letter, Exhibit—1044, Filed on Apr. 20, 2022—Cited in IPR2022-00243, challenging U.S. Pat. No. 8,111,839.
Stipulation Letter; Exhibit—1034, Filed on Apr. 20, 2022—Cited in IPR2022-00234, challenging U.S. Pat. No. 9124982.
Summary of all applications in the '082 patent family, Exhibit—1018, Filed on Dec. 30, 2021—Cited in IPR2022-00369, challenging U.S. Pat. No. 10,405,082.
Summary of all applications in the '836 patent's family, Exhibit—1019, Filed on Jan. 14, 2022—Cited in IPR2022-00410, challenging U.S. Pat. No. 10,979,836.
Summary of Application in '839 Patent Priority Chain, Exhibit—1041, Filed on Dec. 13, 2021—Cited in IPR2022-00243, challenging U.S. Pat. No. 8,111,839.
Summary of applications in '015 patent family, Exhibit—1018, Filed on Jan. 4, 2022—Cited in IPR2022-00388, challenging U.S. Pat. No. 10,966,015.
Summary of applications in '591 priority chain, Exhibit—1030, Filed on Dec. 20, 2021—Cited in IPR2022-00324, challenging U.S. Pat. No. 8,254,591.
Summary of Applications in '839 Priority Chain, Exhibit—1041, Filed on Dec. 13, 2021—Cited in IPR2022-00242, challenging U.S. Pat. No. 8,111,839.
Summary of Applications in '982 Priority Chain; Exhibit—1032, Filed on Dec. 13, 2021—Cited in IPR2022-00234, challenging U.S. Pat. No. 9124982.
Techopedia, Faceplate, Exhibit—2011, Filed on Sep. 13, 2022—Cited in IPR2022-00242, challenging U.S. Pat. No. 8,111,839.
Techopedia, Faceplate; Exhibit—2010, Filed on Sep. 9, 2022—Cited in IPR2022-00234, challenging U.S. Pat. No. 9124982.
Termination Decision: Post-DI Settlement, Exhibit—20, Filed on Dec. 12, 2024—Cited in IPR2024-00559, challenging U.S. Pat. No. 11,610,587.
Termination Decision: Pre-DI settlement, Exhibit—16, Filed on Dec. 12, 2024—Cited in IPR2024-01003, challenging U.S. Pat. No. 9,191,083.
Termination Decision: Pre-DI settlement, Exhibit—16, Filed on Dec. 12, 2024—Cited in IPR2024-01004, challenging U.S. Pat. No. 9,614,943.
Termination Decision: Pre-DI settlement, Exhibit—16, Filed on Dec. 12, 2024—Cited in IPR2024-01031, challenging U.S. Pat. No. 7,049,850.
Termination Decision: Pre-DI settlement, Exhibit—17, Filed on Dec. 12, 2024—Cited in IPR2024-01034, challenging U.S. Pat. No. 9,279,263.
Termination Decision: Pre-DI settlementPaper15, Dec. 12, 2024—Cited in IPR2024-01033, challenging U.S. Pat. No. 8,434,966.
Transcript of Deposition of Chris Kyriakakis, Ph.D. taken Oct. 7, 2022, Exhibit—2007, Filed on Oct. 17, 2022—Cited in IPR2022-00302, challenging U.S. Pat. No. 9,609,424.
Transcript of Deposition of Christopher Struck, Exhibit—1028, Filed on Jun. 15, 2023—Cited in IPR2022-01078, challenging U.S. Pat. No. 11,057,701.
Transcript of Deposition of Dr. Les Atlas, Exhibit—2007, Filed on Oct. 17, 2022—Cited in IPR2022-00324, challenging U.S. Pat. No. 8,254,591.
Transcript of Deposition of Dr. Les Atlas; Exhibit—2007, Filed on Sep. 9, 2022—Cited in IPR2022-00234, challenging U.S. Pat. No. 9,124,982.
Transcript of Deposition of Les Atlas, Ph.D., Aug. 18, 2022, Exhibit—2007, Filed on Sep. 13, 2022—Cited in IPR2022-00242, challenging U.S. Pat. No. 8,111,839.
Transcript of Deposition of Les Atlas, Ph.D., Aug. 18, 2022, Exhibit—2007, Filed on Sep. 13, 2022—Cited in IPR2022-00243, challenging U.S. Pat. No. 8,111,839.
Transcript of Deposition of Les Atlas, Ph.D., Exhibit—2016, Filed on Apr. 10, 2023—Cited in IPR2022-01106, challenging U.S. Pat. No. 11,039,259.
Transcript of Deposition of Nathaniel Polish, Ph.D., taken Sep. 29, 2022, Exhibit—2007, Filed on Oct. 19, 2022—Cited in IPR2022-00253, challenging U.S. Pat. No. 9,491,542.
Transcript of Deposition of Nathaniel Polish, Ph.D., taken Sep. 29, 2022, Exhibit—2007, Filed on Oct. 19, 2022—Cited in IPR2022-00281, challenging U.S. Pat. No. 9,270,244.
Transcript of Deposition of Richard M. Stern, Exhibit—2010, Filed on Mar. 23, 2023—Cited in IPR2022-01078, challenging U.S. Pat. No. 11,057,701.
Transcript of Deposition of Richard M. Stern, Ph.D., taken Oct. 27, 2022, Exhibit—2009, Filed on Nov. 8, 2022—Cited in IPR2022-00369, challenging U.S. Pat. No. 10,405,082.
Transcript of Deposition of Richard M. Stern, Ph.D., taken Oct. 27, 2022, Exhibit—2009, Filed on Nov. 8, 2022—Cited in IPR2022-00388, challenging U.S. Pat. No. 10,966,015.
Transcript of Deposition of Richard Stern, Ph.D., Exhibit—2010, Filed on Sep. 9, 2022—Cited in IPR2022-00282, challenging U.S. Pat. No. 8,315,400.
U.S. Appl. No. 09/653,869, Exhibit—1007, Filed on Dec. 20, 2021—Cited in IPR2022-00324, challenging U.S. Pat. No. 8,254,591.
U.S. Pat. No. 10,405,082, Exhibit—1001, Filed on Dec. 30, 2021—Cited in IPR2022-00369, challenging U.S. Pat. No. 10,405,082.

(56) References Cited

OTHER PUBLICATIONS

U.S. Appl. No. 61/778,737, Exhibit—1008, Filed on Dec. 21, 2021—Cited in IPR2022-00281, challenging U.S. Pat. No. 9,270,244.
U.S. Appl. No. 62/575,713, Exhibit—1006, Filed on Dec. 30, 2021—Cited in IPR2022-00369, challenging U.S. Pat. No. 10,405,082.
U.S. Appl. 62/575,713, Exhibit—1006, Filed on Jan. 4, 2022—Cited in IPR2022-00388, challenging U.S. Pat. No. 10,966,015.
Wikipedia, Apple headphones, Exhibit—2010, Filed on Sep. 13, 2022—Cited in IPR2022-00243, challenging U.S. Pat. No. 8,111,839.
Wikipedia, Microphone, Exhibit—2012, Filed on Sep. 13, 2022—Cited in IPR2022-00242, challenging U.S. Pat. No. 8,111,839.
Wikipedia, Microphone; Exhibit—2011, Filed on Sep. 9, 2022—Cited in IPR2022-00234, challenging U.S. Pat. No. 9124982.
Wiley Elec and Elecs Eng Dictionary (excerpts), Exhibit—2004, Filed on Mar. 21, 2022—Cited in IPR2022-00282, challenging U.S. Pat. No. 8,315,400.
Wiley Electrical and Electronics Engineering Dictionary (excerpt), Exhibit—2009, Filed on Oct. 7, 2022—Cited in IPR2022-01098, challenging U.S. Pat. No. 11,217,237.

* cited by examiner

10

10

12

12

| Component | Volume (cc) | Volume ($mm^3$) |
| --- | --- | --- |
| Button Cavity (V1) | 0.142 | 142 |
| Body Cavity (V2) | 0.188 | 188 |
| TOTAL DISPLACEMENT | 0.33 | 330 |

45

12

Dismounted

12

Mounted

50

51

52

Mounted State

Dismounted State

70

| Component | Volume (cc) | Volume (mm³) |
| --- | --- | --- |
| Button Cavity (V1) | .152 | 152 |
| Body Cavity (V2) | .165 | 165 |
| TOTAL DISPLACEMENT | 0.317 | 317 |

75

80

80

80

80

80

SHARED EARPIECE COMMUNICATION

CROSS-REFERENCE TO RELATED APPLICATIONS

This application is a continuation of and claim priority to U.S. patent Ser. No. 17/211,814, filed 24 Mar. 2021, which is an application is a continuation of and claims the priority benefit of U.S. patent application Ser. No. 16/266,829, filed Feb. 4, 2019 which is an application that is a continuation of and claims the priority benefit of U.S. patent application Ser. No. 15/968,231, filed May 1, 2018, which is a continuation of and claims the priority benefit of U.S. patent application Ser. No. 14/109,954, filed Dec. 17, 2013, now U.S. Pat. No. 10,009,677, which claims the priority benefit of U.S. U.S. Provisional Application No. 61/737,932 filed Dec. 17, 2012, all of which are incorporated herein by reference in their entirety.

FIELD OF THE INVENTION

The invention relates in general to methods and devices for earpiece communication, and in particular, though not exclusively, for sharing of information between earpieces.

BACKGROUND OF THE INVENTION

Present audio content playing devices are separated from the headphone system that normally contains the speakers (also referred to as receivers). The reason for this has typically been that audio content has been stored on disks that require a separate playing system. However, even with the advent of storing audio content on non-disk RAM (Random Access Memory) storage systems, the audio content player has been separated from the earpiece system (e.g., plug in headphones or earbuds). Combining the capacity for audio download and playing in an earpiece system is not obvious over related art since the user interaction system (e.g., play button, keyboard system) does not readily appear compatible with the size of an earpiece device and the difficulty of user interaction.

Additionally, no system currently exists for registration and download of audio content into an earpiece. Furthermore, the structures or mechanisms of existing earpieces or earbuds fail to adequately compensate for ambient noise.

BRIEF DESCRIPTION OF THE DRAWINGS

Embodiments of the present invention will become apparent from the following detailed description, taken in conjunction with the drawings in which.

DETAILED DESCRIPTION OF EXEMPLARY EMBODIMENTS OF THE PRESENT INVENTION

Figure 1:
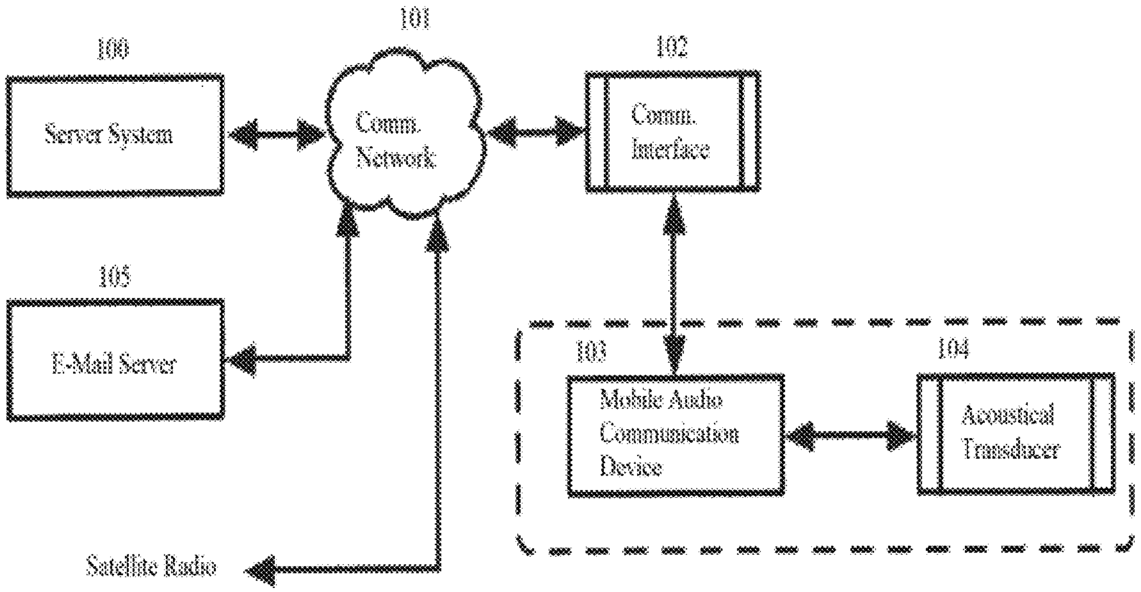
FIG. 1 illustrates the connection between an earpiece device (103 and 104) and a communication network.

The following description of exemplary embodiment(s) is merely illustrative in nature and is in no way intended to limit the invention, its application, or uses.

Processes, methods, materials and devices known by one of ordinary skill in the relevant arts can not be discussed in detail but are intended to be part of the enabling discussion where appropriate for example the generation and use of transfer functions.

Notice that similar reference numerals and letters refer to similar items in the following figures.

Note that herein when referring to correcting or corrections of an error (e.g., noise), a reduction of the error and/or a correction of the error is intended.

Summary of Exemplary Embodiments

At least one exemplary embodiment is directed to a system for Personalized Services delivered to a Personal Audio Assistant incorporated within an earpiece (e.g., earbuds, headphones). Personalized Services include content such as music files (for preview or purchase) related to a user's preferences, reminders from personal scheduling software, delivery and text-to-speech, speech-to-text processing of email, marketing messages, delivery and text-to-speech of stock market information, medication reminders, foreign language instruction, academic instruction, time and date information, speech-to-speech delivery, instructions from a GPS system and others. A Personal Audio Assistant can be an audio playback platform for providing the user with Personalized Services.

At least one exemplary embodiment is directed to a Personal Audio Assistant system that is included as part of an earpiece (e.g., Headphone system). The Personal Audio Assistant is capable of digital audio playback, mitigating the need to carry a personal music player. Furthermore, a subscription-based service provides audio content to the user through the Personal Audio Assistant. The type of audio content, which is automatically provided to the user, is based on the user's preferences, which are obtained through a registration process.

The audio content, which is seamlessly downloaded to the Personal Audio Assistant in the background, is managed from a Server system and is only available on the Personal Audio Assistant for a predetermined period of time or for a fixed number of playback counts. However, the user can purchase any music file or electronic book directly from the Personal Audio Assistant with a simple one-click control interface, storing the purchased audio content on the Personal Audio Assistant as well as storing the content permanently in a user storage lock-box location on the Server system.

The system provides for audio content to be new and "fresh" each time the user auditions the content. As such, the content is typically auditioned in a first-in: first-out scenario. In one such example, the user has turned on the Personal Audio Assistant at 8:00 am and by 10:00 am has auditioned 2 hours of content that were created for the user as a manifestation of the user's choices of their preferences of genre, artist, their demographics, day of the week, time of day and purchase history. The system also provides for the elimination of a particular song or playlist in situ.

As the user's Listening History Envelope is updated based on experience, subsequent downloads will only contain content incorporating these revised preferences. The Personal Audio Assistant provides for ample memory, thus permitting hours of uninterrupted playback without the need to download additional content from the server. When in need, the Personal Audio Assistant automatically interrogates various communication platforms as it searches for connections. Once a connection is made, the Listener History Envelope file is uploaded to the server, and a new set of personalized playlist content is downloaded to the Personal Audio Assistant. Accordingly, as the Personal Audio Assistant content is auditioned and thus depleted, the communications system provides for constant replenishment.

In another embodiment, the Personal Audio Assistant also provides for a new set of business solutions to be offered to the music industry. As the personalized audio content is only available for audition for a limited period of time, and can not be sent to the user again from for weeks to months, the user's purchasing behavior can be demonstrated as spontaneous. The basic model of "Try before you buy" is the expected outcome. In another iteration, the distributor of the music can choose to offer discounts, which can be time-sensitive or quantity-sensitive in nature, in effect promoting greater purchase activity from the user.

In another iteration, while in audition a user can wish to place the desired content in a hold status. The hold status forms the basis of a "wish list," thus allowing the user to hold for future consideration audio content while it is being auditioned. This content resides in the memory of the Personal Audio Assistant for a defined period, and is automatically erased, or the user can do so manually. The selected content will also appear on the user's computer via a URL address; here it resides on the server ready for audition or purchase and download.

The system is designed to operate as simply as possible. Using a single button, which has multiple contacts, the interface allows the user to purchase, delete, skip to next, and add to a wish list and even control a listening level.

In another iteration, the user can download their own music to the Personal Audio Assistant for audition. The Personal Audio Assistant system is capable of text-to-speech processing and can interface with personal scheduling software to provide auditory schedule reminders for the user. Auditory reminders relating to the user's medication schedule are also generated by the system.

At least one exemplary embodiment includes input Acoustic Transducers (microphones) for capturing user's speech as well as Environmental Audio. In further embodiments, stereo input Acoustic Transducers capture Environmental Audio, and, mixing it with the audio signal path, present the ambient sound field to the user, mitigating the need to remove the Headphone apparatus for normal conversation.

Additional exemplary embodiments are directed to various scenarios for the delivery and consumption of audio content. The Personal Audio Assistant can store and play back audio content in compressed digital audio formats. In one embodiment, the storage memory of the Personal Audio Assistant is completely closed to the end-user and controlled from the Server. This allows for audio content to be distributed on a temporary basis, as part of a subscription service. In another iteration of the present invention, the storage memory of the Personal Audio Assistant is not completely closed to the end-user, allowing the user to transfer audio content to the Personal Audio Assistant from any capable device such as a Personal Computer or a Personal Music Player.

In at least one exemplary embodiment the Personal Audio Assistant automatically scans for other Bluetooth®-enabled audio playback systems and notifies the user that additional devices are available. These additional devices can include a Bluetooth® video system, television system, personal video player, video camera, cell phone, another Personal Audio Assistant and others.

In another iteration, the Personal Audio Assistant can be directly connected to a Terrestrial Radio receiver or have such a receiver built in to the system.

In another exemplary embodiment, a technique known as Sonification can be used to convey statistical or other numerical information to a headphone. For example, the user would be able to receive information about the growth or decline of a particular stock, groups of stocks or even sectors of the markets though the Personal Audio Assistant. Many different components can be altered to change the user's perception of the sound, and in turn, their perception of the underlying information being portrayed. An increase or decrease in some level of share price or trading levels can be presented to the user. A stock market price can be portrayed by an increase in the frequency of a sine tone as the stock price rose, and a decline in frequency as it fell. To allow the user to determine that more than one stock was being portrayed, different timbres and spatial locations might be used for the different stocks, or they can be played to the user from different points in space, for example, through different sides of their headphones. The user can act upon this auditory information and use the controls built-in to the headphone to either purchase or sell a particular stock position.

Furthermore, specific sonification techniques and preferences can be presented to the user as "themes" from which the user can select. For example, one theme might auralize the current trading price of one stock with an ambient sine tone in the left ear, the price of another stock in the right ear, their respective trade volumes as perceived elevation using personalized head-related transfer function binauralization, and the current global index or other market indicator as the combined perceptual loudness of both tones. Such a scheme affords ambient auditory display in this example of five dimensions of financial data without compromising the user's ability to converse or work on other tasks. In another embodiment, the system affords users the ability to customize themes to their liking and to rapidly switch among them using simple speech commands. Additionally, the user can search the web from voice commands and receive results via a text to speech synthesizer.

In yet another exemplary embodiment the Personal Audio Assistant (PAA) functions as a dictation device for medical professionals for dictating clinical information to a patient's medical record or write prescriptions for medication or devices. Conversely, the PAA can function as text-to-speech allowing the clinician to audition information from a medical record, rather than reading. The PAA can save considerable time preparing clinician interaction with a patient.

In another iteration, the Personal Audio Assistant can function as a tool to locate other users of Personal Audio Assistant who share common interests, or who are searching for particular attributes of other users. Whereas the first user has stored specific personal information in the Public Data memory of the Personal Audio Assistant, an example of which might be related to schools attended, marital status, profession etc, or the first user can be in search of another user with these attributes and whereas a second user of a Personal Audio Assistant comes within communication range of the first user, the individual Personal Audio Assistants communicate with each other, access the personal information stored in each of their respective Public Data memories to ascertain if these users have common interests. If a match occurs, each unit can contain both audible and visual indicators announcing that a match has been made and thus each user can start dialog either physically or electronically via the environmental microphones.

Examples of Terminology

Note that the following non-limiting examples of terminology are solely intended to aid in understanding various exemplary embodiments and are not intended to be restrictive of the meaning of terms nor all inclusive.

Acoustic Isolation Cushion: An "Acoustic Isolation Cushion" shall be defined as a circum-aural or intra-aural device that provides acoustic isolation from Environmental Noise. Acoustic Isolation Cushions can be included as part of a Headphones system, allowing the output of the acoustical transducers to reach the ear unimpeded, but still providing acoustic isolation from Environmental Noise.

Acoustic Transducer: An "Acoustic Transducer" shall be defined as a device that converts sound pressure level variations into electronic voltages or vice versa. Acoustic Transducers include microphones, loudspeakers, Headphones, and other devices.

Audio Playback: "Audio Playback" shall be defined as the auditory stimuli generated when Playback Hardware reproduces audio content (music, speech, etc) for a listener or a group of listeners listening to Headphones.

Audition: "Audition" shall be defined as the process of detecting sound stimulus using the human auditory system. This includes the physical, psychophysical, psychoacoustic, and cognitive processes associated with the perception of acoustic stimuli.

Client: A "Client" shall be defined as a system that communicates with a Server, usually over a communications network, and directly interfaces with a user. Examples of Client systems include personal computers and mobile phones.

Communications Port: A Communication Port shall be defined as an interface port supporting bidirectional transmission protocols (TCP/IP, USB, IEEE 1394, IEEE 802.11, Bluetooth®, A2DP, GSM, CDMA, or others) via a communications network (e.g., the Internet, cellular networks).

Control Data: "Control Data" shall be defined as information that dictates the operating parameters for a system or a set of systems.

Earcon: An Earcon shall be defined as a Personalized Audio signal that informs the User of a pending event typically inserted in advance of the upcoming audio content.

Ear Mold Style: "Ear Mold Style" shall be defined as a description of the form factor for an intra-aural device (e.g., hearing aids). Ear Mold Styles include completely in the canal (CIC), in the canal (ITC), in the ear (ITE), and behind the ear (BTE).

Environmental Audio: "Environmental Audio" shall be defined as auditory stimuli of interest to the user in the environment where the user is present. Environmental Audio includes speech and music in the environment.

Environmental Noise: "Environmental Noise" shall be defined as the auditory stimuli inherent to a particular environment where the user is present and which the user does not wish to audition. The drone of highway traffic is a common example of Environmental Noise. Note that Environmental Noise and Audio Playback are two distinct types of auditory stimuli. Environmental Noise does not typically include Music or other audio content.

E-Tailing System: An "E-tailing System" shall be defined as a web-based solution through which a user can search, preview and acquire some available product or service. Short for "electronic retailing," E-tailing is the offering of retail goods or services on the Internet. Used in Internet discussions as early as 1995, the term E-tailing seems an almost inevitable addition to e-mail, e-business, and e-commerce. E-tailing is synonymous with business-to-consumer (B2C) transactions. Accordingly, the user can be required to register by submitting personal information, and the user can be required to provide payment in the form of Currency or other consideration in exchange for the product or service. Optionally, a sponsor can bear the cost of compensating the E-tailer, while the user would receive the product or service.

Generic HRTF: A "Generic HRTF" shall be defined as a set of HRTF data that is intended for use by any Member. A Generic HRTF can provide a generalized model of the parts of the human anatomy relevant to audition and localization, or simply a model of the anatomy of an individual other than the Member. The application of Generic HRTF data to Audio Content provides the least convincing Spatial Image for the Member, relative to Semi-Personalized and Personalized HRTF data. Generic HRTF data is generally retrieved from publicly available databases such as the CIPIC HRTF database.

Headphones: "Headphones" (also known as earphones, earbuds, stereophones, headsets, Canalphones, or the slang term "cans") are a pair of transducers that receive an electrical signal from a media player, communication receivers and transceivers, and use speakers placed in close proximity to the ears (hence the name earphone) to convert the signal into audible sound waves. Headphones are intended as personal listening devices that are placed either circum-aural or intra-aural according to one of the Ear Mold Styles, as well as other devices that meet the above definition such as advanced eyewear that includes Acoustical Transducers (i.e. Dataview). Headphones can also include stereo input Acoustic Transducers (microphones) included as part of the Ear Mold Style form factor.

HRTF: "HRTF" is an acronym for head-related transfer function—a set of data that describes the acoustical reflection characteristics of an individual's anatomy relevant to audition. Although in practice they are distinct (but directly related), this definition of HRTF encompasses the head-related impulse response (HRIR) or any other set of data that describes some aspects of an individual's anatomy relevant to audition.

Informed Consent: "Informed Consent" shall be defined as a legal condition whereby a person can provide formal consent based upon an appreciation and understanding of the facts and implications associated with a specific action. For minors or individuals without complete possession of their faculties, Informed Consent includes the formal consent of a parent or guardian.

Listening History Envelope: "Listening History Envelope" shall be defined as a record of a user's listening habits over time. The envelope includes system data, time system was turned off, time the system is presenting content, when the system doesn't audition, system transducers, when the user auditions content, time stamp of content being auditioned, content which is: skipped, deleted, played multiple times, saved in the Wish List, and time between listening sessions.

Music: "Music" shall be defined as a form of expression in the medium of time using the structures of tones and silence to create complex forms in time through construction of patterns and combinations of natural stimuli, principally sound. Music can also be referred to as audio media or audio content.

Playback Hardware: Any device used to play previously recorded or live streaming audio. Playback Hardware includes Headphones, loudspeakers, personal music players, mobile phones, and other devices.

Personal Audio Assistant: A "Personal Audio Assistant" shall be defined as a portable system capable of interfacing with a communications network, directly or through an intermediate, to transmit and receive audio signals and other data.

Personal Computer: "Personal Computer" shall be defined as any piece of hardware that is an open system capable of compiling, linking, and executing a programming language (such as C/C++, Java™, etc.).

Personal Music Player: "Personal Music Player" shall be defined as any portable device that implements perceptual audio decoder technology but is a closed system in that users are not generally allowed or able to write software for the device.

Personalized HRTF: A "Personalized HRTF" shall be defined as a set of HRTF data that is measured for a specific Member and unique to that Member. The application of Personalized HRTF data to Audio Content creates, by far, the most convincing Spatial Image for the Member (Begault et. al. 2001, D. Zotkin, R. Duraiswami, and L. Davis 2002).

Personalized Services: "Personalized Services" shall be defined as services customized to better meet the needs of an individual. Personalized Services include media content (for preview or purchase) related to a user's preferences, reminders from personal scheduling software, delivery and text-to-speech processing of email, marketing messages, delivery and text-to-speech of stock market information, medication reminders, foreign language instruction [real-time foreign language translation], academic instruction, time and date information, and others.

Public Data: "Public Data" shall be defined as data which contains specific and personal information about the registered user of the Personal Audio Assistant. The registered user chooses which portions of their complete Registration Process data they wish to include in this subset. This data becomes distributed to other users who have compliant devices thus allowing other users to know specific details of the registered user.

Registration Process: "Registration Process" includes the acquisition of the user's preference via a web page. Typically, the process would include the items to be captured: Age, demographics, email, gender, Relative Audiogram, Personal Preferences, banking information, credit card information, wake-up and sleep times, music preferences by genre, artist, preferences for writers and authors, desire to receive advertising, turn-on listening level, equalization, email preferences, parental control setup as well as other user-controlled settings.

Relative Audiogram: A "Relative Audiogram" shall be defined as a measured set of data describing a specific individual's hearing threshold level as a function of frequency. A Relative Audiogram is only an approximate Audiogram, leaving more complete Audiogram analysis to qualified audiologists.

Semi-Personalized HRTF: A "Semi-Personalized HRTF" shall be defined as a set of HRTF data that is selected from a database of known HRTF data as the "best-fit" for a specific user. Semi-Personalized HRTF data is not necessarily unique to one user; however, interpolation and matching algorithms can be employed to modify HRTF data from the database to improve the accuracy of a Semi-Personalized HRTF. The application of Semi-Personalized HRTF data to Audio Content provides a Spatial Image that is improved compared to that of Generic HRTF data, but less effective than that of Personalized HRTF data. The embodiments within speak to a variety of methods for determining the best-fit HRTF data for a particular Member including anthropometrical measurements extracted from photographs and deduction.

Server: A "Server" shall be defined as a system that controls centrally held data and communicates with Clients.

Sonification: "Sonification" shall be defined as the use of non-speech audio to convey information or to aurally perceptualize non-acoustic data (auralize). Due to a variety of phenomena involving human cognition, certain types of information can be better or more efficiently conveyed using auditory means than, for example, visual means.

Exemplary Embodiments

FIG. 1 illustrates the connection between an earpiece device (103 and 104) and a communication network (101) via communication interface 102, which can be operatively connected (via a wired or wireless connection) to a server system (100) and/or an e-mail server (105). Additionally a radio signal (e.g., satellite radio) can be input into the earpiece 500 (FIG. 5B) via a communication module (e.g., Bluetooth® wireless module 515).

Figure 2:
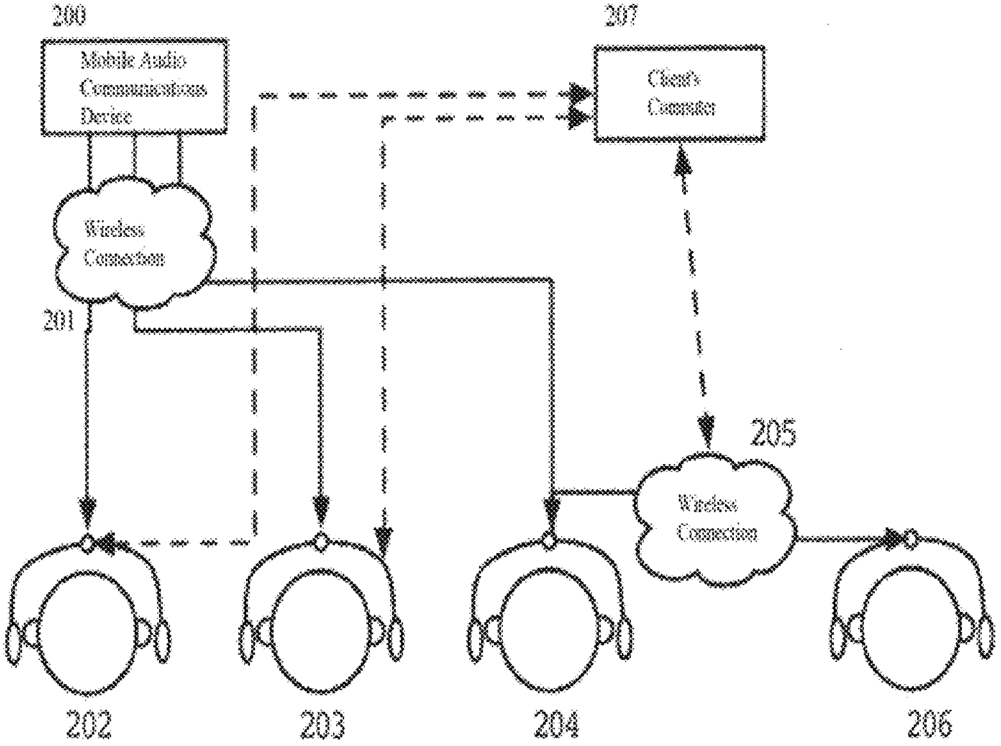
FIG. 2 illustrates at least one exemplary embodiment where earpiece devices share information with other earpiece devices within range (e.g., GPS location and identity)

FIG. 2 illustrates at least one exemplary embodiment where earpiece devices share information with other earpiece devices within range (e.g., GPS location and identity). For example multiple users (e.g., 202, 203, 204, and 206) can send signals to each individual earpiece (e.g., 500) when in range (e.g., via a wireless connection 205) or to a mobile audio communications device 200 via a wireless connection (201) with each earpiece (500). Additionally information (e.g., audio content, software download) can be sent via a client's computer 207 to each earpiece, either directly (e.g., 205), or via 200. For example audio content can be retrieved on a user's computer and sent to the earpieces that have authorization to use it.

Figure 3:
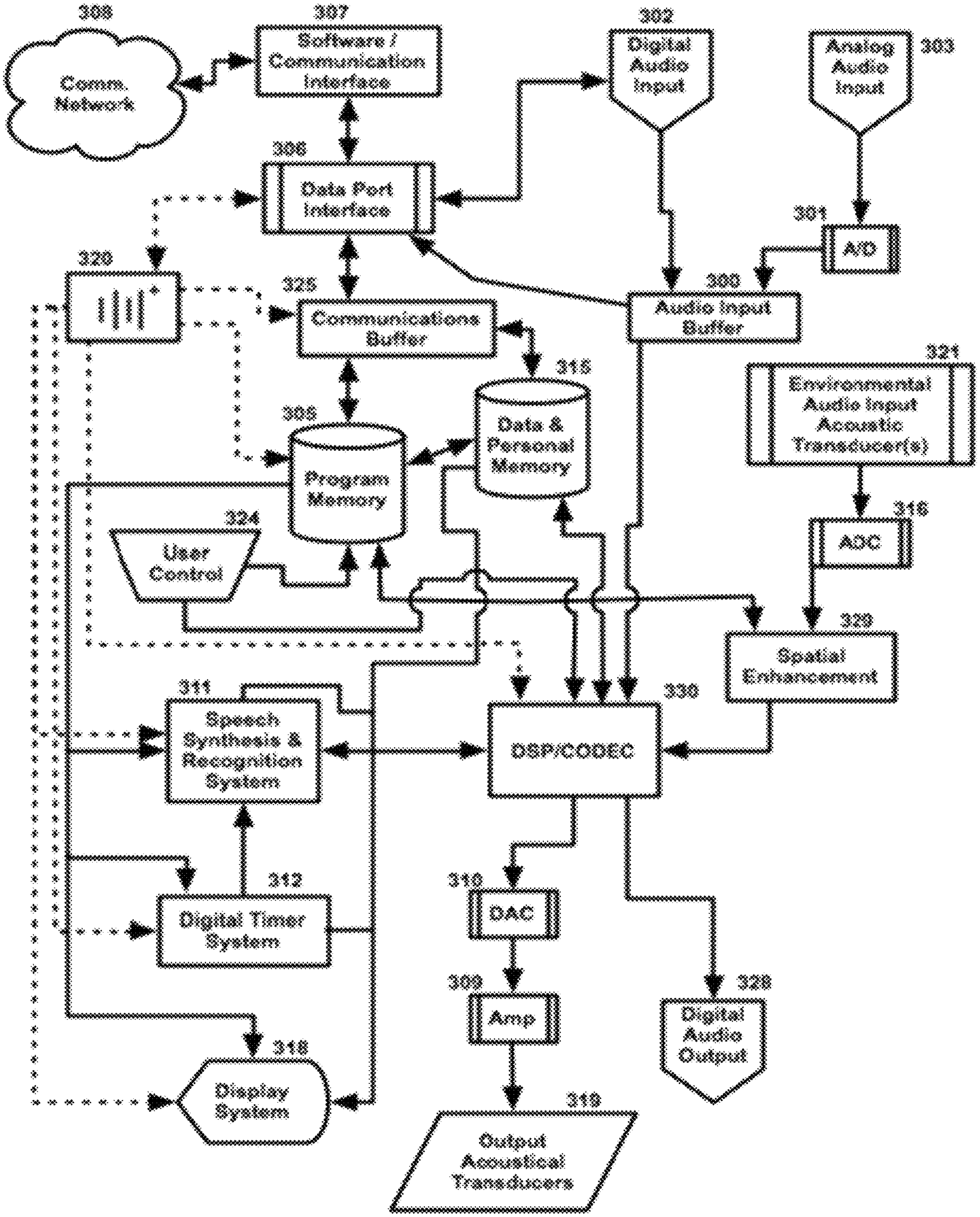
FIG. 3 illustrates an example of various elements that can be part of an earpiece device in accordance with at least one exemplary embodiment.

FIG. 3 illustrates an example of various elements that can be part of an earpiece device in accordance with at least one exemplary embodiment. The earpiece can include all or some of the elements illustrated in FIG. 5B. For example the logic circuit 572 or the operatively connected memory storage device 585, can include spatial enhancement software 329, a DSP codec 330, a speech synthesis and recognition system 311, and a digital timer system 312. Additional elements can be connected to the logic circuit 572 as needed, for example a power supply 320, a software communication interface 307 (e.g., wireless module 515) (which may be connected to communication network 308), data port interface 306, audio input buffers 300 connected to digital audio input 302 and/or analog audio input 303 converted to digital via an ADC 301, environmental audio input acoustic transducer(s) 321 converted to digital via an ADC 316, user control 324, digital audio output 328, output acoustic transducers 319 (which receive signals converted to analog via a DAC 310 and amplified via amplifier 309), display system 318, communication buffers 325, program memory 305, data and personal memory 315, as well as other electronic devices as known by one of ordinary skill in the relevant arts.

Figure 4:
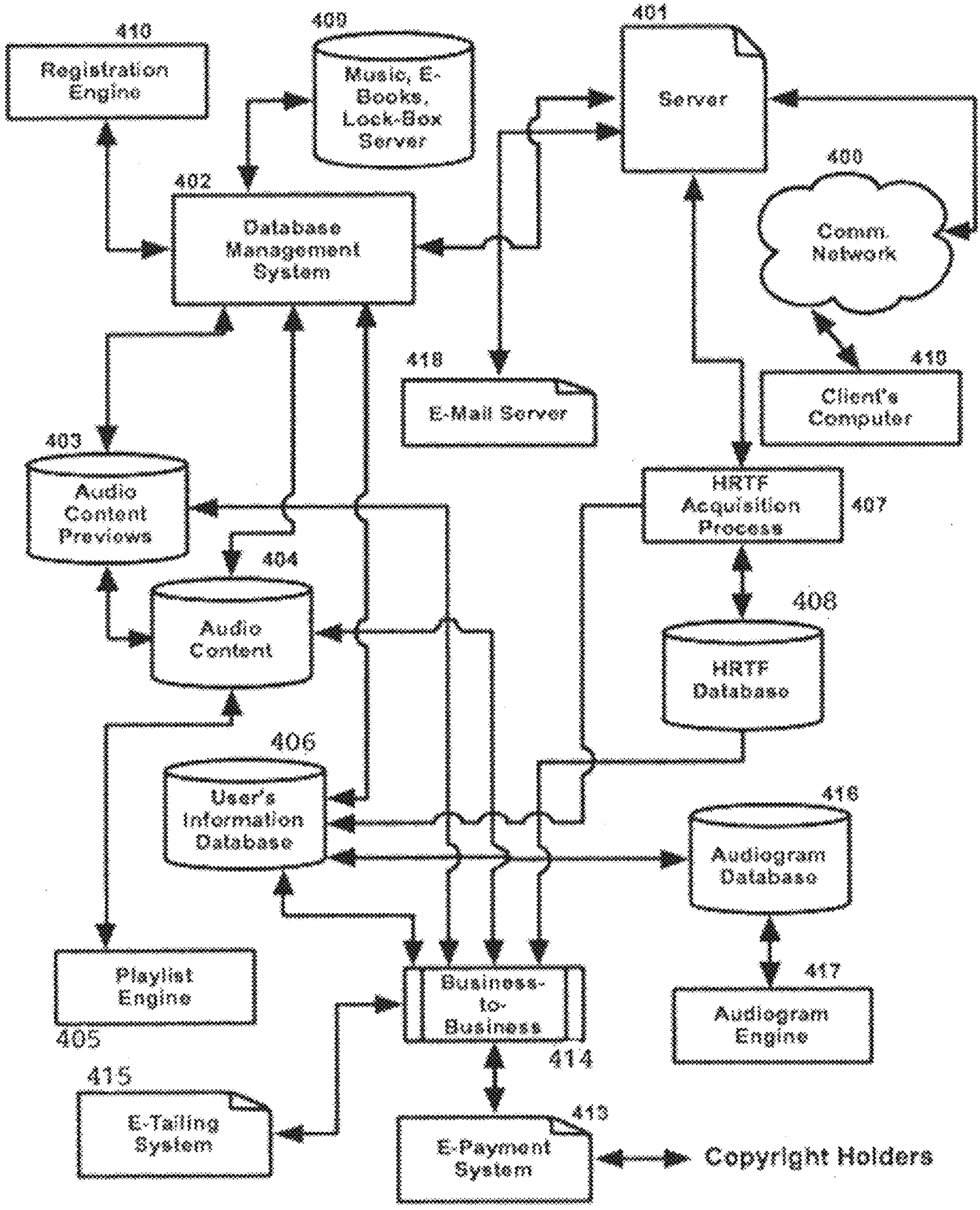
FIG. 4 illustrates an example of a communication system in accordance with at least one exemplary embodiment that a user can use to register via his/her computer.

FIG. 4 illustrates an example of a communication system in accordance with at least one exemplary embodiment that a user can use to register via his/her computer 419, via a communication network 400 (e.g., Internet connection) connected to many various database and registration systems as illustrated and labeled in FIG. 4. For example, server 401, database management system 402, audio content preview database 403, audio content database 404, playlist engine 405, user's information database 406, HRTF acquisition process module 407, HRTF database 408, lock-box server 409, registration engine 410, e-payment system 413, business-to-business module 414, e-tailing system 415, audiogram database 416, audiogram engine 417 and/or e-mail server 418.

Figure 5A:
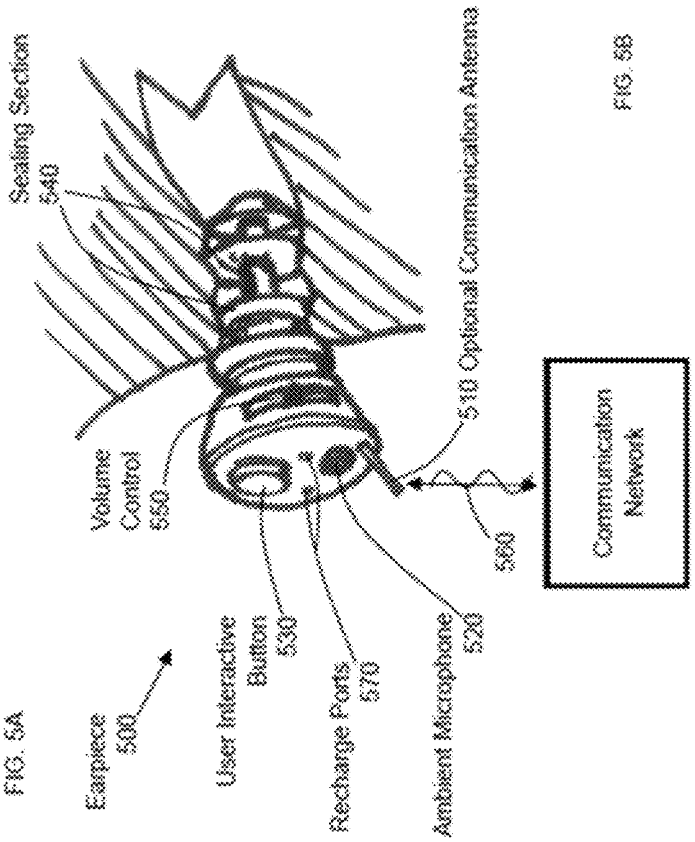
FIG. 5A illustrates an earpiece that can store and download audio content in accordance with at least one exemplary embodiment.

FIG. 5A illustrates an earpiece 500 having sealing section 540 in an ear canal that can store and download audio content 560 in accordance with at least one exemplary embodiment. The earpiece 500, can include a first user interaction element 530 (e.g., a button), that can be used to turn the earpiece 500 on, or if on then activate an audio play command to start playing saved audio content. The earpiece 500 can also include a second user interaction element 550 (e.g., a slide control) that can be used for example to control the volume. The earpiece 500 can also include recharge ports 570, that can accept two wires of varying voltage that can be inserted into the recharge ports 570 to recharge any batteries in the earpiece 500. The earpiece 500 can include an ambient microphone 520 and an optional communication antenna 510, that if needed can aid in the communication between the earpiece 500 and a communication network.

Figure 5B:
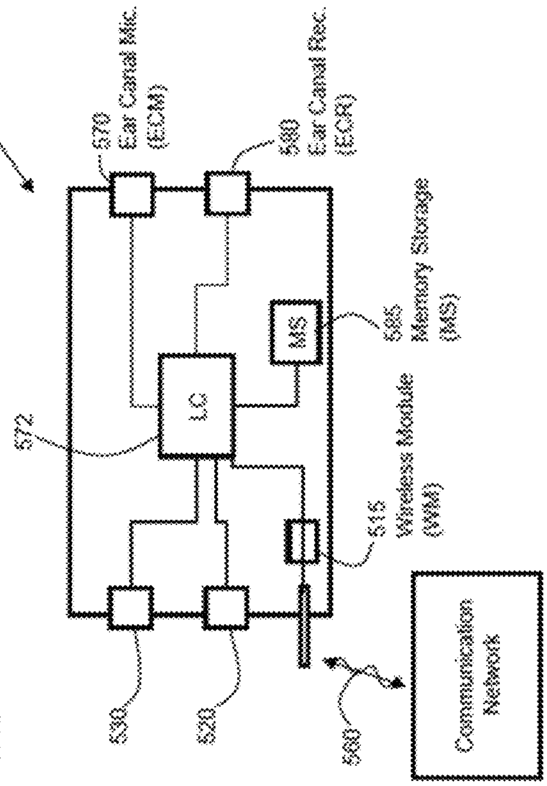
FIG. 5B illustrates a block diagram of the earpiece of FIG. 5A.

FIG. 5B illustrates a block diagram of the earpiece of FIG. 5A, illustrating the first user interaction element 530, the ambient microphone (AM) 520, that can be used to pick up ambient audio content, an ear canal microphone (ECM) 590 that can pick up audio in the ear canal region, an ear canal receiver (ECR) 580 that can direct audio content to the ear drum, all of which can be connected operatively to a logic circuit 572. A memory storage device 585 can be operatively connected to the logic circuit (LC) 572, and can store data such as registration, preference, and audio content data. The optional communication antenna 510 can be connected to a communication module (e.g., wireless module 515), and can receive or transmit information 560 to a communication network.

Figure 6:
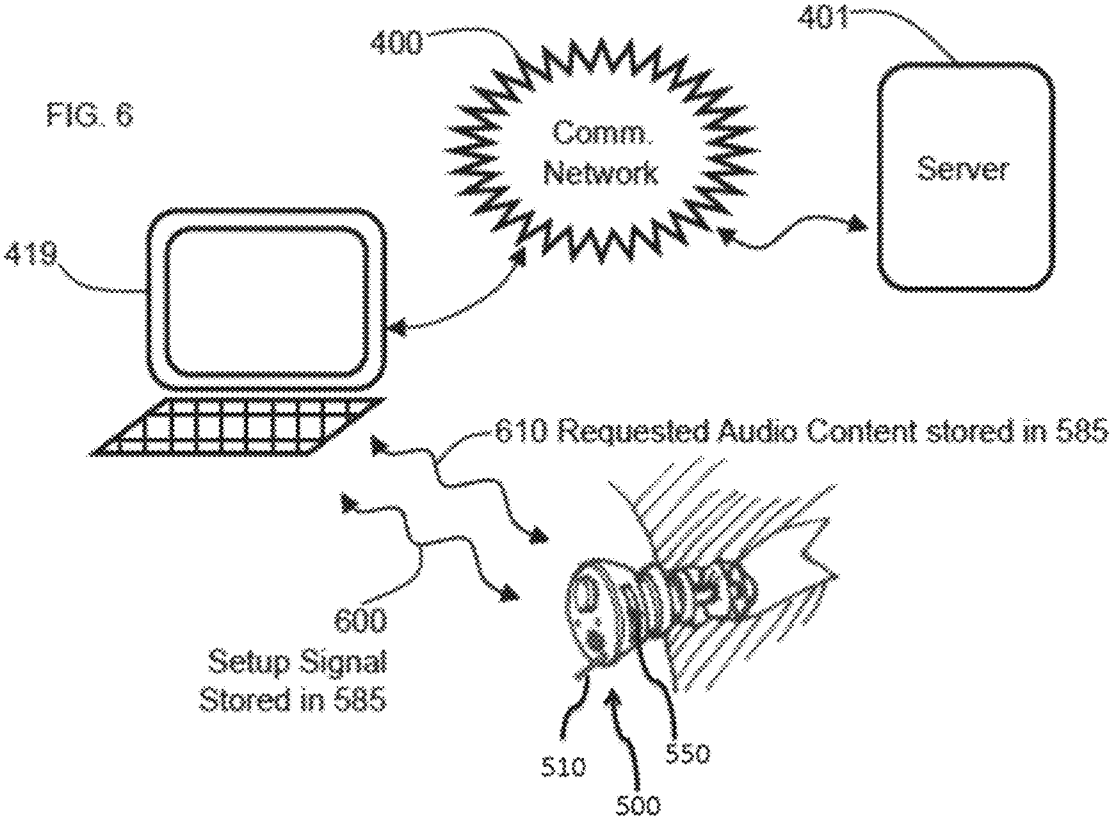
FIG. 6 illustrates a user interface for setting the parameters of an earpiece operating as a Personal Audio Assistant.

FIG. 6 illustrates a user interface for setting the parameters stored in the memory storage device 585. For example a user can use his/her computer 419 to communicate with a server 401 (e.g., via a communication network 400) to start the user's registration (e.g., with an audio content provider). The registration information can then be transmitted 600 to set the stored parameters in the memory storage device 585 of the earpiece 500. Additionally a requested (e.g., bought) audio content can be downloaded 610 into the memory storage device 585 of the earpiece 500.

At least one exemplary embodiment is directed to an earpiece comprising: an ambient microphone; an ear canal microphone; an ear canal receiver; a sealing section; a logic circuit; a communication module; a memory storage unit; and a user interaction element, where the user interaction element is configured to send a play command to the logic circuit when activated by a user where the logic circuit reads registration parameters stored on the memory storage unit and sends audio content to the ear canal receiver according to the registration parameters.

In at least one exemplary embodiment the audio content is stored in the memory storage unit. The earpiece according to claim 2, where the communications module is a wireless communications module. Additionally the earpiece can include a second user interaction element configured to alter the volume of the audio content that is emitted from the ear canal receiver.

Upon a play command being received by the logic circuit the logic circuit can check registration parameters stored in the memory storage device for example one of the registration parameters can be whether the audio content is a sample audio content or a fully purchased audio content, or the allowed number of times an audio content can be played, and a counter value that keeps track of the number of times the audio content has been played.

The earpiece can send an auditory warning to be emitted by the ear canal receiver when the counter value is greater than or equal to the allowed number of times the audio content can be played, and where the logic circuit does not send the audio content to the ear canal receiver.

Further Exemplary Embodiments

At least one exemplary embodiment is directed to a system for the delivery of Personalized Services to Personal Audio Assistants, the system comprising: a Personal Audio Assistant system for presenting Personalized Services to the user as Audio Playback; a Server system for user registration, Personalized Service management, and communication; a Registration Process for collecting detailed registration information from users, including the information necessary for creating Personalized Services; a communications protocol (TCP/IP, USB, IEEE 1394, IEEE 802.11, Bluetooth®, A2DP, GSM, CDMA, or other) and a communications network (i.e. the Internet, cellular networks) connecting the Personal Audio Assistant to the Server or connecting the Personal Audio Assistant to other Personal Audio Assistants (peer-to-peer behavior).

In at least one exemplary embodiment a Personal Computer acts as an intermediate, connecting to the Server system over a communications network and connecting to the Personal Audio Assistant over a local connection. At least one exemplary embodiment includes a Personal Hearing Damage Intervention System (e.g., USPTO—60/805,985—Goldstein).

In at least one exemplary embodiment a Personal Audio Assistant system included as part of a Headphone system, the system comprising: a Communications Port supporting a communications protocol enabling communication with the Server system, peer devices, and other capable devices; a non-volatile program memory storage system for storing Control Data, dictating system behavior; a data memory storage system for storing data and audio content; an analog audio input/output and corresponding ADC/DAC; a digital audio input/output and a digital audio signal path; a user control system allowing the user to adjust the level of the audio output and control the behavior of the system; a user control system allowing the user to purchase the content being auditioned in real time; a user control system allowing the user to control, delete, fast forward, output level control, scan, advance, the data stored both stored in memory as well as new streaming data emails and reminders; a display system for presenting information to the user(s) visually using any method familiar to those skilled in the art (LED, LCD, or other); a display system for presenting information to the user(s) (e.g., using Earcons and other sound files); a speech synthesis system for converting text-to-speech and generating speech signals; a speech recognition system for converting speech to-text to respond and send emails and to interface with the control language as to provide navigational commands; a digital timer system; a power supply system in the form of a battery; a unique identification number for each Personal Audio Assistant; Input Acoustic Transducers; an Output Acoustic Transducer; an Audio amplification system; Acoustic Isolation Cushions conforming to one of the Ear Mold Styles (CIC, ITC, ITE, or BTE; see definitions) and other elements common to Headphone systems; a digital signal processor (DSP) system; and a CODEC processor capable of improving the perceptual sound quality of the content to be auditioned while governed by delivering the correct SPL dose.

In at least one exemplary embodiment the system is independent of a Headphone array or can be included and imbedded as part of a Personal Computer system, a Personal Music Player system, a personal monitoring system, an automotive audio system, a home audio system, an avionics audio system, a personal video system, a mobile cell phone system, a personal digital assistant system, a standalone accessory, or an advanced eye-wear system with acoustical transducers.

In at least one exemplary embodiment the various processing needed to derive the intended functions are distributed among any combination of a Server system, a Personal Computer system, a Personal Music Player system, a personal monitoring system, an automotive audio system, a home audio system, an avionics audio system, a personal video system, a mobile cell phone system, a personal digital assistant system, a standalone accessory, or an advanced eye-wear system with acoustical transducers.

In at least one exemplary embodiment the Personal Audio Assistant system can exchange audio signals with a mobile phone via the Communications Port, allowing the Personal Audio Assistant to function as a mobile phone accessory.

In at least one exemplary embodiment a communications buffer is included. For example when a network connection is available, the communications buffer uploads stored content (e.g., Listening Habits Envelope) and stores incoming transmissions (e.g., music, electronic books, and updates to the firmware or operating system) from the Communications Port; The contents of the communications buffer are then transmitted whenever a network connection becomes available. At least one exemplary embodiment includes a perceptual audio codec decoding technology in the DSP, enabling the storage and playback of compressed digital audio formats (e.g., MP3, AAC, FLAC, etc.). At least one exemplary embodiment is compliant and compatible with DRM, FairPlay® and other forms of digital content governance.

At least one exemplary embodiment includes a user control system for selecting and playing back audio content stored in memory that operates using any combination of the following methods: a button or tactile interface which upon auditioning a song can be pressed to order content; a button, tactile and/or voice controlled interface which, when pressed once, commanded to, activates playback of short audio clips or audio thumbnails of the audio content stored in memory; When the button is pressed again during audio thumbnail playback, the current audio content selection is played in its entirety; The behavior of this interface is similar to the "scan" button interface common in FM/AM radio devices; a button, tactile and/or voice controlled interface that, when pressed or commanded to, skips to the next piece of audio content, which is selected randomly from all available audio content that has a play count equal to or less than the play count of the piece of audio content currently playing; The behavior of this interface is similar to the "shuffle" behavior found in some personal music players; an interface for browsing audio content storage devices familiar to those skilled in the art; and a process to allow for increased data memory storage capacity for storing audio content.

In at least one exemplary embodiment the contents of the data memory are encrypted and controlled by the Server system only, prohibiting the end-user from loading unauthorized audio content into the data memory. Further the contents of the data memory can be manipulated by the end-user, allowing the user to transfer audio content to the Personal Audio Assistant system from any device capable of interfacing with the communications port; For example, audio content can be transferred to the system from a Personal Music Player or a Personal Computer. According to at least one exemplary embodiment, audio content (or other media content) updates are retrieved from the Server system any time a connection is detected by the communications port. Furthermore, an exemplary embodiment can include an acoustical and/or visual indicator informing the user when a transfer of data is activated.

In at least one exemplary embodiment radio wave transmissions are used to implement some communications protocol and the communications port acts as a radio receiver. Additionally the Personal Audio Assistant can include: interfaces with some personal scheduling software through the communications port; a speech synthesis system which generates speech-signal reminders corresponding to information from the scheduling software, where the digital timer system triggers the presentation of the speech-signal reminders at the appropriate time.

Additionally the Personal Audio Assistant can interface with an email platform through the communications port; The speech synthesis system converts the email in text to speech and provides email to the user in aural presentation format. The system further comprising: a process in the Registration engine allowing the user to optimize their personalization process of incoming emails by associating a specific Earcon with the importance of the incoming email. As such, normal priority email contains an introduction sound announcing to the user the level of importance the sender associated with their email; a speech recognition system for converting speech-to-text which interfaces with the control language as to provide navigational commands allowing the user to respond and send emails.

In at least one exemplary embodiment the communications port system makes use of some wireless communications protocol (802.11, Bluetooth®, A2DP, or other) to transmit and receive digital audio data for playback, the system further comprising: an audio codec to encode and decode digital audio transmissions; a wireless communications system (802.11, Bluetooth®, A2DP, etc.) for transmitting and receiving data (digital audio transmissions, Control Data, etc.); a method for pairing two or more Personal Audio Assistants through a wireless communications protocol to provide a secure exchange of audio content, data such as the user's Public Data; an audio warning signal or visual display system output that notifies the user anytime a compatible transmission becomes available; and a user control system enabling the user to switch between available compatible transmissions.

In at least one exemplary embodiment the system enables listeners to share digital audio transmissions, the system further comprising: a method for scanning for available digital audio transmissions within range; a user control interface for specifying digital audio transmission behavior; a method for employing the system as a relay to other compliant devices; re-broadcasting digital audio transmissions to increase wireless range. In at least one exemplary embodiment multiple systems are capable of sharing the contents of their program and data memory using the wireless communications protocol.

In at least one exemplary embodiment of the system, the input Acoustic Transducer is used to record audio content to the data memory storage system, the system further comprising: an implementation of some perceptual audio codec technology in the DSP, enabling the storage of compressed audio formats (e.g., MP3, AAC, FLAC, etc); and an increased data memory storage capacity for storing recorded audio content.

In at least one exemplary embodiment, the stereo input Acoustic Transducers are ultimately connected to the audio signal path at the DSP, allowing the user to audition Environmental Audio (e.g., speech or music) and mitigating the need for the user to remove the Headphone apparatus to audition Environmental Audio, the system further comprising: a stereo pair of input Acoustic Transducers placed close to the user's ear canal input, conforming to one of the Ear Mold Styles (CIC, ITC, ITE, or BTE, see definitions); and by mounting the input Acoustic Transducers in a CIC or ITC configuration, spatial-acoustic cues are preserved, creating a spatially-accurate Environmental Audio input signal—essentially a personal binaural recording; a method for acoustically compensating for the non-linear frequency response characteristics of the Acoustical Isolation Cushions of a given Headphone system by applying corresponding inverse filters to the Environmental Audio input signal at the DSP; With this method, the system acts as a linear-frequency-response hearing protection apparatus (e.g., USPTO—60/805,985—Goldstein).

At least one exemplary embodiment includes a system for first attenuating Audio Playback and then mixing the Environmental Audio input signals, at a louder listening level, with the audio signal path using the DSP, where the system is activated by any combination of the following methods: a manual switch to activate/deactivate the system; a speech-detection apparatus to activate the system when speech is detected as the principal component of the Environmental Audio input; and a music-detection apparatus to activate the system when music is detected as the principal component of the Environmental Audio input.

At least one exemplary embodiment can include active noise reduction, echo cancellation and signal conditioning that can be environmentally customized through the registration process to better meet the user's specific needs (i.e., occupation-related noise cancellation); A typical application would be a special set of noise cancellation parameters tuned to the drilling equipment used by a dentist.

In at least one exemplary embodiment the input Acoustic Transducers are instead mounted within circum-aural, intra-aural BTE, or intra-aural ITE molds (see Ear Mold Style), the system further comprising: a spatial audio enhancement system for supplementing the spatial-acoustic cues captured by the stereo pair of input Acoustical Transducers to provide improved spatial perception of Environmental Audio using any combination of the following methods: the application of Generic, Semi-Personalized, or Personalized HRTF data to the Environmental Audio input signal; the application of binaural enhancement algorithms, familiar to those skilled in the art, to the Environmental Audio input signals; the application of a pinna simulation algorithm to the Environmental Audio input signal; and a synthetic pinna apparatus placed just before the stereo input Acoustic Transducers.

At least one exemplary embodiment includes a Server system for the creation, Registration, management, and delivery of Personalized Services, the system comprising: a communications system for interfacing with public communication networks to exchange data with Personal Audio Assistants, a Client's computer, mobile phones, PDAs or other capable devices; a database and database management system for storing and retrieving information relating to user Registration, Personalized Services, audio content, Control Data, and other data; a Registration interface system for collecting, storing, and applying information provided by users; a method for creating Personalized Services based on user Registration information; an end-user audio content Lock-Box storage system, providing every registered user access to their purchased media content; a business-to-business interface system for acquiring audio content with record labels, copyright holders, and other businesses; an E-tailing system including an electronic transactions system enabling users to purchase content, items offered for sale or pay subscription fees electronically; an E-Payment system compensating the various copyholders upon purchase of content by user; a Playlist engine, which acquires the user's Registration information, Listening History Envelope and then creates audio playlists, which is optimized for the user preferences and further refinements; and an Email server, which distributes communications to the user and others, regarding marketing data, the status of the user weekly SPL dose, and other information.

At least one exemplary embodiment includes machine-learning techniques employed to better optimize the user's preferences relating to audio content and other media content, the system further comprising: a method for tracking the purchase history of each user, relating the purchase history to media content preferences, and using the purchase history to make media content recommendations; a method for examining a user's digital media library, stored on a Personal Computer, Personal Music Player, or Personal Audio Assistant, from the Server system, and relating media content preferences and media content recommendations to the user's digital media library; and a method for examining a user's Listening History Profile.

At least one exemplary embodiment includes a Registration system for collecting a wide variety of information from users, including information necessary for creating Personalized Services, the system comprising: a Server system; an interface system for querying the user to collect registration information including demographics (age, gender), Playback Hardware information, Headphone information, occupational information, home and work locations, medication information, music-related preferences, video-related preferences, and other information; a method for customizing Control Data based on registration information; and a method for creating Personalized Services based on registration information.

In at least one exemplary embodiment a fast HRTF acquisition process is included as part of the Registration process, the system further comprising a method for the fast acquisition of Semi-Personalized HRTF data via a deduction process, the method comprising: a database system containing indexed, clustered HRTF data sets; an auditory test signal with distinctive spatial characteristics, where two or more distinct sound source locations exist; a system for the application of potential HRTF matches to the auditory test signal; and a feedback system, allowing the user to select the best listening experience from a number of candidate listening experiences, based on the spatial quality perceived in the HRTF-processed auditory test signal.

In at least one exemplary embodiment Personalized HRTF data is measured and used instead of Semi-Personalized HRTF data, by any method familiar to those skilled in the art.

In at least one exemplary embodiment the user is provided some Personal Audio Assistant free-of-charge or at a discount, given the user agrees to a subscription service commitment to receive Personalized Services for a certain amount of time.

In at least one exemplary embodiment, as part of the Personalized Services, the user is provided with temporary audio content corresponding to the preferences indicated during the registration process; Further, the user is given the option to purchase the audio content permanently; Otherwise, the audio content is replaced with new audio content from the Server, after a predetermined amount of time or a predetermined number of playback counts, the system comprising: a Personal Audio Assistant with an enhanced user control system, enabling a registered user to purchase media content directly from the Personal Audio Assistant with a button; and a Personal Audio Assistant with an enhanced user control system, enabling a registered user to store a reference to media content that can be purchased by the user at a later time.

In at least one exemplary embodiment, video or gaming content is included as well as audio content, the system further comprising: a Personal Audio Assistant with an enhanced visual display system, capable of playing video and/or gaming content.

In at least one exemplary embodiment, as part of the Personalized Services, the user receives medication reminders in the form of speech signals, audio signals, text, or graphics on the user's Personal Audio Assistant; Medication reminders are generated by the Server system based on the user's registration information.

In at least one exemplary embodiment, as part of the Personalized Services, the user receives stock market information in the form of speech signals, audio signals, text, or graphics on the user's Personal Audio Assistant; The stock market information is selected by the Server system based on the user's registration information, the system further comprising: the user having successfully registered their Personal Audio Assistant with a brokerage firm, or other stock trading engines, the user can then purchase or sell a stock by use of a user button or a speech command.

Further in at least one exemplary embodiment, the user is able to request specific media content to be transferred temporarily or permanently to the user's Personal Audio Assistant, the system further comprising: an interface system operating on the Server allowing users to request specific media content by artist, title, genre, format, keyword search, or other methods familiar to those skilled in the art; and a media content search engine system.

In at least one exemplary embodiment a Relative Audiogram compensation filter is applied to audio signal path by the digital signal processor, the system either (e.g., USPTO—60/805,985—Goldstein): (a) Retrieves Relative Audiogram compensation information from a remote Server after a registration process (during transmission, the information can include HIPAA compliant encoding); or (b) calculates a compensation filter from Relative Audiogram information obtained by the system locally. For example, U.S. Pat. No. 6,840,908—Edwards, and U.S. Pat. No. 6,379,314—Horn, discuss methods for the acquisition of an individual's Relative Audiogram.

In at least one exemplary embodiment a Satellite Radio transmitter/receiver (transceiver) is incorporated within the Headphone proper, allowing the user to at least: receive XM®, Sirius® and other broadcasts for playback over the system; select radio stations for playback over the system via the control system, the control system comprising either a single-click tactile interface or the speech-controlled circuitry; store selected portions of such broadcasts in memory for later recall and playback via the control systems; engage a novel commercial-skip feature for attenuating the playback level of suspected sales commercials broadcasts; and engage a speech-skip feature for attenuating the playback of speech (e.g., news, announcements, etc.).

At least one exemplary embodiment includes a Walkie-Talkie mode, which broadcasts input to the system's built-in microphone, whereby the user's speech can be detected by the input acoustic transducer and remotely broadcast where at least one of the following occurs: the Walkie-Talkie mode receives input via AM/FM broadcasts (as well as digital communications protocols) from a nearby user; the Walkie-Talkie mode allows nearby users to engage in conversation with increased perceptual clarity in noisy environments (e.g., aircraft cockpits), using for example a noise-cancellation system; selectively engage and disengage the Walkie-Talkie mode using the control system; detect other users of the system within a given range; and alert the user of the system when other detected systems contain certain Public Data and contain a predefined Public Message Key (e.g., "If the detected system belongs to a single male between the ages of 25 and 30 and whose favorite sport is tennis, then broadcast the message, 'I like tennis also; would you like to have coffee?'" or "If the detected system belongs to a user who attended Princeton University, then broadcast the message, 'Go Tigers!'").

At least one exemplary embodiment can use other communications to accomplish this service rather than AM/FM; as such the system can incorporate communications transmission protocols (TCP/IP, USB, IEEE 1394, IEEE 802.11, Bluetooth®, A2DP, GSM, CDMA, or other protocols) and a communications network (i.e. the Internet, cellular networks) connecting the Personal Audio Assistant to other Personal Audio Assistants. At least one exemplary embodiment can selectively control the broadcast of public data and public message keys via the control system.

At least one exemplary embodiment includes a Sonification algorithm within the Headphone, which enables auditory display of digitally received data, including for example financial data, news, GPS data, the system further containing a variety of sonification "themes" selected during the registration process that map requested data (e.g., current average trading price of AAPL stock, the Dow Jones Industrial Index, and the Nasdaq Composite®) to corresponding audio content (e.g., the frequency of a sine tone presented in the left ear, the frequency of a sine tone presented in the right ear, and the global amplitude of both sine tones, respectively).

At least one exemplary embodiment includes an auditory display, which is synthesized by the onboard Digital Signal Processor. In at least one exemplary embodiment the auditory display is created through the digital audio signal processing effects applied to any other acoustic data the system is capable of reproducing (e.g., terrestrial radio, prepurchased audio content in the user's digital library, electronic books, etc.); For example, a sudden listening level increase in the playback level of a song to which the user was listening can be triggered by a predefined alert condition (e.g., Nasdaq Composite® has exceeded 2200 points).

At least one exemplary embodiment includes the ability to create themes using a computer program and uploading a file to the Headphone system.

At least one exemplary embodiment includes a speech recognition system for converting speech to HTML (Voice Browser), whereby the user can access the Internet, provide navigational commands, perform searches and receive results via the Headphones through a text (HTML)-speech synthesize.

Additionally, the Personal Audio Assistant can be totally incorporated with a mobile cell phone, or any portable technology which incorporates any of the following protocols, TCP/IP, USB, IEEE 1394, IEEE 802.11, Bluetooth®, A2DP, GSM, CDMA, or others known to those of ordinary skill in the arts via a communications network (e.g., the Internet, cellular networks), the system further comprising: an Acoustic Transducer constructed as part of the mobile cell phone or a series of Acoustic Transducers, which are constructed as part of mobile cell phone; a commutations path incorporated into the mobile cell phone providing for bidirectional communication with a Headphone array; the incorporation of the mobile cell phone's microphone(s) to act as the Environmental Audio Acoustical Transducer(s); and the incorporation of the mobile cell phone's keyboard or touch sensitive screen to function as a manual input or to complement speech commands and that can act in a way to respond to Personalized Services offered to a user.

Figure 7:
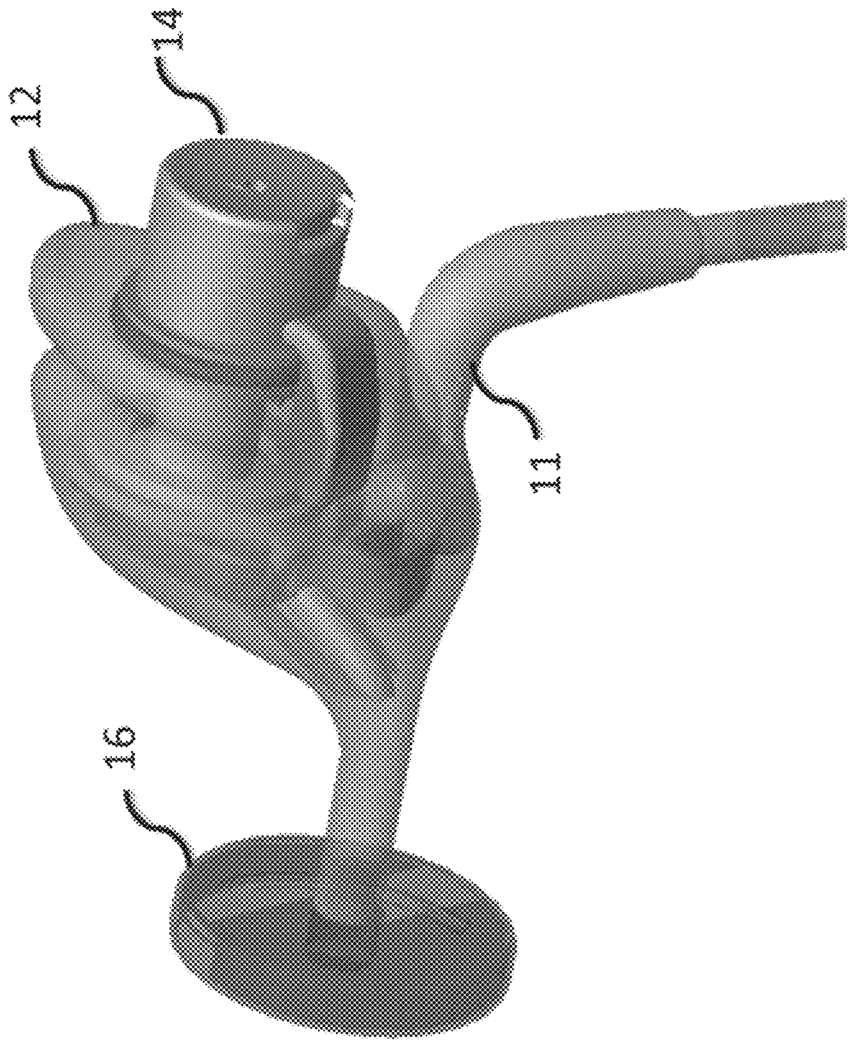
FIG. 7 illustrates a device having a balloon inflation module and an accessory module combined in a form of a smart earpiece in accordance with the embodiments.

FIG. 7 illustrates a device 10 having a balloon inflation module 12 and an accessory module 11. The accessory module 11 can be any number of devices that can be useful in both medical and non-medical contexts. Although the description is primarily focused on an acoustical or communication device operating with the balloon inflation module 12, the accessory module 11 can be embodied in various diverse accessories either alone or in different combinations or permutations. For example, the accessory device can be a measuring device that can be used for measuring and/or recording pulse oximetry, blood pressure, temperature, pulse, oxygen saturation, end tidal CO2 level, gradient differentials, or acoustical impedance. In some embodiments, the accessory device 11 is one or more of a camera, a video device, a cutting tool, a laser, a radio frequency device, or a cauterization device or thermal ablation device. In some embodiments, the accessory device 11 can be used for air or gas delivery, chemical or medicine delivery, or for suction.

Accordingly, the balloon inflation module 12 and the accessory module 11 can work cooperatively in numerous contexts that can provide a tool or measuring device in an elegant, small, and protective package that can be used multiple times, yet can be disposable or replaceable. It is also reusable and retractable. The package is protective in terms of the balloon since the balloon comes in and out of an orifice or lumen where the balloon is retractable and involuted back into the orifice or lumen after or during use as needed. The balloon and/or accessory module can be deployed and used in various applications. For example, the device can be used to set or temporarily use a balloon in nasal passages to mitigate sleep apnea or SIDS for young children. In another application, the balloon can be used to set an NG or feeding tube in a nasal passage instead of using tape. In another use case, the device can be used to leverage or move tissue or can be used to manipulate, support or expand tissue.

In yet another use case, the balloon can be used inside a cannula to deliver fluid or a fluid with anesthetics first where the balloon is subsequently used as a dissecting tool to expand the plane between two tissues, In other words, the balloon inflation module can be used anywhere for endoscopic procedures in a modality for dissecting tissue planes. The balloon inflation module can be used with fluid to distend tissue, to dissect tissue, to create true planes from virtual planes, for introduction of instruments or removal of tissue, or obstructing pathology (e.g., stones, cancer, etc). In yet another embodiment, the balloon can be coated with different substances to provide a rasp-like function to rasp surrounding tissue. For example, the balloon can be coated with diamonds fixed to the balloon. Additionally or alternatively, the surface of the balloon can be textured or non-textured, coated or covered by other surfaces so that there is an interface between the balloon and the tissue being worked on.

In yet other embodiments, the balloon inflation module can be used in conjunction with an endoscope for various procedures in a number of human or animal orifices (sinus, ear, throat, etc.). In some embodiments, the device can provide either single or multiple balloons for insertion and can otherwise provide a delivery system for multiple balloons. In some embodiments, the device can be used with or as part of a stent deployment system providing, for example, the dilatation and manipulation of tissue to place a stent in the appropriate positioning.

The balloon can be modified for various uses and the shape can be constrained for particular body vessels. It can have a unique eccentric shape. The balloon can also be accessorized with a wiper or squeegee at the periphery of the distal end of the lumen of the balloon inflation module to easily remove wax or cerumen or other accumulated materials before the balloon is retracted and involuted. A tapered edge about the periphery of the distal end can be formed to serve as a squeegee.

As noted above, the device is not limited to medical applications. In some embodiments, the device can be used in non-medical applications such as plumbing, examining conduits, oil pipeline inspection or repair. In other words, the device can be a modality to seal or repair leaks in conduits or used as part of system to diagnose and mitigate leaks in conduits. In one example, the retractable involuted balloon can deployed as part of an oil pipe inspection robot at a location of a leak or crack for repair.

Referring again to FIG. 7, the balloon inflation module 12 can further include a button or button assembly 14 used to displace a volume of fluid within the balloon inflation module towards a balloon 16 shown in an inflated mode in FIG. 7.

Figure 8:
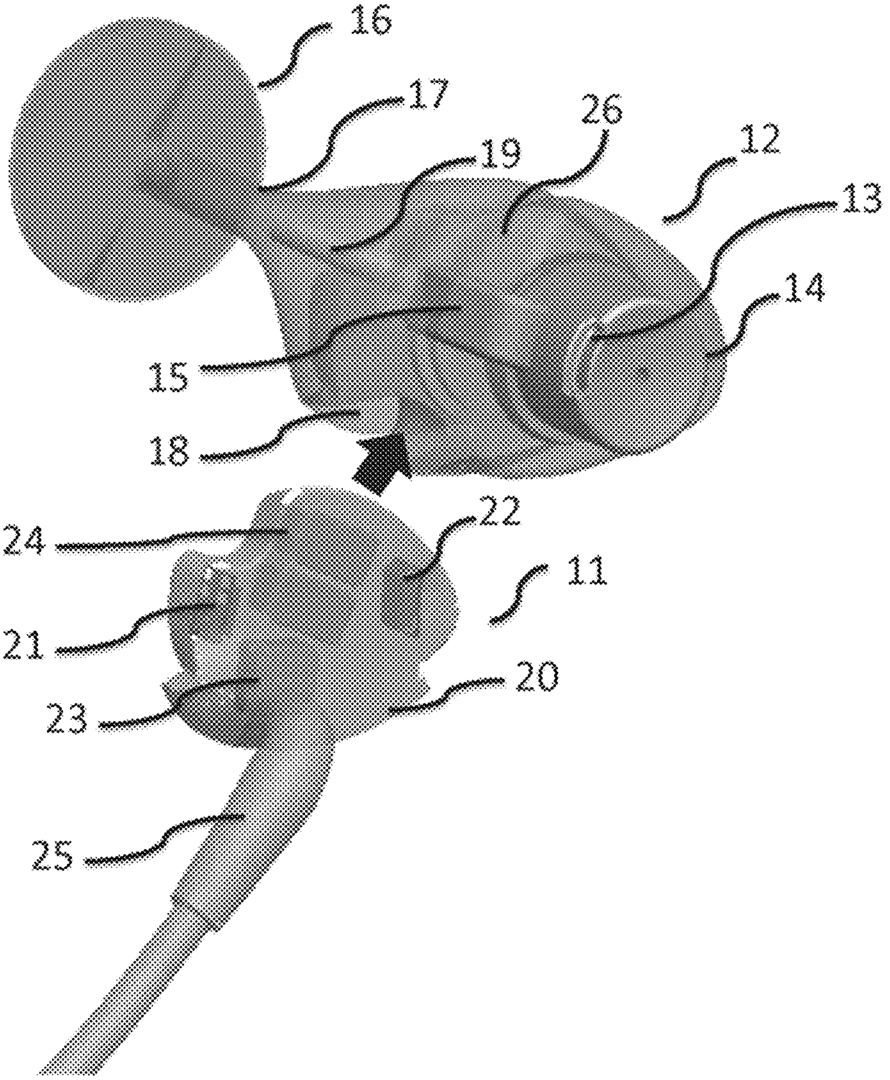
FIG. 8 illustrates an exploded view of the device of FIG. 7 before the accessory module mates with the balloon inflation module in accordance with the embodiments.

FIG. 8 illustrates an exploded view of the device 10. The balloon inflation module 12 includes a button 14 having a detent 13. The module 12 further includes a lumen 17 and the balloon 16. When the button 14 is depressed or pushed towards a body cap 26, the button 14 is placed in a mounted position, which can be fixed or locked with a latch 15 that mates with the detent 13. Fluid is displaced from cavities within the button or button assembly 14 towards the balloon 16 via the lumen 17 or in another embodiment, via another lumen such as the pushrod 19. The accessory module 11 can couple to the balloon inflation module at port 18. The balloon inflation module can be part of a inflation management system (IMS) that includes an involuted balloon that is retractable and further includes an integrated reservoir for fluid. The fluid can be liquid, air, or gel for example. The accessory module 11 can be in one embodiment, an acoustic management system (AMS) having software and hardware that controls a user's acoustic experience. Among the components that can be included in the AMS are a first ambient microphone 21, a second ambient microphone 22, an optional ear canal microphone 23, and an ear canal receiver 24. The microphones 21, 22, 23 and the ear canal receiver 24 can be housed within a housing 20. The AMS can further include a logic circuit coupled to the various microphones and the receiver (speaker). The ambient microphones 21 and 22 can be configured to pick up ambient audio content. The ear canal microphone 23 can be configured to pick up audio in the proximity of an ear canal, and the ear canal receiver 24 configured to provide audio content in the proximity of the ear canal. The AMS can further include a conduit 25 for delivering audio content to the AMS. Further note that the AMS and IMS are field replaceable allowing for customization or service at the time of purchase or once deployed in the field.

Figure 9:
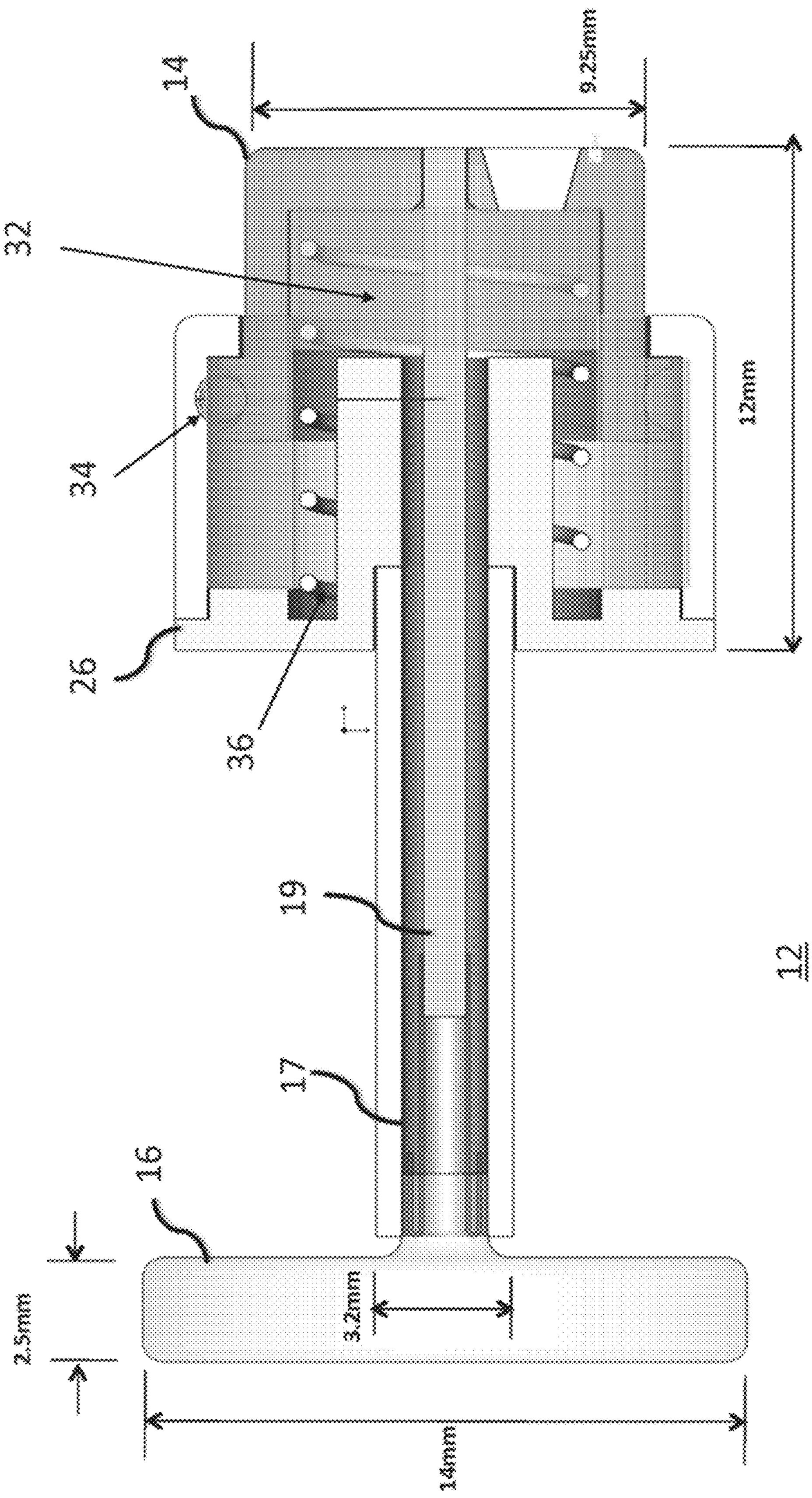
FIG. 9 is a side view of the balloon inflation module of FIG. 7.

FIG. 9 illustrates a side view of the balloon inflation module 12 having a straight lumen that houses the balloon 16. In addition to the components described above, the balloon inflation module 12 can include within the button assembly 14, an a-ring 34 and a spring 36 to bias the button assembly 14 in an unmounted position. In some embodiments, the fluid 32 used within the cavities of the balloon inflation module 12 can be thermally and chemically stable and non-flammable. In medical applications, the fluid should also be non-toxic and leave essentially no residue upon evaporation. In some embodiments the balloon 16 can be attached to the outside lumen 17 while in other embodiments the balloon 16 can be attached to the pushrod 19 (or inner lumen).

Figures 10, 11:
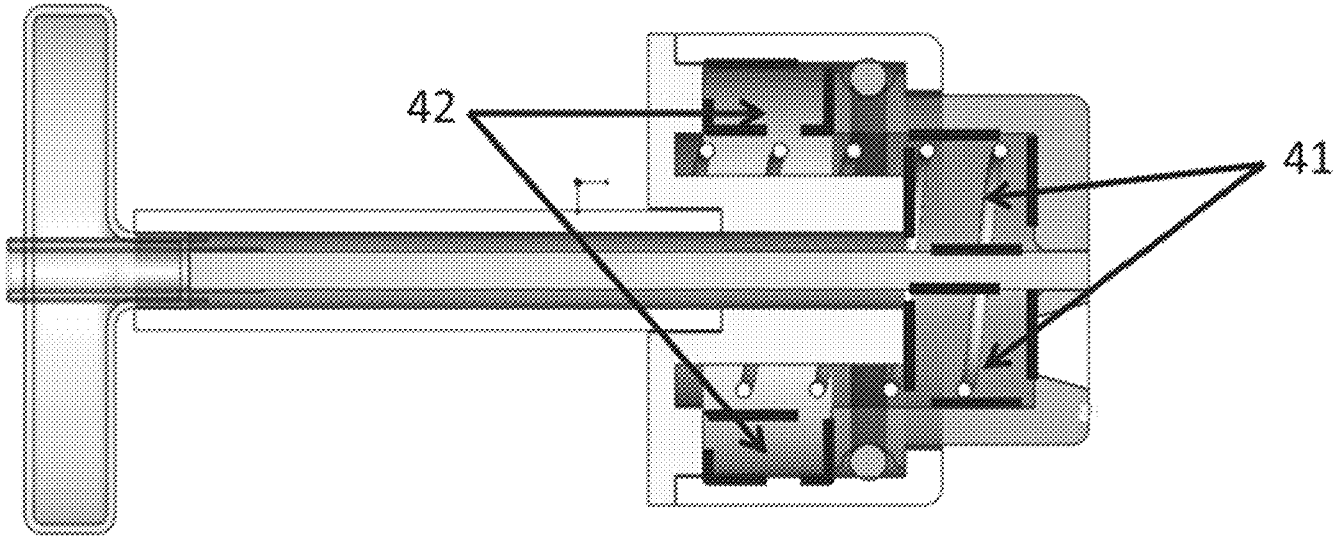
FIG. 10 is another side view of the balloon inflation module of FIG. 7 illustrating volume displacement from cavities in a button assembly of the balloon inflation module towards a balloon.
FIG. 11 is a chart illustrating an example of volume displacements from the cavities in the button assembly of FIG. 10.

FIG. 10 illustrate the side view of the balloon inflation module 12 and further illustrate a first volume within the button cavity 41 and a second volume within a body cavity 42. In one example as shown in the chart 45 of FIG. 11, the button cavity can have 0.142 cc in volume and the body cavity can have 0.188 cc in volume for a total volume displacement of 0.33 cc.

Figure 12A:
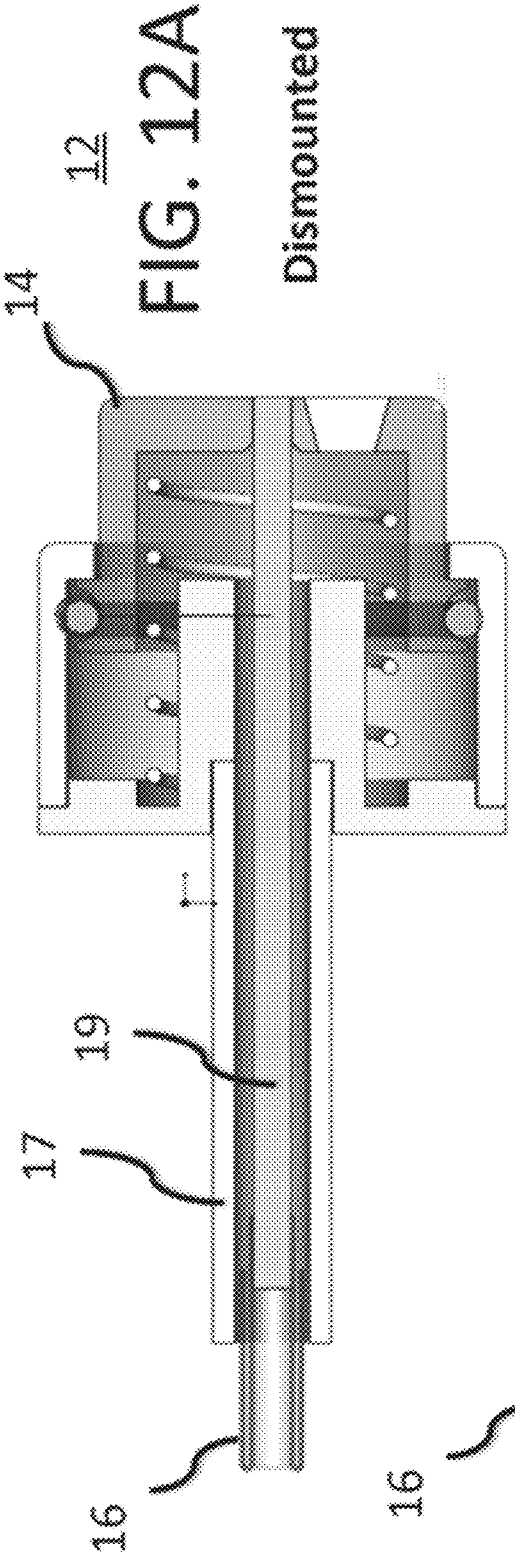
FIG. 12A is another side view of the balloon inflation module of FIG. 7 illustrating a balloon partially stored within a lumen when a button is in a dismounted position in accordance with the embodiments.
Figure 12B:
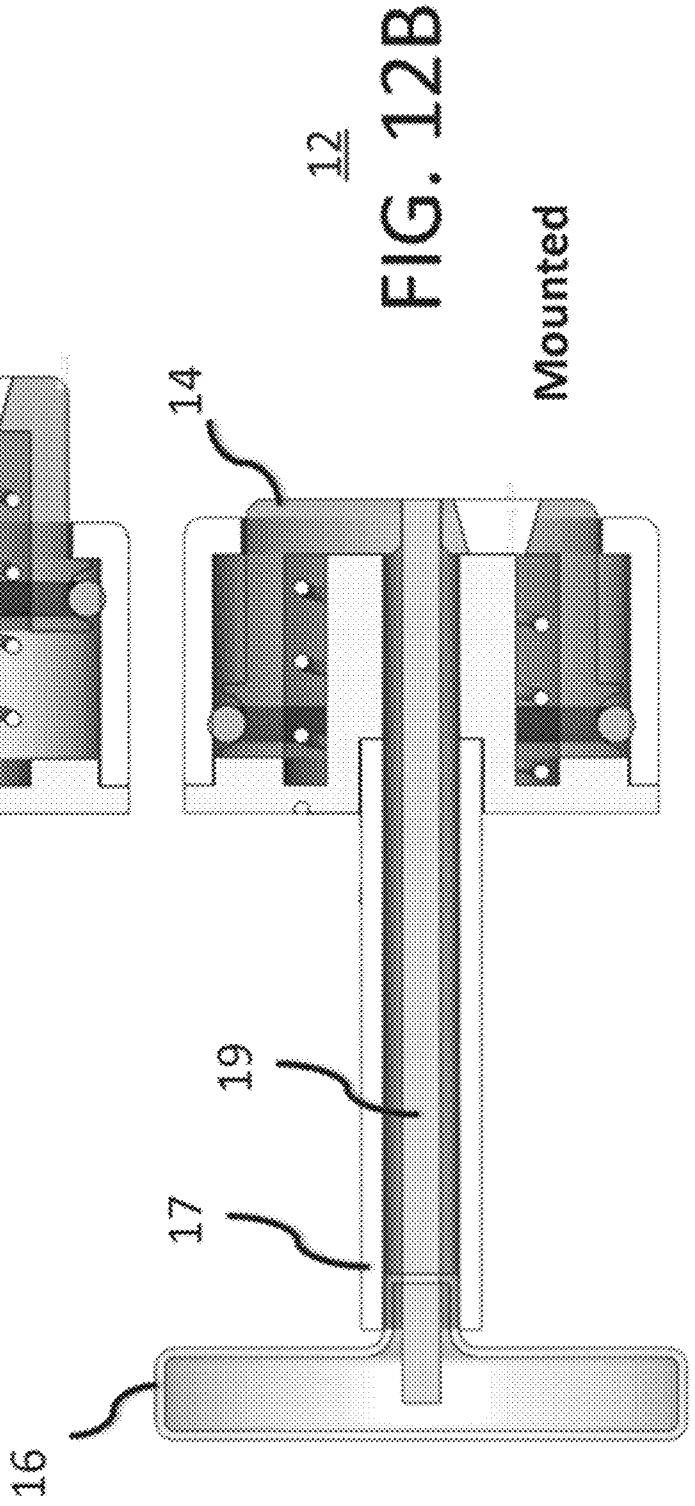
FIG. 12B is a side view of the balloon inflation module of FIG. 7 illustrating the balloon being inflated when the button is in a mounted position in accordance with the embodiments.

FIG. 12A illustrates the balloon inflation module in a dismounted position where the balloon 16 is partially retracted within the lumen 17. In the dismounted position, the fluid is retained within the cavities of the button assembly 14. In FIG. 12B, the balloon inflation module 12 is shown in a mounted position where the fluid previously in the button cavities is displaced toward and within the balloon 16 in order to inflate the balloon as shown. The pushrod 19 can be used to push or deploy the balloon outside the lumen 17. As noted above, the balloon can be attached in one embodiment to the pushrod 19 itself where the pushrod would act as a lumen or conduit for the fluid towards the balloon. In another embodiment, the balloon can be attached to the outside lumen 17 where the fluid is displaced towards the balloon 16 either through the lumen 17 or the pushrod 19 if the pushrod is a lumen.

Figure 13A:
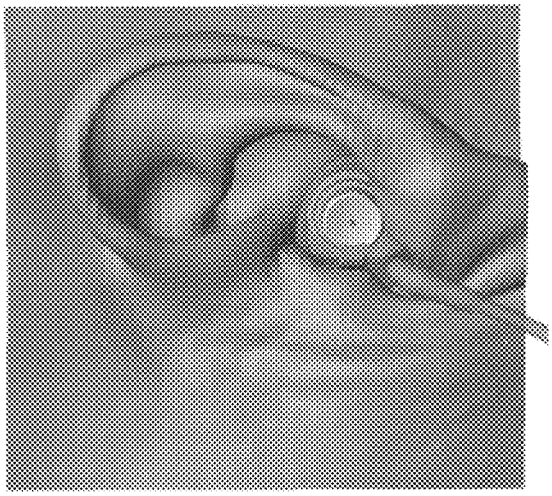
FIGS. 13A, 13B, and 13C illustrates various views of the device of FIG. 7 placed within a human ear in accordance with the embodiments.
Figure 13B:
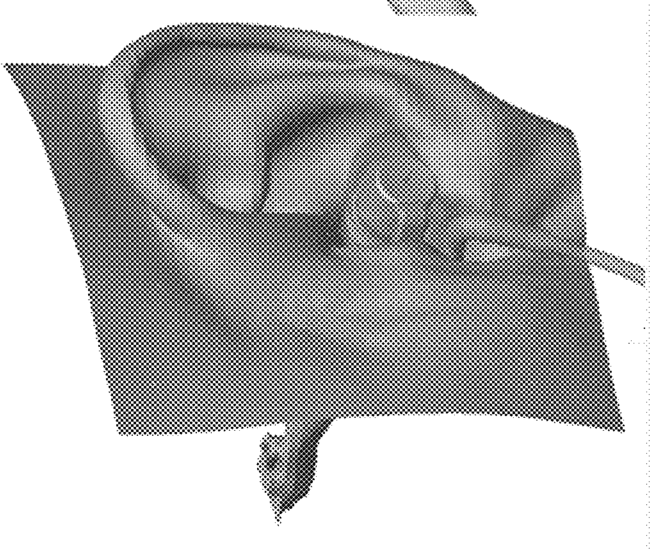
Figure 13C:
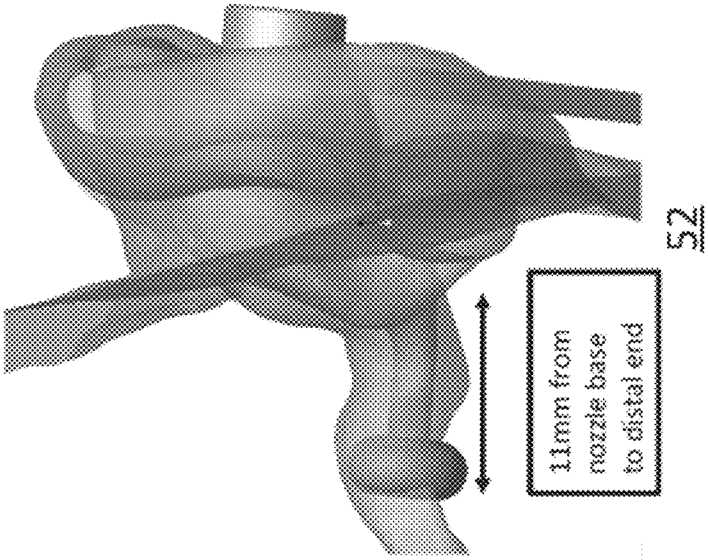

FIG. 13A illustrates an averaged ear model 50 having the device 10 placed within a human ear. FIG. 13B illustrates an ear model 51 with a similar view as FIG. 13A, but at an angle. FIG. 13*c* further illustrates a representation of placement of the device in an ear model 52 further illustrating placement within an ear canal.

Figure 14A:
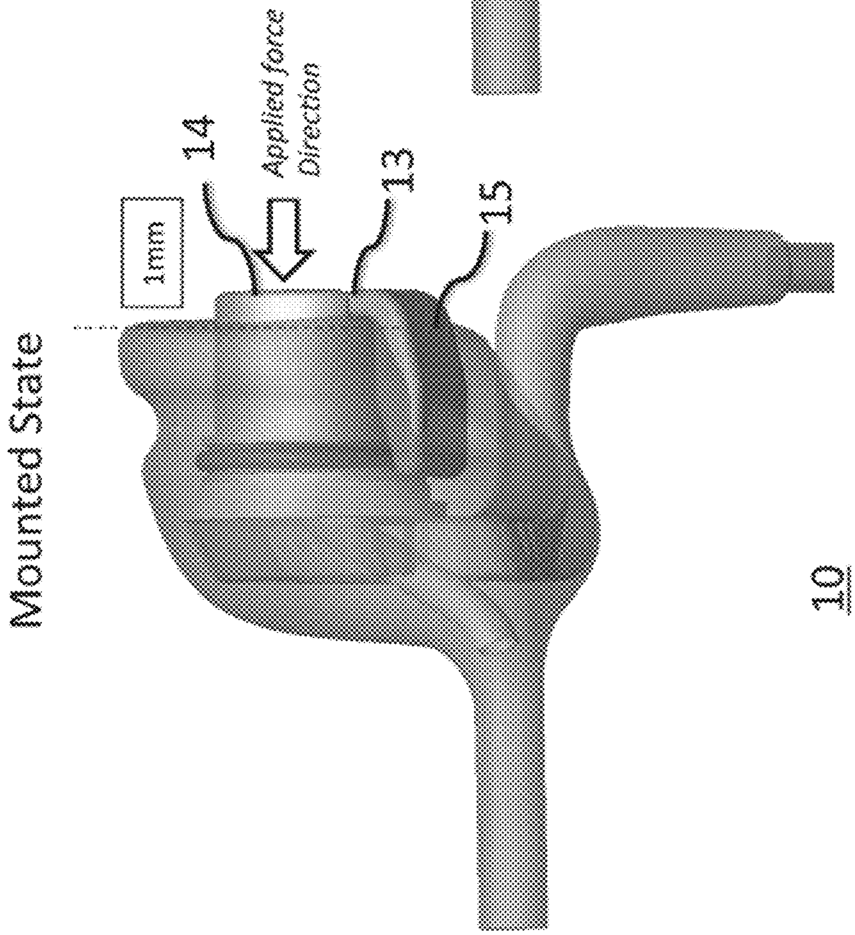
FIG. 14A illustrates an alternative view of the device of FIG. 7 in a mounted state in accordance with the embodiments.
Figure 14B:
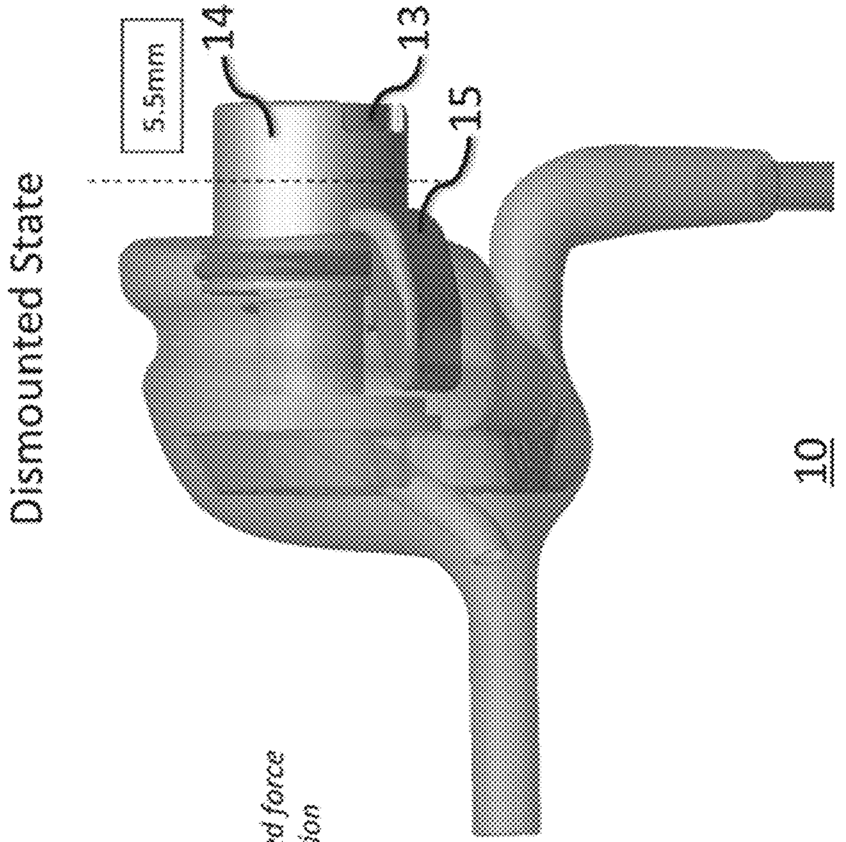
FIG. 14B illustrates an alternative view of the device of FIG. 7 in a dismounted state in accordance with the embodiments.

FIG. 14A illustrates the device 10 in a mounted state and FIG. 14B illustrates the device 10 in a dismounted state. In FIG. 14A, the latch 15 is matted with the detent 13 of button 14 to retain the button in place. The latch 15 can be unlocked from the detent 13 to allow the button to go back to a dismounted state as shown in FIG. 14B. In one embodiment, the profile height of the button in a mounted state can be 1 mm for example whereas the profile height of the button 14 in a dismounted state can be 5.5 mm.

Figure 15B:
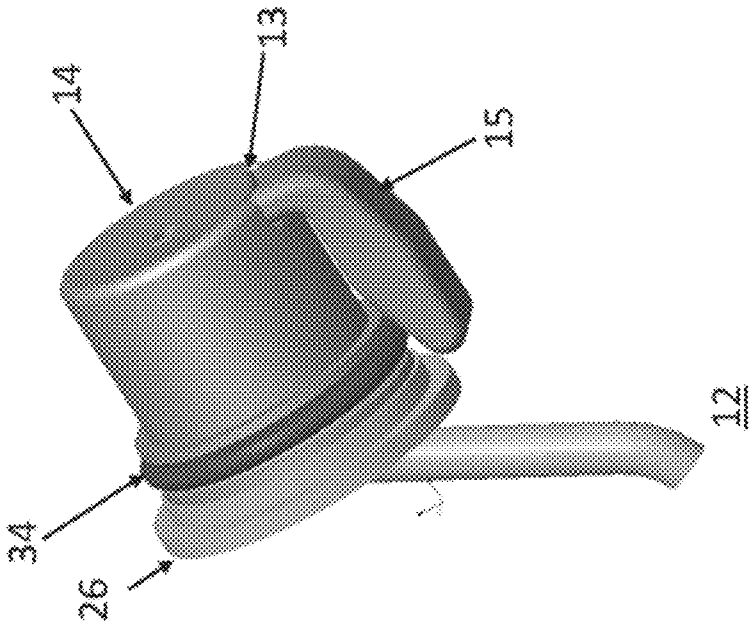
FIG. 15B illustrates an internal view of a portion of the device of FIG. 7 in a mounted state in accordance with the embodiments.
Figure 15A:
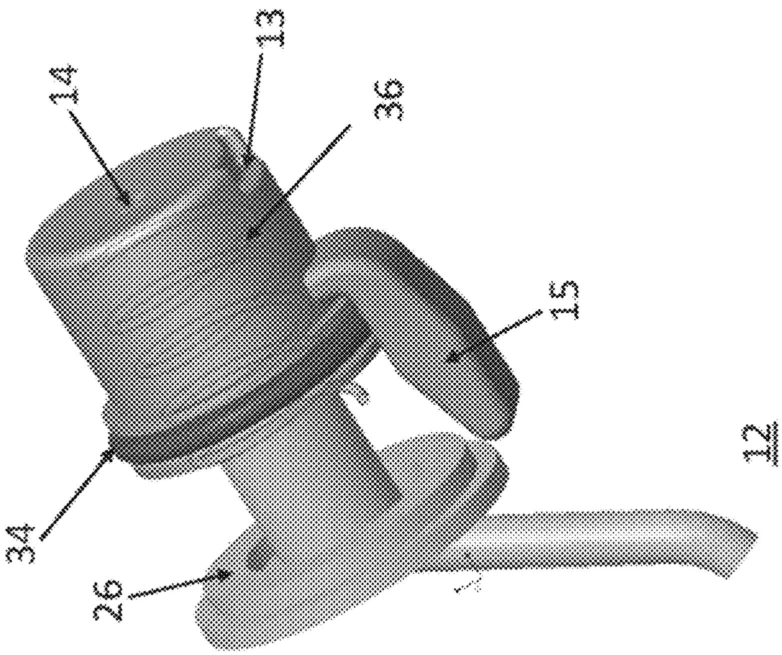
FIG. 15A illustrates an internal view of a portion of the components of the device of FIG. 7 in a dismounted state in accordance with the embodiments.

FIG. 15A illustrates some of the internal components of the balloon inflation module 12 in a dismounted state where FIG. 15B illustrates the same components in a mounted state. For use with an ear canal, the conduit leading to the balloon can be angled for better placement within an ear canal. Thus, the body cap is attached with an angled port. In some embodiments, the button can include a concave dimple for haptic localization by the user. In some embodiments, various detents can be used, or an internal thread adjustment can be used to allow an optimal expansion for different ear canal sizes or in other contexts for different canal or orifice sizes. The O-ring 34 shown is used for body sealing. The spring 36 is an internal return spring for retrieval of the involuted balloon. Also note that the latch 15 can be spring loaded.

Figure 16:
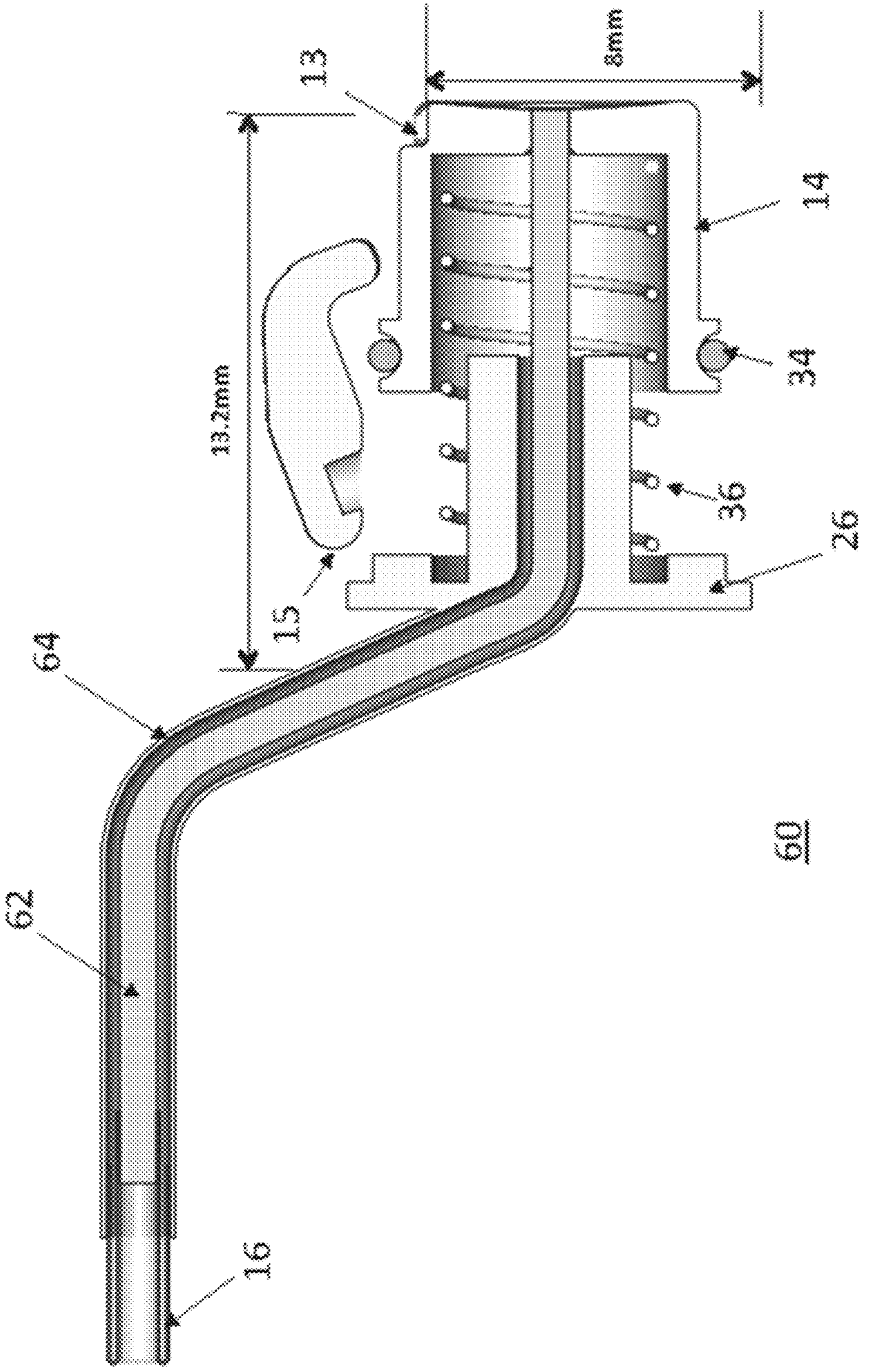
FIG. 16 is a side view of another embodiment of the device of FIG. 7 in accordance with the embodiments.

FIG. 16 illustrates a side view of an alternative button inflation module 60. The module 60 includes many of the same elements as module 10 of FIG. 7 such as the button 14 with detent 13, latch 15, a-ring 34, spring 36, and cap 26. An outer lumen 64 is bent or angled for better placement within an ear canal. The inner lumen 62 is similarly angled to match the lumen 64. In this embodiment, the inner lumen 62 serves as a pushrod or guide wire. The balloon 16 is bonded to a distal end of the guide wire or lumen 62. The button 14 is bonded or attached to proximal end of the guide wire or lumen 62.

Figures 17, 18:
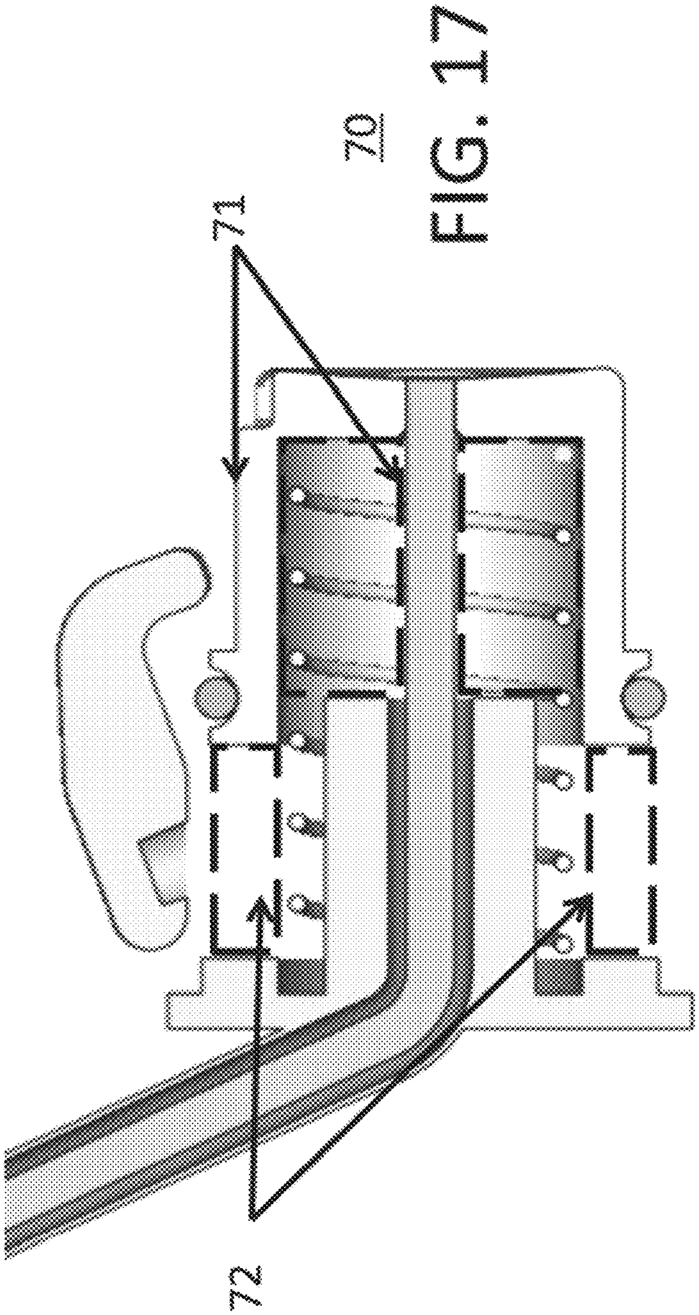
FIG. 17 is side view further illustrating the displacement volumes within a button assembly of a balloon inflation module in accordance with the embodiments.
FIG. 18 is a chart illustrating an example of volume displacements from the cavities in the button assembly of FIG. 17.

FIG. 17 illustrates the side view of the balloon inflation module 70 and further illustrate a first volume within the button cavity 71 and a second volume within a body cavity 72. In one example as shown in the chart 75 of FIG. 18, the button cavity can have 0.152 cc in volume and the body cavity can have 0.165 cc in volume for a total volume displacement of 0.317 cc.

Figure 19B:
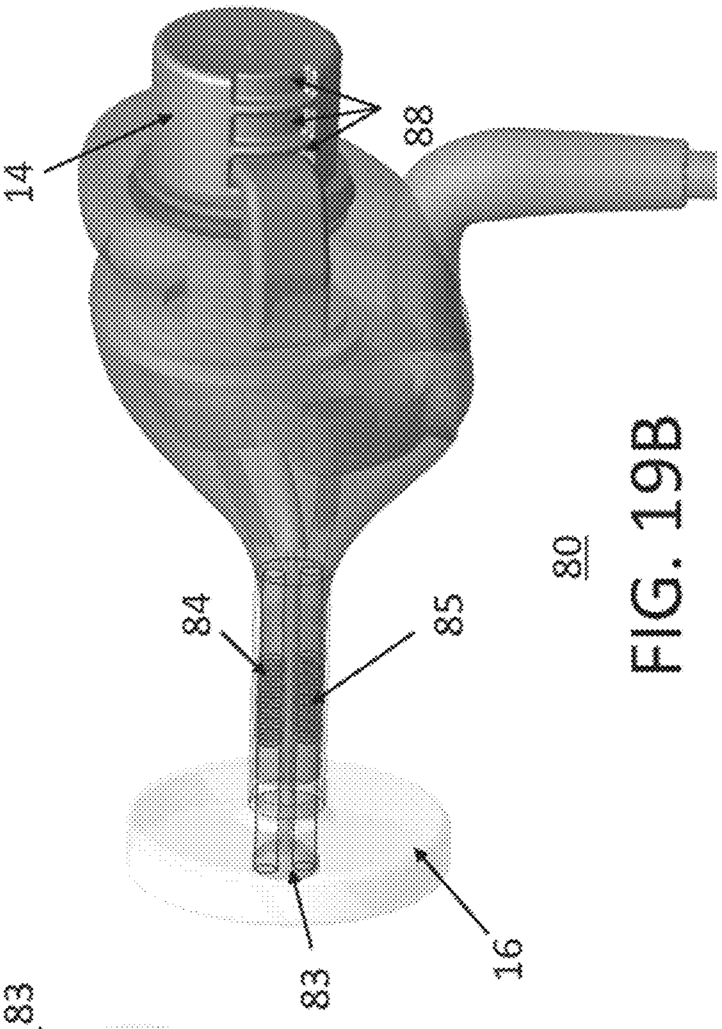
FIG. 19B is a perspective view of the device of FIG. 19A in accordance with the embodiments.
Figure 19A:
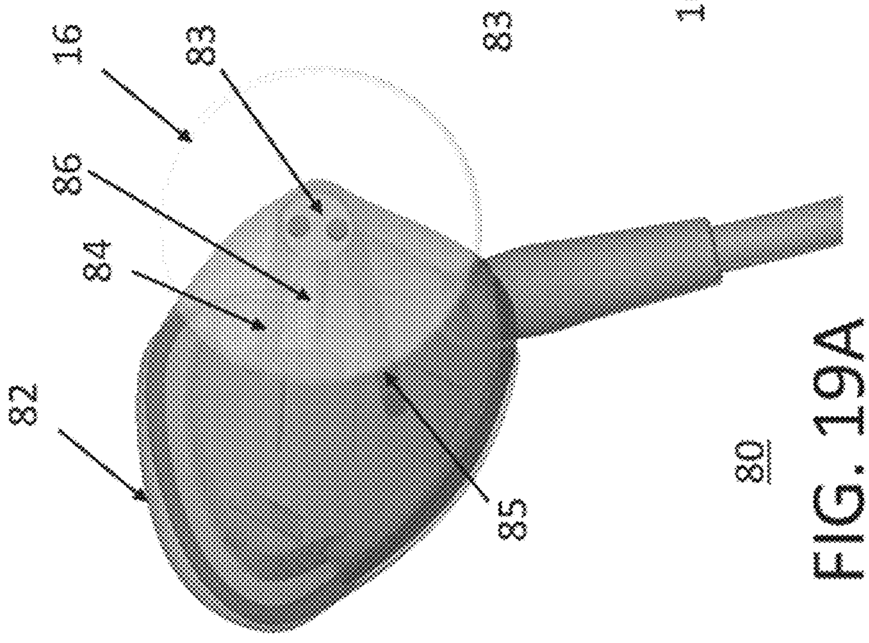
FIG. 19A is a frontal view of a device having a balloon inflation module and an accessory module in accordance with the embodiments.

FIGS. 19A and 19B illustrate a front view and side view respectively of a device 80 with ear canal microphone routing 85, ear canal receiver routing 84, and a pushrod or inner lumen 86 within a housing 82. The lumen can be a multi-lumen tube having routing for the ear canal microphone port, the ear canal receiver port, or other ports. Insert tip or cap 83 with mounted balloon 16 and two through ports for the ECR (top) and ECM (bottom). In some embodiments, the ECR and ECM can be ribbed flexible ports that serve as bellows. Also, the button 14 can have multiple detents 88 for multiple positioning and sizing of the balloon within the ear canal.

Figure 20:
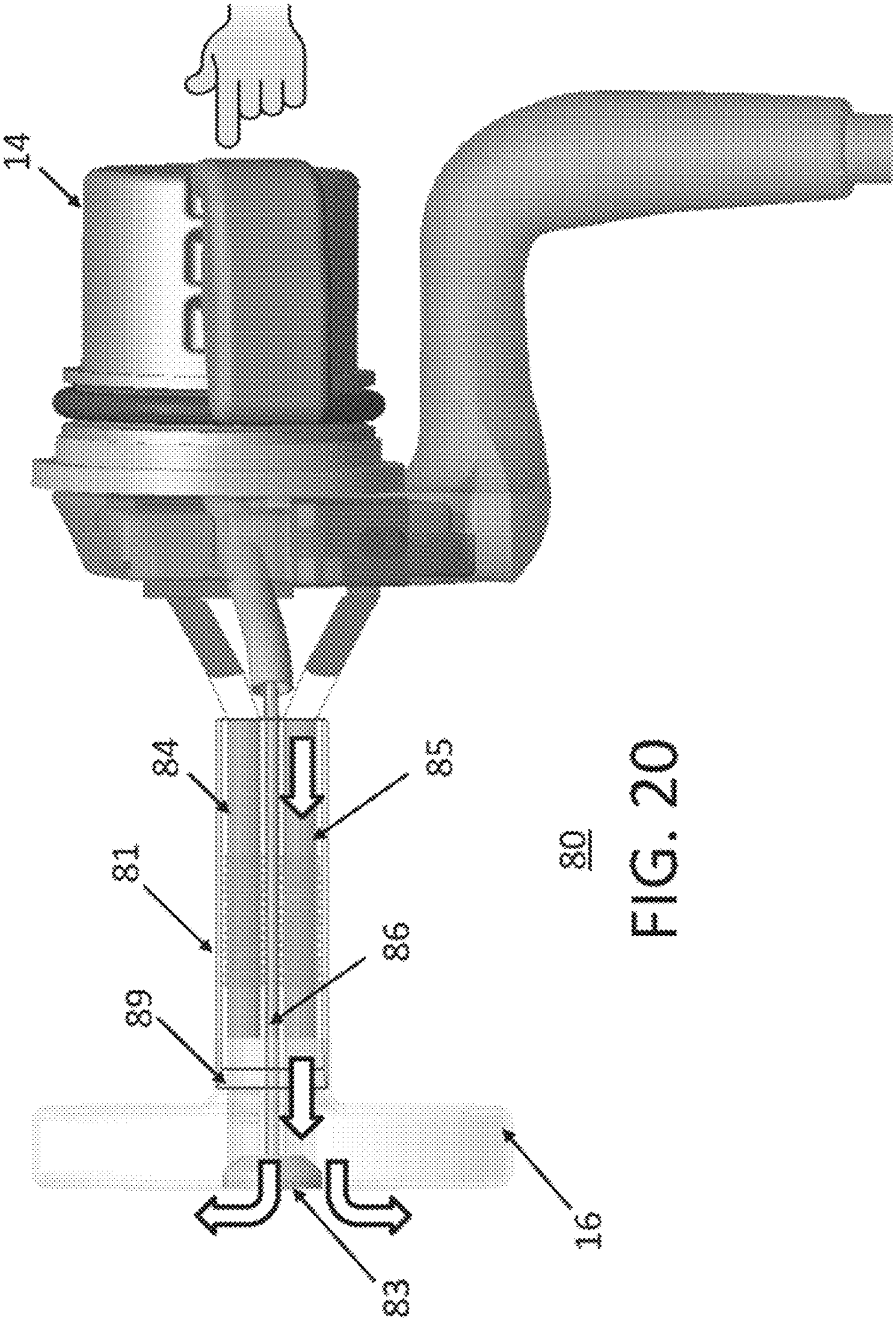
FIG. 20 is a side view of the device of figure illustrating an inflated balloon when a button is in a mounted position in accordance with the embodiments.

FIG. 20 illustrates another side view of the device 80 having the ear canal microphone routing 85, ear canal receiver routing 84, and a pushrod or inner lumen 86. The cap 83 with mounted balloon 16 and two through ports for the ECR (top) and ECM (bottom). The balloon can be adhered to the top of the distal surface of the rod or guide wire 86. In some embodiments, the ECR and ECM can be ribbed flexible ports that serve as bellows. The balloon plug *83) can have two micro-bellow flex ports adhered as well as the retrieval nylon. The button 14 can have multiple detents 88 for multiple positioning and sizing of the balloon within the ear canal.

Figure 21:
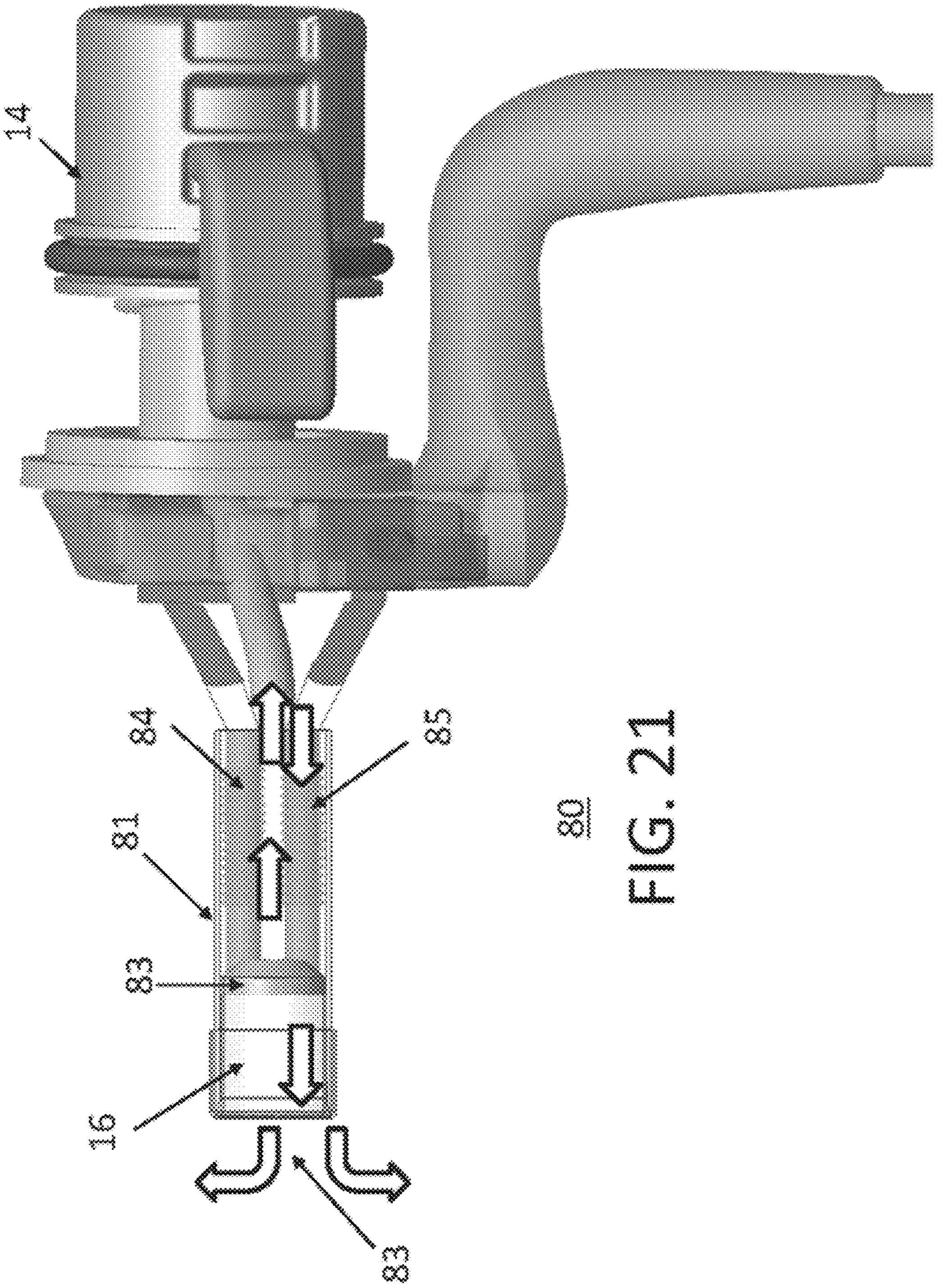
FIG. 21 is a side view of the device of figure illustrating an involuted retracted balloon when a button is in a dismounted position in accordance with the embodiments.

FIG. 21 illustrates the device 80 with the balloon 16 in a retracted involuted position. During motion the two micro-bellow flex ports contract providing a spring force allowing the balloon plug to effectively withdraw. The balloon plug 83 is retrieved by the nylon guide line (previously shown) causing the balloon to fold in on itself and be stored within the large single lumen tube. Operationally, as the button is released, the spring within the actuating button pushes the button out and pulls the nylon guide line attached.

Figure 23:
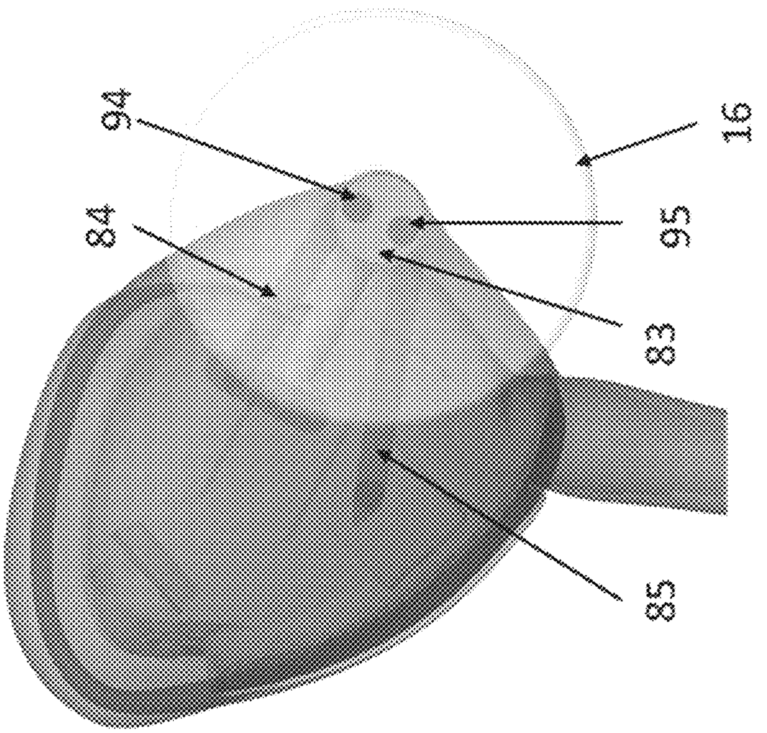
FIG. 23 is a frontal view of the device of FIG. 20 in accordance with the embodiments.
Figure 22:
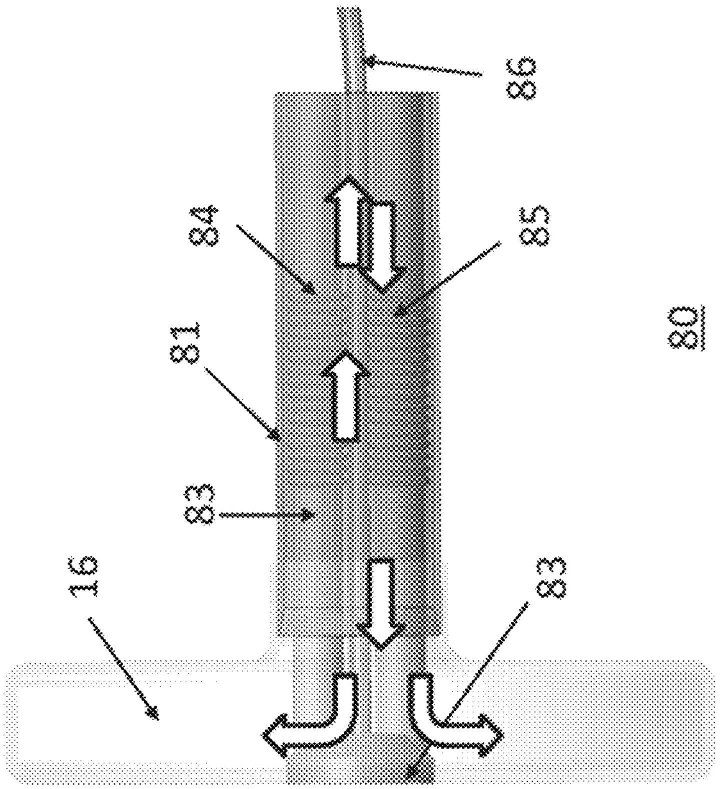
FIG. 22 is a close-up view of a portion of the device of FIG. 20.

FIG. 22 is another side view illustrating the balloon in an inflated mode. FIG. 23 illustrates the same device 80 and further illustrating the ECR port 94 and the ear canal microphone port 95.

In some embodiments, a device includes a balloon inflation module having an involuted balloon housed within a lumen, an integrated reservoir in fluid communication with the involuted balloon configured to selectively displace a volume of fluid from the integrated reservoir into the involuted balloon and from the involuted balloon into the integrated reservoir, and an electronic package selectively coupled to the balloon inflation module. In some embodiments, the balloon inflation module or the electronic module is replaceable.

In some embodiments, the electronic module is an acoustic management module such as a logic circuit coupled to an ambient microphone. In some embodiments the electronic module is a communication module comprising a logic circuit coupled to an ambient microphone configured to pick up ambient audio content, a canal microphone configured to pick up audio in a canal, and a canal receiver. In some embodiments, the balloon inflation module further comprises a multi-lumen structure having the lumen for the involuted balloon, and at least one of a lumen for a canal microphone port or for a canal receiver port. In some embodiments, the balloon inflation module can further include a multi-lumen structure having the lumen for the involuted balloon, a ribbed lumen for a canal microphone port, and a ribbed lumen for a canal receiver port. In some embodiments, the ribbed lumen for the canal microphone port and the ribbed lumen for the canal receiver port forms bellow flex ports that contract and expand. In some embodiments, the balloon inflation module further includes a balloon plug coupled to a distal end of a pushrod and a distal end of the involuted balloon where a lateral retrieval of the pushrod causes the involuted balloon to fold in on itself. In some embodiments, the lumen comprises a sharpened tip at a distal end of the lumen.

In some embodiments, the balloon inflation module further includes a pushrod within the lumen for laterally displacing the involuted balloon towards a distal end of the lumen during inflation. In some embodiments, the pushrod is in fluid communication with the involuted balloon and provides a via between the integrated reservoir and the balloon. In some embodiments, the pushrod is attached to a distal portion of the involuted balloon. In some embodiments, the involuted balloon is attached to an outside portion of a distal end of the lumen.

In some embodiments, the balloon inflation module includes a spring loaded pump that displaces fluid to the involuted balloon in a mounted state and displaces fluid to the integrated reservoir in a dismounted state. In some embodiments, the balloon inflation module further includes a spring loaded pump latch that retains the spring loaded pump in a mounted or locked state when mated with a detent and releases the spring loaded pump in an dismounted or unlocked state.

In some embodiments, a device includes a balloon inflation module having an involuted balloon housed within a lumen, an integrated reservoir in fluid communication with the involuted balloon configured to selectively displace a volume of fluid from the integrated reservoir into the involuted balloon and from the involuted balloon into the integrated reservoir, and a port configured to receive an accessory module. In some embodiments, the accessory module is a communication module comprising a logic circuit coupled to an ambient microphone configured to pick up ambient audio content, an ear canal microphone configured to pick up audio in the proximity of an ear canal, and an ear canal receiver configured to provide audio content in the proximity of the ear canal. In some embodiments, integrated reservoir is formed within portions of a push button spring-loaded pump assembly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

We claim:

1. A method comprising:

scanning for a nearby earpiece within a selected range from a user's earpiece, wherein the nearby earpiece is being used by a second user;

linking communication between a user's earpiece and the nearby earpiece;

selecting audio content to play on the user's earpiece;

sending the audio content to the user's earpiece;

playing the audio content from the user's earpiece; and sending the audio content to the nearby earpiece.

2. The method according to claim 1, wherein the step of selecting audio content is performed by selecting an audio content using a touch screen.

3. The method according to claim 2, wherein the step of linking communication between a user's earpiece and a nearby earpiece is performed by selecting the nearby earpiece from a list on a touchscreen.

4. The method according to claim 1, wherein the step of selecting audio content is performed by selecting an audio content using a touch screen.

5. The method according to 1, wherein the step linking communication is performed by the user selecting a nearby earpiece using a touchscreen and whereupon selecting a signal is sent to the nearby earpiece to link.

6. A method comprising:

scanning for a nearby earpiece within a selected distance from a user's earpiece;

linking communication between a user's earpiece and the nearby earpiece;

selecting audio content to play on the user's earpiece, wherein the step of selecting audio content is performed by selecting an audio content using a touch screen;

sending the audio content to the user's earpiece;

playing the audio content from the user's earpiece; and sending the audio content to the nearby earpiece, wherein the distance is preselected by the user using the touchscreen.

7. The method according to claim 6, wherein whether a nearby earpiece is within the range is determined by comparing the nearby earpiece's GPS values with the user's earpiece's GPS values.

8. A method comprising:

selecting a first earpiece pair and a second earpiece pair to initiate wireless connection of each of the first and second earpiece pairs with a single mobile audio communication device, wherein an earpiece pair includes two earpieces, one for each ear of a user;

selecting audio content using a touchscreen, wherein the touchscreen is part of the mobile audio communication device; and sending the selected audio content to the first earpiece pair and the second earpiece pair.

9. The method of claim 8 wherein the step of selecting a first earpiece pair and a second earpiece pair is performed by touching a representation of the first earpiece pair and second earpiece pair on a touchscreen display.

10. The method according to claim 9, wherein the touchscreen display shows all the earpieces that can be linked to the single mobile audio communication device.

11. The method according to claim 9, wherein the touchscreen display shows all the earpieces that are within a range to the single mobile audio communication device.

12. The method according to claim 11, wherein whether an earpiece is within the range is determined by comparing the earpiece's GPS values with the mobile audio communication's GPS values.

13. The method according to claim 9, wherein the first earpiece pair includes a right earpiece and a left earpiece, wherein the first earpiece pair is part of a headset that physically connects the right earpiece to the left earpiece.

14. The method according to claim 9, wherein the mobile audio communication device is a computer.

15. The method according to claim 9, wherein selecting the audio content begins real time voice communication between a first user of the first earpiece pair and a second user of the second earpiece pair.

16. The method according to claim 15, wherein the voice communication from the first user is picked up by an ear canal microphone in the first earpiece pair.

17. The method according to claim 16, wherein the voice communication from the second user is picked up by an ear canal microphone in the second earpiece pair.

18. The method according to claim 8, where the first earpiece pair includes:

a left earpiece that includes a left ear canal microphone and a left ambient sound microphone.

19. The method according to claim 18, where the first earpiece pair includes:

a right earpiece that includes a right ear canal microphone and a right ambient sound microphone.

20. The method according to claim 8, wherein selecting an audio content is selecting a video that contains audio content and wherein the sending of the audio content is sending the video containing audio content.

* * * * *